United States Patent
Matsuda et al.

(10) Patent No.: US 10,527,798 B2
(45) Date of Patent: Jan. 7, 2020

(54) FIBER SELECTOR AND LASER APPARATUS

(71) Applicant: FANUC CORPORATION, Yamanashi (JP)

(72) Inventors: Munekazu Matsuda, Yamanashi (JP); Hiroshi Takigawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 30 days.

(21) Appl. No.: 16/041,871

(22) Filed: Jul. 23, 2018

(65) Prior Publication Data

US 2019/0064441 A1    Feb. 28, 2019

(30) Foreign Application Priority Data

Aug. 31, 2017  (JP) .................................. 2017-166743

(51) Int. Cl.
*G02B 6/35* (2006.01)
*B23K 26/067* (2006.01)
(Continued)

(52) U.S. Cl.
CPC ........ *G02B 6/3514* (2013.01); *B23K 26/0673* (2013.01); *G02B 6/262* (2013.01);
(Continued)

(58) Field of Classification Search
None
See application file for complete search history.

(56) References Cited

U.S. PATENT DOCUMENTS 4,701,591 A * 10/1987 Masaki .............. B23K 26/0673
                                                      219/121.61
6,008,469 A * 12/1999 Kawamura .......... B23K 26/067
                                                      219/121.74
(Continued)

FOREIGN PATENT DOCUMENTS

JP          S57-68803 A       4/1982
JP          H2-143478 A       6/1990
(Continued)

OTHER PUBLICATIONS

An Office Action; "Notice of Reasons for Refusal" issued by the Japanese Patent Office dated Jun. 18, 2019, which corresponds to Japanese Patent Application No. 2017-166743 and is related to U.S. Appl. No. 16/041,871; with English Translation.

*Primary Examiner* — Michael Stahl
(74) *Attorney, Agent, or Firm* — Studebaker & Brackett PC

(57) ABSTRACT

A fiber selector includes: a plurality of first reflecting members corresponding to a plurality of focusing optical systems which focus a laser beam from a collimating optical system, and equipped with a reflecting surface capable of reflecting the laser beam towards the focusing optical system; a rotary motor that rotationally moves the first reflecting member between a first position at which the laser beam reflects and a second position which does not block the laser beam, in which the fiber selector rotationally moves the plurality of first reflecting members between the first position and second position so as to selectively switch the propagating direction of the laser beam to any of the plurality of focusing optical systems, in which the reflecting surface of the first reflecting member is a plane perpendicular to the rotation axis of the shaft to which this first reflecting member is fixed, and is arranged so as to face the (Continued)

direction of the rotary motor that causes the shaft to which this first reflecting member is fixed to rotate.

15 Claims, 47 Drawing Sheets

(51) Int. Cl.
*G02B 6/42* (2006.01)
*G02B 6/28* (2006.01)
*G02B 26/08* (2006.01)
*G02B 6/26* (2006.01)
*G02B 27/09* (2006.01)
*G02B 27/30* (2006.01)
*H01S 3/067* (2006.01)
*G02B 6/36* (2006.01)

(52) U.S. Cl.
CPC ......... *G02B 6/2817* (2013.01); *G02B 6/4296* (2013.01); *G02B 26/0816* (2013.01); *G02B 27/0977* (2013.01); *G02B 27/30* (2013.01); *H01S 3/06704* (2013.01); *G02B 6/3604* (2013.01)

(56) References Cited

U.S. PATENT DOCUMENTS

| | | | |
|---|---|---|---|
| 8,320,426 B2* | 11/2012 | Grapov et al. | B23K 26/0673 359/226.1 |
| 2002/0018257 A1* | 2/2002 | Notheis | B23K 26/0604 219/121.6 |
| 2013/0051409 A1 | 2/2013 | Grapov et al. | |
| 2018/0106970 A1* | 4/2018 | Takigawa | B23K 26/067 |
| 2019/0030641 A1* | 1/2019 | Nagayasu | H01S 3/10 |

FOREIGN PATENT DOCUMENTS

| | | |
|---|---|---|
| JP | H09-239580 A | 9/1997 |
| JP | 2000-180741 A | 6/2000 |
| JP | 2002-289013 A | 10/2002 |
| JP | 2014-065047 A | 4/2014 |

* cited by examiner

FIBER SELECTOR AND LASER APPARATUS

This application is based on and claims the benefit of priority from Japanese Patent Application No. 2017-166743, filed on 31 Aug. 2017, the content of which is incorporated herein by reference.

BACKGROUND OF THE INVENTION

Field of the Invention

The present invention relates to a fiber selector that selectively causes laser light emitted from a laser apparatus and propagated through one input optical fiber to be emitted from any among a plurality of output optical fibers; and a laser apparatus equipped with such a fiber selector. A device which switches between optical paths of a laser be in this way has also been called an optical path switching device, laser beam distributor, or laser beam branching device. However, herein, since targeting a device that makes incident a laser beam emitted from the core of an emitting end of the input optical fiber onto the core of the incident end of the output optical fiber which was selected among a plurality of output optical fibers, it has been called a fiber selector. In addition, herein, it is targeting an apparatus whereby the switching from a state in which the laser beam is emitted from a selected output optical fiber to a laser beam being emitted from a subsequently selected output optical fiber can be performed at high speed.

Related Art

In a laser device such as a solid-state laser apparatus or fiber-laser apparatus which has a laser beam from a laser diode as the excitation light source, or a direct-diode laser apparatus which has a laser beam from the laser diode as the laser light source as is, it is often configured so that the laser beam emitted from the laser apparatus is propagated in the optical fiber and guided up to, for example, a machining head. However, depending on the application, the proportion of time (duty) performing laser machining by emitting a laser beam from one machining head is low, and it is necessary to use a plurality of machining heads by switching between laser beams from one laser apparatus. For example, in the case of performing laser welding by attaching a machining head to a robot arm, compared to the time of emitting a laser beam from the machining head for laser welding, the time for moving the machining head up to a predetermined position of the subsequent laser welding by operating the robot arm is longer. In this case, since configuring so as to be able to perform laser welding by emitting a laser beam from another machining head during movement of the machining head, a fiber selector becomes necessary that can select to which of the plurality of optical fibers linked to the plurality of machining heads to make incident the laser beam from the one laser apparatus. This necessity arises not only because of the laser apparatus being high cost, but also configuring so as to be able to perform predetermined laser machining with as small of a laser apparatus as possible in order to effectively use the limited factory site area.

When considering the above-mentioned application, the following such conditions are demanded in a fiber selector.

Little loss in laser beam power, and high coupling efficiency (=laser beam power outputted from fiber selected/laser beam power inputted to fiber selector);

Optical fiber selected is switched at high speed;

Since often installed within a laser apparatus, even when installed within a laser apparatus, leads to as little possible increase in size of laser apparatus;

Easy to carry out adjustment work such as optical axis adjustment of the optical system inside of the fiber selector, which is imperative upon obtaining high coupling efficiency;

Enables maintenance work such as replacement to be done easily in a short time in the case of a part of the components constituting the fiber selector failing; etc.

Such a fiber selector has also been called a beam distributor or the like. The fiber selector generally is a structure that includes a reflecting member that is fixed to each shaft of a plurality of rotary motors, and switches the reflecting member that reflects a collimated laser beam by way of the rotation of the rotary motor to change the propagating direction of the laser beam. However, to raise the coupling efficiency of the laser beam, it is essential to precisely focus the laser beam at the fine core of the selected optical fiber, and thus high-precision adjustment of the angle of the shaft of the rotary motor to which the reflecting member is fixed, and high-precision adjustment of the focal position and optical axis angle of the focusing optical system are required. However, conventional fiber selectors are not a structure which can carry out such adjustment from one direction, and have required a large space inside of the laser apparatus to be secured for the fiber selector, including the securing of space for adjustment. In addition, conventional fiber selectors are not structures for which partial replacement of components, readjustment after component replacement, etc. are easy, and are structures premised on replacing the entire fiber selector.

Conventional technology which can compatibly achieving both incidence of the laser beam on the core of the output optical fiber of extremely small size so that there is as little loss as possible, and switching between output optical fibers emitting the laser beam at high-speed has been limited to technology which fixes to the shaft of a rotary motor the reflecting member including a reflecting surface that is perpendicular to the shaft, and switches between establishing a state reflecting the laser beam, and establishing a state allowing to penetrate without reflecting, by way of rotation of the shaft. The reasons for making the reflecting surface of the reflecting member to be perpendicular to the shaft is because, even if the rotation of the rotary motor does not completely stop at the predetermined angle, the direction of the optical axis of the laser beam reflected by the reflecting surface will be stable without varying. In a case assuming that the reflecting surface of the reflecting member is not perpendicular to the shaft, since the direction of the optical axis of the laser beam reflected by the reflecting surface will not be fixed until the rotation of the rotary motor completely stops at the predetermined angle, the position at which the laser beam focused by the focusing optical system is focused is not stable either, and it is not possible to cause the laser beam to be incident on the core of the output optical fiber without loss, and not possible to switch the optical path of the laser beam at high speed.

Conventionally, fiber selectors, which fix to the shaft of a rotary motor the reflecting member equipped with a reflecting surface perpendicular to this shaft, and switch between reflecting members reflecting the laser beam by way of rotation of the shaft, have been disclosed in Patent Documents 1 to 3.

Patent Document 1 discloses a laser machining apparatus configured by a laser oscillator, an optical path switching device configured so as to periodically switch a laser beam oscillated by the laser oscillator to a plurality of optical paths at a determined period, a transportation/locating part of each optical path that transports/locates a workpiece, and a control unit that performs arithmetic control of the laser oscillator and each transportation/locating part based on the switching state of the optical path switching device. Furthermore, Patent Document 1 discloses a reflecting member fixed to a rotation shaft and configured changeably between reflecting and transmitting of a laser beam according to the rotation angle; a rotary motor that drives the rotation shaft to which the reflecting member is fixed; and an optical path switching device consisting of an angle sensor of the rotation angle of the reflecting member for detecting the change-over state of the optical path. However, Patent Document 1 only discloses a structure in which the reflecting surface of the reflecting member faces an opposite direction to the arrangement direction of the rotary motor, and does not disclose a structure in which the reflecting surface that reflects the laser beam is facing the side of the rotary motor, as in the present invention described later.

Patent Document 2 discloses a laser beam distributing apparatus including a housing that has an incident port at which a laser beam is incident, an exit port at which a laser beam exits by passing therethrough, and a distributing port at which the laser beam is distributed and emitted; a rotatable mirror having a reflecting surface area and through-hole area provided within the housing; a mirror drive controller; and a detector that detects a pulse timing of the laser beam and generates a signal. The mirror is arranged within the housing so that a laser beam is made to reach the distributing port when the laser beam irradiates on the reflecting surface area, and is made to reach the exit port when irradiated on the through-hole area. The drive controller controls so as to select between the reflecting surface area and through-hole area, and position on the axis of the laser beam, by causing the mirror to rotate based on the signal from the detector, thereby distributing laser pulses to the exit port and distributing port. Furthermore, Patent Document 2 discloses a laser beam distributing apparatus in which the mirror rotates according to the drive controller, thereby connecting in series a plurality of laser beam distributing apparatuses which distribute laser pulses to the exit port and distributing port, and distributing the laser beam supplied from upstream to the distributing port of each stage at will. However, Patent Document 2 only shows a structure in which the reflecting surface of a planar mirror faces the opposite direction to the arrangement direction of the mirror drive controller (rotary motor), and a structure in which the reflecting surface that reflects a laser beam in order to branch the laser beam is facing the side of the rotary motor as in the present invention described later is not disclosed therein.

In addition, Patent Document 3 discloses a laser beam branching device for branching a laser beam for laser machining into first and second branched light paths in non-simultaneity, and a laser apparatus made using this laser beam branching device. This laser beam branching device includes: a rotary branching member integrally having a rotational center, a reflection part that is provided at the radial outer side of the rotational center, and reflects the entirety or majority of a laser beam at a predetermined beam incident position towards a first branched optical path side, and a transmission part provided in line in the circumferential direction to the reflection part at the radially outer side of the rotational center, and transmitting the entirety or majority of a laser beam at the beam incident position towards a second branched optical path side; a rotation mechanism having a rotary shaft joined to the rotational center of the rotary branching member, and causing the rotary branching member to rotate via the rotary shaft; and a control unit that controls the rotation angle of the rotary branching member through the rotation mechanism so that the reflection part matches the beam incident position when branching the laser beam to the first branching optical path side, and so that the transmission part matches the beam incident position when branching the laser beam to the second branching optical path side. However, Patent Document 3 also only discloses a structure in which the reflecting surface of the reflection part of the rotary branching member faces the opposite direction to the direction of the rotary motor, and thus a structure in which the reflecting surface that reflects a laser beam in order to branch the laser beam is facing the side of the rotary motor as in the present invention described later is not disclosed therein after all.

In other words, the laser beam branching devices described in Patent Documents 1 to 3 are essentially the same with only minor differences in the positional relationship of the rotary motor and reflecting member. Regarding the conventional technology which is not alluding to a collimating optical system or focusing optical system in order to apply to a fiber selector, when adding a collimator optical system and focusing optical system, the above-mentioned conventional technology will exhibit the structure shown in FIG. 47.

In the fiber selector 100 shown in FIG. 47, the input optical fiber 103 is mounted to one side of a rectangular case 101 via a connector 102. In addition, on another side of the case 101 adjoining the side to which this input optical fiber 103 is mounted, a plurality of output optical fibers 105 are mounted via connectors 104, respectively.

The laser beam L emitted from the input optical fiber 103 is converted to parallel light by the collimating optical system 106. Within the case 101, the plurality of reflecting members 107 is arranged on the optical path of the laser beam L having gone through the collimating optical system 106. The reflecting member 107 is fixed perpendicularly to the shaft 109 of the rotary motor 108 extending from outside of the case 101 to inside. The reflecting member 107, accompanying rotation of the shaft 109 of the rotary motor 108, comes to rotationally move between a first position reflecting the laser beam L (position of reflecting member 107 on right side in FIG. 47) and a second position not blocking the laser beam L (position of reflecting member 107 on left side in FIG. 47). Each rotary motor 108 is arranged on the outside of the case 101 on an opposite side to the output optical fiber 105. Each reflecting member 107, when at the first position reflecting the laser beam L, is arranged so as to change the propagating direction of the laser beam L, at a right angle relative to the incident direction.

Such a fiber selector 1, by causing each reflecting member 107 to move to the first position or second position by rotating the shaft 109 of each rotary motor 108 to cause the laser beam L from the input optical fiber 103 to be incident according to the reflecting member 107 residing at the first position, causes to be incident on the incident end face of a selected output optical fiber 105 via the focusing optical system 110 corresponding to this reflecting member 107.

Patent Document 1: Japanese Unexamined Patent Application, Publication No. H09-239580

Patent Document 2: Japanese Unexamined Patent Application, Publication No. 2000-180741

Patent Document 3: Japanese Unexamined Patent Application, Publication No. 2014-65047

SUMMARY OF THE INVENTION

As previously mentioned, in order to realize high coupling efficiency by configuring so that the laser beam emitted from the core of the emitting end of the input optical fiber is incident on the core of the incident end of the output optical fiber, and the proportion of laser beam power that cannot be incident on the core at the incident end becomes as small as possible, it is necessary to perform adjustments, with very high precision, such as the adjustment of the optical axis angle and focal position of the collimating optical system, the adjustment of the optical axis angle of the reflecting surface of the reflecting member, and the adjustment of the optical axis angle and focal position of the focusing optical system. However, the conventional fiber selector is a structure requiring at least to perform the angle adjustment of the shaft of the rotary motor for adjustment of the optical axis angle of the reflecting surface of the reflecting member, and focal position adjustment and optical axis angle adjustment of the focusing optical system from opposite directions. For this reason, the conventional fiber selector has a problem in that, when installed within a laser apparatus, adjustment is difficult to do.

In addition, for the output optical fiber, since it is often the case of being replaced by detaching at the part of the connector, the focusing optical system is arranged on the near side of the fiber selector in this case, since the focusing optical system is arranged at the front of the laser apparatus, or the near side when viewing from maintenance side, focal position adjustment and optical axis angle adjustment of the focusing optical system can be performed easily. However, the optical axis angle adjustment of the reflecting surface of the reflecting member by way of angle adjustment, etc. of the shaft of the rotary motor cannot be performed from the front or maintenance side of the laser apparatus, and thus it is necessary to perform from the opposite side to the front or maintenance side of the laser apparatus. In this case, it is not only difficult to perform adjustment in a short time easily, but there is a problem in that it is necessary to move the laser apparatus for adjustment, or ensure a wide space in advance around the laser apparatus.

Furthermore, with the conventional fiber selector, it is not only not easy to replace in the case of the rotary motor failing, but in the case of replacing the rotary motor and/or optical components, it is necessary to do adjustment of this portion again. For this reason, there is a problem in that time is required in adjustment, and the laser apparatus cannot be used during this. As a result thereof, the entirety of the fiber selector is often replaced when a part of the fiber selector or the like fails, and thus there is a problem in that the running cost of the laser apparatus rises.

In addition, it is desired for the laser apparatus to be as small scale as possible. In order to minimally suppress the sizing-up of the laser apparatus due to installing a fiber selector, it has been desired to make the size of the fiber selector itself as small as possible, as well as making the space for adjustment of the fiber selector, which is required to be ensured inside of the laser apparatus, also as small as possible.

In summary, the following such fiber selector has been demanded over conventional.

Output optical fiber is switchable at high speed;
High coupling efficiency is obtained;
Optical axis angle adjustment of the reflecting surface of the reflecting member, and focal position adjustment and/or optical axis angle adjustment of the focusing optical system are adjustable simultaneously in a short time easily;
In case of the rotary motor or optical components being damaged for any reason, possible to replace only the damaged portion in a short time easily;
Re-adjustment for the focal position adjustment and optical axis angle adjustment after replacing a damaged portion can be performed in a short time easily;
Re-adjustment after replaced is not necessary when possible;
Size is smaller than conventional fiber selector.

In addition, as the laser apparatus equipped with a fiber selector, the following such laser apparatus has been demanded over conventional.

Adjustment required in the fiber selector and replacement of principle components of the fiber selector can be conducted in a short time easily from the front or maintenance side of the laser apparatus;
Re-adjustment after replacement of principle components can be performed in a short time easily;
Desirably, re-adjustment after replacement of principle components is unnecessary;
Excels in maintenance properties, and running cost is curbed;
Size increase due to including a fiber selector is curbed to a minimum.

The present invention has been made taking account of the above situation, and has an object of providing a fiber selector that not only switches the output optical fibers at high speed and high coupling efficiency is obtained, but also can be adjusted in a short time easily, including being simultaneously adjustable for the optical axis angle adjustment of the reflecting surface of the reflecting member, and focal position adjustment and optical axis angle adjustment of the focusing optical system, and enables replacing the rotary motor, optical components, etc. in a short time easily, as well as being able to reduce the size over that conventionally.

In addition, the present invention provides a laser apparatus in which the adjustment required in the fiber selector, and replacement of principle components of the fiber selector can be conducted in a short time easily from the front or a maintenance side of the apparatus, re-adjustment after replacement, can be done in a short time easily, as well as being superior in maintenance properties, and thus being able to suppress running cost, and being able to minimally suppress a size increase due to including the fiber selector.

A fiber selector (for example, the fiber selector 1 described later) according to a first, aspect of the present invention includes: a collimating optical system (for example, the collimating optical system 31 described later) that converts a laser beam (for example, the laser beam L described later) emitted from an input optical fiber (for example, the input optical fiber 3 described later) into parallel light; a plurality of focusing optical systems (for example, the focusing optical system 41 described later) that focuses the laser beam on an output optical fiber (for example, the output optical fiber 4 described later); a plurality of first reflecting members (for example, the first reflecting member 6 described later) provided to correspond to the plurality of the focusing optical systems, and including a reflecting surface (for example, the reflecting surface 6a described later) that can reflect the laser beam from the collimating optical system towards the focusing optical system; and a rotary motor (for example, the rotary motor 5 described later) provided to correspond to a plurality of the first reflecting members, and causing the first reflecting member to rotationally move between a first position at which the laser beam reflects by the reflecting surface towards the focusing optical system, and a second position not blocking the laser beam, in which the fiber selector selectively switches a propagating direction of the laser beam incident from the collimating optical system to a direction incident on any of the plurality of the focusing optical systems, by causing each of the plurality of the first reflecting members to rotationally move between the first position and the second position by way of the rotary motor; and in which the reflecting surface of the first reflecting member is a plane perpendicular to the rotation axis of a shaft (for example, the shaft 51, second shaft 61 described later) to which the first reflecting member is fixed, and is arranged to face a direction of the rotary motor which causes the shaft to which the first reflecting member is fixed to rotate.

According to a second aspect of the present invention, the fiber selector as described in the first aspect, the rotary motor may have a first shaft (for example, the shaft 51 described later), a plurality of the first reflecting members may be respectively mounted to a second shaft (for example, the second shaft 61 described later) different from the first shaft, and the second shaft may be configured so as to join to the first shaft via a transmission mechanism (for example, the transmission mechanism 62 described later) that transfers rotational motion, and rotate together with rotation of the first shaft.

According to a third aspect of the present invention, in the fiber selector as described in the second aspect, at least part of the transmission mechanism may be configured by a resin having self-lubricating property.

According to a fourth aspect of the present invention, in the fiber selector as described in the second or third aspect, an optical axis of the focusing optical system and the rotation axis of the first shaft of the rotary motor causing the first reflecting member corresponding to the focusing optical system to rotationally move may be arranged in parallel.

According to a fifth aspect of the present invention, in the fiber selector as described in any one of the second to fourth aspects, the rotation axis of the first shaft of at least one of the rotary motors may be arranged so as to be equidistant from respective optical axes of two of the focusing optical systems which are adjacent.

According to a sixth aspect of the present invention, the fiber selector as described in any one of the second to fifth aspects may further include: bearings (for example, the bearings 641, 642 described later) that respectively support both ends of the second shaft to be rotatable; and a pressing mechanism (for example, the pressing mechanism 65 described later) that presses the second shaft against either of the bearings.

According to a seventh aspect of the present invention, in the fiber selector as described in the sixth aspect, the pressing mechanism may be configured by an elastic member (for example, the elastic member 651 described later) or a solenoid actuator (for example, the second shaft 61, solenoid coil 652 described later).

According to an eighth aspect of the present invention, the fiber selector as described in any one of the first to seventh aspects may further include: a first angle adjustment mechanism (for example, the first angle adjustment mechanism 50, 80 described later) that adjusts an optical axis angle including a flap angle of the reflecting surface of the first reflecting member, in which the first angle adjustment mechanism may be configured to enable at least one among replacement of the rotary motor and adjustment of the first angle adjustment mechanism, from front surface of the fiber selector, when defining a surface of the fiber selector which is visible in a case of viewing the fiber selector from a direction facing the first reflecting member from the focusing optical system, as the front surface of the fiber selector.

According to a ninth aspect of the present invention, in the fiber selector as described in any of the first to eighth aspects, a focusing optical system unit (for example, the focusing optical system unit U1 described later) may be configured to include at least one of the first reflecting members, the rotary motor which causes the first reflecting member to rotationally move, and the focusing optical system corresponding to the first reflecting member, and the focusing optical system unit may be provided to be replaceable from a front surface of the fiber selector, when defining a surface of the fiber selector which is visible in a case of viewing the fiber selector from a direction facing the first reflecting member from the focusing optical system, as the front surface of the fiber selector.

According to a tenth aspect of the present invention, in the fiber selector as described in any one of the first to ninth aspects, for at least one of the first reflecting members, a center of gravity of said first reflecting member when at the first position may be above the center of gravity of said first reflecting member when the first reflecting member is at the second position.

According to an eleventh aspect of the present invention, the fiber selector as described in any one of the first to tenth aspects may further include: stoppers (for example, the stoppers 601, 602 described later) which restrict a rotation angle range of the first reflecting member; and an elastic member (for example, the spiral spring 603 described later) that generates a force, other than the rotary motor, causing the first reflecting member to rotationally move, in which the first reflecting member may be configured so as to rotationally move, when the rotary motor does not generate a force causing the first reflecting member to rotationally move, up to one end of the rotational movement range by the elastic member, and the first reflecting member moves to the second position.

According to a twelfth aspect of the present invention, the fiber selector as described in any one of the first to eleventh aspects may further include: a second reflecting member (for example, the second reflecting member 7 described later) having a reflecting surface (for example, the reflecting surface 7a described later) that reflects the laser-beam from the collimating optical system towards the first reflecting member, in which the second reflecting member may be arranged so that an optical axis of a laser beam from the collimating optical system towards the second reflecting member and an optical axis of a laser beam from the first reflecting member towards the focusing optical system are parallel, and a propagating direction of the laser beam from the collimating optical system towards the second reflecting member is an opposite direction relative to the propagating direction of the laser beam from the first reflecting member towards the focusing optical system.

According to a thirteenth aspect of the present invention, the fiber selector as described in the twelfth aspect may further include: a second angle adjustment mechanism that adjusts an optical axis angle including a flap angle of the reflecting surface of the second reflecting member, in which the second angle adjustment mechanism may be provided to be adjustable from a front surface of the fiber selector, when defining a surface of the fiber selector which is visible in a case of viewing the fiber selector from a direction facing the first reflecting member from the focusing optical system, as the front surface of the fiber selector.

According to a fourteenth aspect of the present invention, in the fiber selector as described in the twelfth or thirteenth aspect, a collimating optical system unit (for example, the collimating optical system unit U2 described later) may be configured to include at least the second reflecting member and the collimating optical system, and the collimating optical system unit may be provided to be replaceable from a front surface of the fiber selector, when defining a surface of the fiber selector which is visible in a case of viewing the fiber selector from a direction facing the first reflecting member from the focusing optical system, as the front surface of the fiber selector.

A laser apparatus (for example, the laser apparatus 10 described later) according to a fifteenth aspect of the present invention includes: the fiber selector as described in any one of the first to fourteenth aspects inside of a housing (for example, the housing 14 described later), the laser apparatus inputting a laser beam (for example, the laser beam L described later) outputted from a laser oscillator (for example, the laser oscillator 11 described later) to the fiber selector via an input optical fiber, and selectively emits the laser beam outputted from the fiber selector from a plurality of output optical fibers, in which the housing has an openable front surface panel (for example, the front panel 15 described later); and the fiber selector is installed so that the rotary motor is positioned more in front than the first reflecting member of the fiber selector, when opening the front surface panel.

According to the present invention, it is possible to provide a fiber selector that not only switches the output optical fibers at high speed and high coupling efficiency is obtained, but also can be adjusted in a short time easily, including being simultaneously adjustable for the optical axis angle adjustment of the reflecting surface of the reflecting member, and focal position adjustment and optical axis angle adjustment of the focusing optical system, and enables replacing the rotary motor, optical components, etc. in a short time easily, as well as being able to reduce the size over that conventionally.

In addition, according to the present invention, it is possible to provide a laser apparatus in which the adjustment required in the fiber selector, and replacement of principle components of the fiber selector can be conducted in a short time easily from the front or a maintenance side of the apparatus, re-adjustment after replacement can be done in a short time easily, as well as being superior in maintenance properties, and thus being able to suppress running cost, and being able to minimally suppress a size increase due to including the fiber selector.

DETAILED DESCRIPTION OF THE INVENTION

Figure 1:
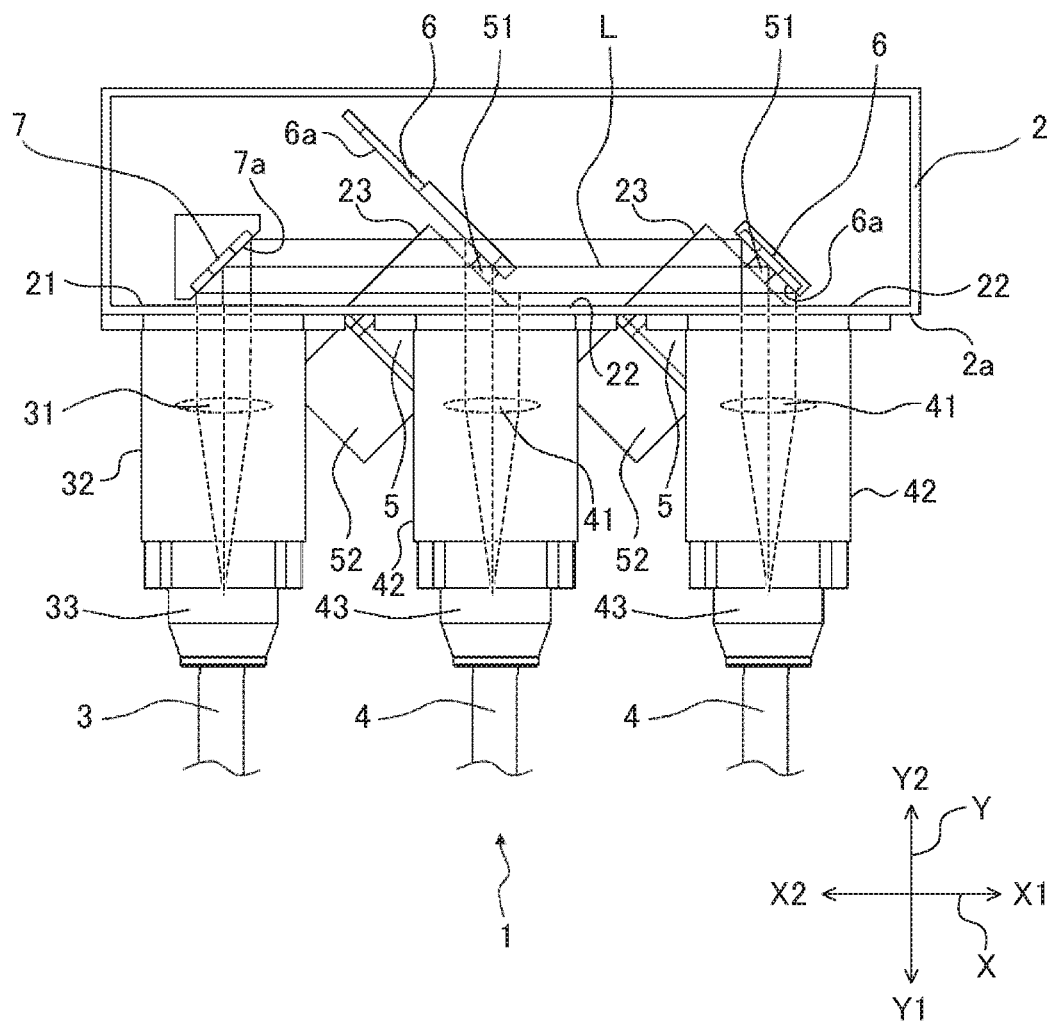
FIG. 1 is a plan view showing a fiber selector according to a first embodiment of the present invention.

Hereinafter, embodiments of a fiber selector and laser apparatus according to the present invention will be explained by referencing the drawings. In the respective drawings shown below, the same reference numbers will be attached to the same members. In addition, components to which the same reference numbers are attached in different, drawings shall indicate being components having the same function. It should be noted that these drawings modify the scaling as appropriate for easy viewing. In addition, the form shown in the drawings is one example for realizing the present invention, and the present invention is not to be limited to the form illustrated.

First Embodiment of Fiber Selector

Figure 2:
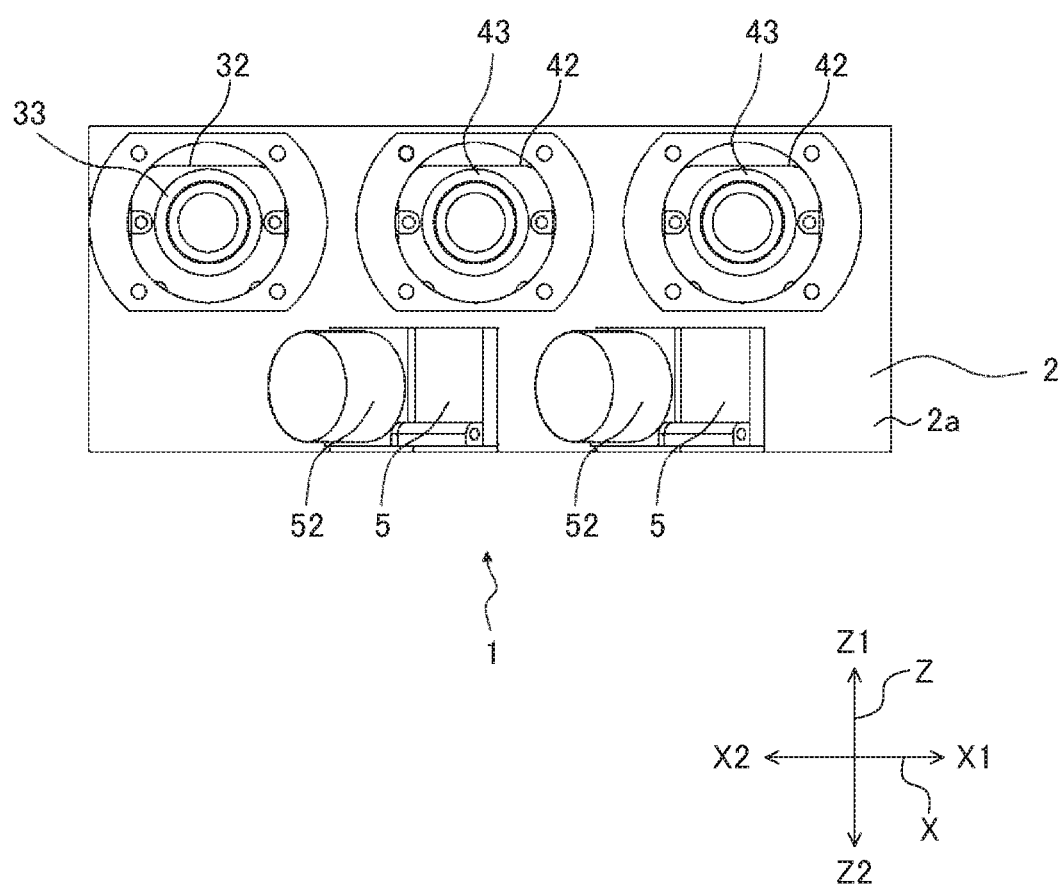
FIG. 2 is a front view showing the fiber selector according to the first embodiment of the present invention.
Figure 3:
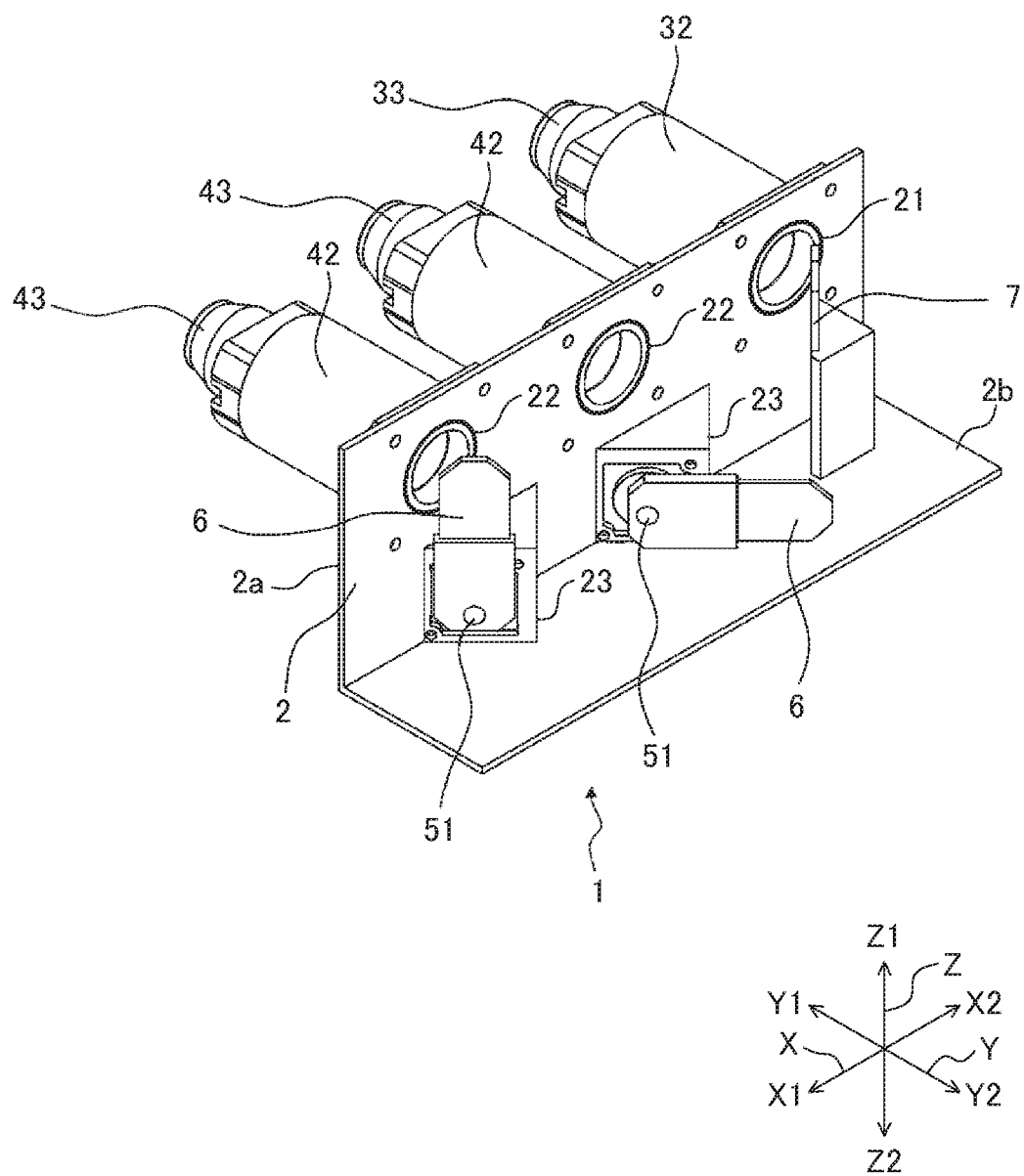
FIG. 3 is a perspective view showing the fiber selector according to the first embodiment of the present invention.
Figure 4:
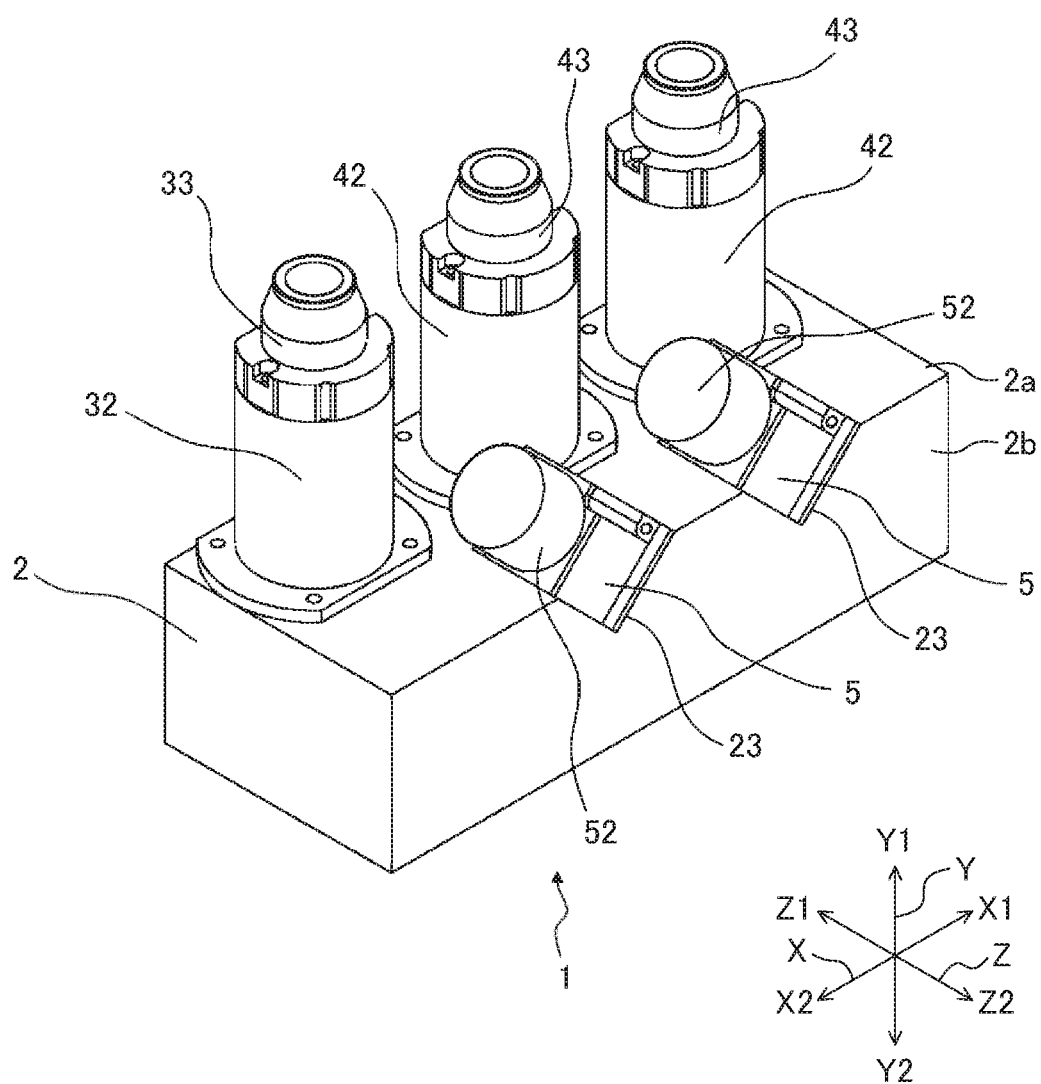
FIG. 4 is a perspective view looking at the fiber selector according to the first embodiment of the present invention from another direction.
Figure 5:
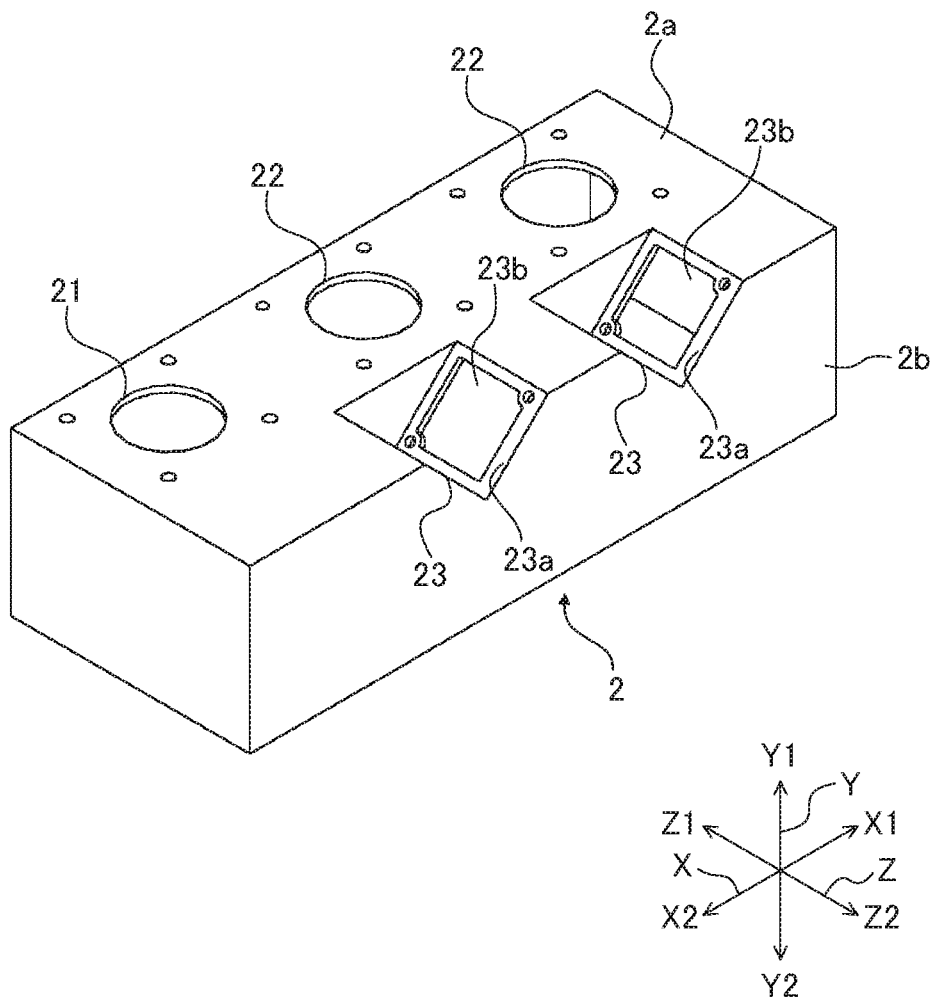
FIG. 5 is a perspective view showing a case used in the fiber selector according to the first embodiment of the present invention.

FIG. 1 is a plan view of a fiber selector 1 according to a first embodiment of the present invention, and FIG. 2 is a front view of the fiber selector according to the first embodiment of the present invention. FIG. 2 shows a state viewing the fiber selector from a side of a focusing optical system. In addition, FIG. 3 is a perspective view showing the fiber selector according to the first embodiment of the present invention; FIG. 4 is a perspective view looking at the fiber selector according to the first embodiment of the present invention from another direction; and FIG. 5 is a perspective view showing a case used in the fiber selector according to the first embodiment of the present invention.

It should be noted that, in each of the drawings shown in the respective embodiments below, the X-axis direction indicates a lengthwise direction (also referred to as lateral direction) of the fiber selector 1. In addition, the X1 direction in the X-axis direction indicates the right direction of the fiber selector 1, and the X2 direction indicates the left direction of the fiber selector 1. The Y-axis direction indicates the front-back direction of the fiber selector 1. In addition, the Y1 direction in the Y-axis direction indicates the front direction of the fiber selector 1, and the Y2 direction indicates the back direction of the fiber selector 1. The Z-axis direction indicates the vertical direction of the fiber selector 1. In addition, the Z1 direction in the Z-axis direction indicates the up direction of the fiber selector 1, and the Z2 direction indicates the down direction of the fiber selector 1.

The fiber selector 1 includes a case 2 that is substantially rectangular parallelepiped shape in the lateral length. The case 2 has one incident opening 21 to which a laser beam L is incident, and a plurality of exit openings 22 at which the laser beam L emits. The one incident opening 21 and plurality of exit openings 22 are arranged on one line along the lengthwise direction (X-axis direction) of the case 2 in a front surface plate 2a, which is the same plane of the case 2. In the present embodiment, two of the exit openings 22 are exemplified; however, the exit openings 22 of the present invention are not limited to two. The number of exit openings 22 corresponds to the connection number of output optical fibers 4 described later for selectively emitting the laser beam L. Therefore, three or more of the exit openings 22 can be provided in the case 2.

It should be noted that the top plate of the case 2 is made hidden so that the internals of the case 2 of the fiber selector 2 are visible in FIG. 1. In addition, FIG. 1 shows the laser beam L by a fine line. A laser beam which cannot be seen from outside, and reflected light that was reflected by the reflecting member not reflecting the laser beam in the illustrated state are shown by dotted lines. In addition, in FIG. 3, the case 2 is made entirely hidden excluding the front surface plate 2a and bottom surface plate 2b of the case 2, so that the internals of the case are visible.

The input optical fiber 3 is connected to the incident opening 21 via a collimating optical system 31. More specifically, a cylindrical lens barrel 32 is connected to the incident opening 21, and the collimating optical system 31 is arranged within this lens barrel 32. The input optical fiber 3 is connected to the lens barrel 32 via a connector 33. Therefore, the laser beam L emitted from the emitting end face of the input optical fiber 3 is transformed into parallel light by the collimating optical system 31, and comes to be incident in the case 2 through the incident opening 21.

The output optical fibers 4 are connected to the respective exit openings 22 via each of the focusing optical systems 41. More specifically, each of the cylindrical lens barrels 42 is connected to a respective exit opening 22, and the focusing optical systems 41 are each arranged within this lens barrel 42. The respective output optical fibers 4 are connected to the lens barrel 42 via the connector 43. Therefore, the laser beam L is focused at the incident end face of the corresponding output optical fiber 4 by any of the focusing optical systems 41, and comes to be emitted to outside of the case 2 via this output optical fiber 4.

At the outer surface of the case 2, two rotary motors 5 corresponding to the respective exit openings 22 are mounted to be replaceable lower (Z2 direction) than the one incident opening 21 and two exit openings 22 arranged in line. More specifically, in the front surface plate 2a of the case 2, two motor mounting recesses 23 which are indented in a V-shape are respectively formed below the middle between the incident opening 21 and adjacent exit opening 22 thereof, and below the middle of the two exit openings 22. The respective motor mounting recesses 23 indent so as to obliquely intersect at a 45° angle relative to the front surface plate 2a, and have a right-angled bottom. As shown in FIG. 5, a motor mounting surface 23a is arranged on the surface intersecting with the V-shape of the respective motor mounting recesses 23 at a side in the X1 direction of the case 2. In each of the motor mounting surfaces 23a, a rectangular motor mounting hole 23b is formed. The respective rotary motors 5 are mounted from the front (Y1 direction) of the case 2 to the motor mounting surface 23a of the motor mounting recess 23.

The shaft 51 of each rotary motor 5 extends from the motor mounting hole 23b to inside of the case 2. The shaft 51 is the shaft of the rotary motor 5. The shaft 51 of each rotary motor 5 slopes at a 45° angle relative to the front surface plate 2a of the case 2. The first reflecting members 6 are respectively fixed at the leading end of each shaft 51. A first reflecting member 6 has a reflecting surface 6a consisting of a flat surface on one surface. The first reflecting members 6 are mounted so that the respective reflecting surfaces 6a are perpendicular to the axial direction of the shafts 51. For this reason, the reflecting surface 6a of the respective first reflecting members 6 slope at 45° relative to the front surface plate 2a of the case 2, as shown in FIG. 1.

It should be noted that "reflecting surface perpendicular" does not necessarily have the meaning of the reflecting surface being strictly mounted perpendicular relative to the axial direction of the shaft, and means being mounted so as to be perpendicular in terms of design. Therefore, "reflecting surface perpendicular" also includes a case of not being perfectly perpendicular due to variation in component precision and mounting precision, i.e. case of substantially perpendicular. For this reason, the specific angles (45°, right angle) in the present disclosure does not necessarily represent the angle in strict meaning for the same reason as described above.

The rotary motors 5 respectively include angle sensors 52. A control unit (not illustrated) of the fiber selector 1 controls the rotation angle of the shaft 51 of the rotary motor 5 by receiving a signal outputted from the angle sensor 52. According to the rotation of this shaft 51, the first reflecting member 6 rotationally moves in the range of predetermined angles. More specifically, the first reflecting member 6 rotationally moves between a first position blocking and reflecting the laser beam L by the reflecting surface 6a, and a second position which does not block the laser beam L, accompanying the rotation of the shaft 51 of the rotary motor 5. The first reflecting member 6 on the right side in FIG. 1 shows a state rotationally moved to the first position, and the first reflecting member 6 on the left side in FIG. 1 shows a state rotationally moved to the second position. The reflecting surface 6a of the first reflecting member 6 is arranged so as to obliquely intersect at 45° on the optical axis of the focusing optical system 41 connected to the corresponding exit opening 22, when rotationally moved to the first position.

It should be noted that the control unit of the fiber selector 1 controlling the rotary motor 5, etc. may be installed inside of the fiber selector 1, or may be installed outside of the fiber selector 1. In addition, a control unit 13 of the laser apparatus 10 described later may have the functions of the control unit of the fiber selector 1.

The respective reflecting surfaces 6a of each of the first reflecting members 6 are arranged so as to face the direction of the respective rotary motors 5 which cause the shaft 51 to which the first reflecting member 6 is fixed to rotate. In other words, the respective rotary motors 5 are arranged on the same side as the side at which the laser beam L reflects, with a plane including the reflecting surface 6a of the first reflecting member 6 as the border. According to this configuration, the respective rotary motors 5 are arranged on a front surface side of the case 2 (side facing the Y1 direction), similarly to the lens barrel 32 which includes the collimating optical system 31 and the respective lens barrels 42 which each include a focusing optical system 41.

Inside of the case 2 in the vicinity of the incident opening 21, a second reflecting member 7 is installed. The second reflecting member 7 shown in the present embodiment is fixed to the bottom surface plate 2b, as shown in FIG. 3. The second reflecting member 7 has a reflecting surface 7a consisting of a flat surface on one side. The reflecting surface 7a of the second reflecting member 7 obliquely slopes at −15° relative to the front surface plate 2a of the case 2, as shown FIG. 1. Therefore, the collimated laser beam L, incident by passing through the incident opening 21 changes propagating direction at a right angle by the reflecting surface 7a of the second reflecting member 7, and propagates within the case 2 in the X1 direction.

The reflecting surface 6a of the respective first reflecting members 6, when the first reflecting member 6 rotationally moves to reside at the first position reflecting the laser beam L, is arranged so as to intersect at an angle of 45° on the light path of the laser beam L, propagating within the case 2 in the X1 direction. Therefore, the laser beam L reflected by the second reflecting member 7 changes propagating direction at a right angle by the reflecting surface 6a of any first reflecting member 6 selected so as to assume the first position (first reflecting member 6 on right side in FIG. 1), and heads to the exit opening 22 corresponding to this first reflecting member 6. The laser beam L, reflected by the first reflecting member 6 is focused by the focusing optical system 41 within the lens barrel 42 connected to the exit opening 22, and is incident on the incident end face of the output optical fiber 4. In other words, this fiber selector 1, by rotationally moving each of the first reflecting members 6 between the first position and second position by way of rotation of the shaft 51 of the rotary motor 5, switches the propagating direction of the laser beam L, incident from the incident opening 21 to a direction towards any among the output optical fibers 4 connected to each of the respective exit openings 22, and comes to emit the laser beam selectively from a plurality of the output optical fibers 4.

In the above way, according to the fiber selector 1 shown in the present embodiment, it is possible to arrange the lens barrel 42 including the focusing optical system 41, and the rotary motor 5 on the same side (front surface plate 2a side) of the case 2 relative to the first reflecting member 6. Therefore, optical axis angle adjustment and focal position adjustment of the respective focusing optical systems 41, optical axis angle adjustment including the flap angle of the reflecting surface 6a of the respective first reflecting members 6 via the rotary motor 5, replacement of the respective rotary motors 5, etc. are made possible to perform from the front surface side of the fiber selector 1. For this reason, it is possible to shorten the time required in adjustment, such as making simultaneous adjustment of these possible, as well as decreasing the space to be secured for adjustment. It should be noted that the mechanisms for focal position adjustment and optical axis angle adjustment are not illustrated herein. The specific configurations of this focal position adjustment mechanism and optical axis angle adjustment mechanism (first angle adjustment mechanism) are described later.

Figure 47:
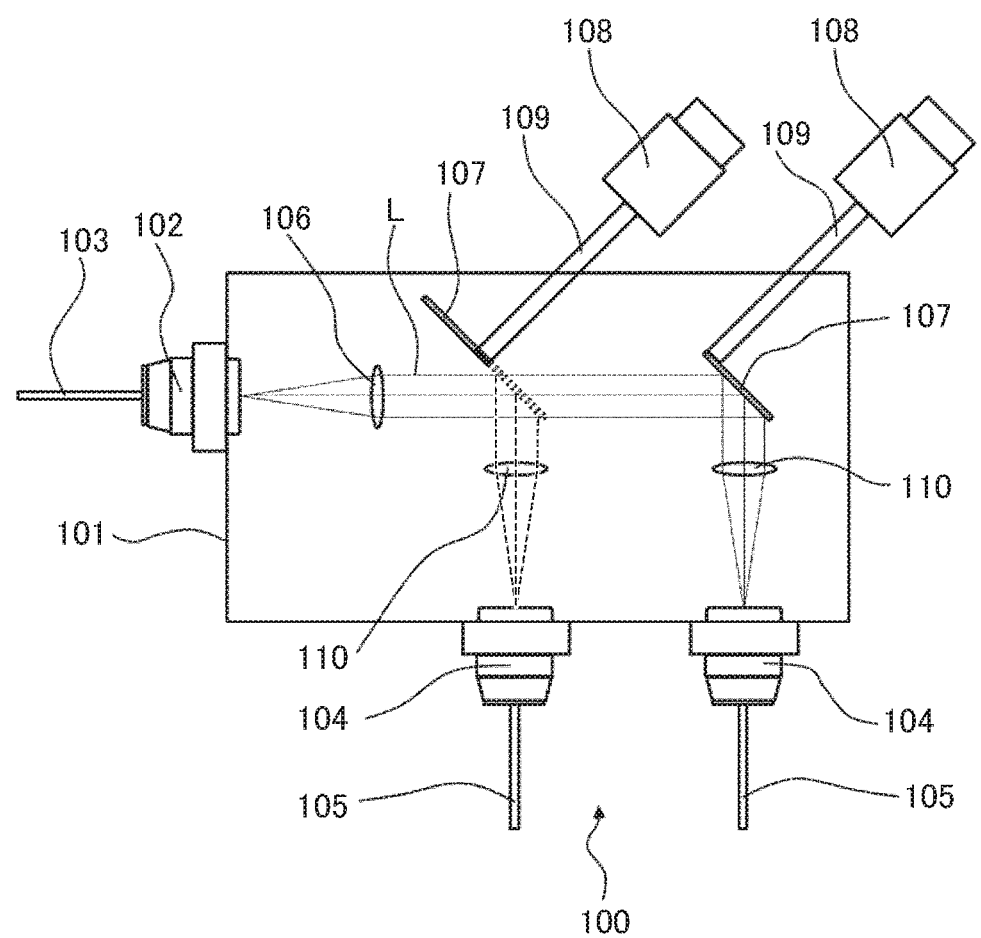
FIG. 47 is a plan view showing a conventional fiber selector.

In addition, as understood when viewing the first reflecting member 6 on the left side residing at the first position in FIG. 3, the reflecting surface 6a of the first reflecting member 6 is arranged at a position separated a certain extent from the shaft 51 in order to allow the laser beam L to be reflected; therefore, this first reflecting member 6 enters a state standing up in the Z1 direction when residing at the first position. For this reason, the case 2 of the fiber selector 1 requires a certain height along the Z-axis direction. However, according to the fiber selector 1 shown in the present embodiment, even if arranging a plurality of the lens barrels 42 and a plurality of the rotary motors 5 on the same side relative to the first reflecting member 6, the height of the fiber selector 1 will only be increased slightly. For this reason, since the footprint area can be considerably reduced, it is possible to curb the size (inclusive volume) of the fiber selector 1 to be small. For example, in the case of the vertical cross-section to the shaft 51 of the rotary motor 5 being 40 mm square and the beam diameter of the laser beam L being φ20 mm, the height in the Z-axis direction of the case 2 of the fiber selector 1 is sufficient by simply raising on the order of 10 to 15 mm compared to the structure of a conventional fiber selector 100 shown in FIG. 47.

On other hand, when arranging a plurality of the lens barrels 42 and a plurality of the rotary motors 5 on the same side relative to the first reflecting member C, since the installation area of the fiber selector 1 can be considerably reduced, it is possible to considerably decrease the size (inclusive volume) of the fiber selector 1, and make compact. The drawings showing the present embodiment, for facilitating understanding, depict the pitch of each lens barrel to be relatively wide; however, this pitch may be more confined.

The second reflecting member 7 is arranged so that the optical axis of the laser beam L incident from the collimating optical system 31 towards the second reflecting member 7 and the optical axis of the laser beam L reflected by the reflecting surface 6a of the first reflecting member 6 towards the focusing optical system 41 are parallel, and the propagating direction (Y2 direction) of the laser beam L incident from the collimating optical system 31 towards the second reflecting member 7 becomes the reverse direction to the propagating direction (Y1 direction) of the laser beam reflected by the reflecting surface 6a of the first reflecting member 6 towards the focusing optical system 41. According to this configuration, the lens barrel 32 including the collimating optical system 31 is also arranged on the side of the front surface plate 2a of the case 2, similarly to the lens barrel 42 including the focusing optical system 41, and rotary motor 5, as shown in FIGS. 1 to 5. Therefore, the optical axis angle adjustment and focal position adjustment of the collimating optical system 31 are also able to be performed from the front surface side of the fiber selector 1.

It should be noted that "optical axis parallel" does not necessarily mean that the optical axes are arranged strictly parallel, and means being arranged so as to be parallel in terms of design. Therefore, "optical axis parallel" includes a case of not being perfectly parallel due to variation in component precision and mounting precision, i.e. case of substantially parallel.

Second Embodiment of Fiber Selector

Figure 6:
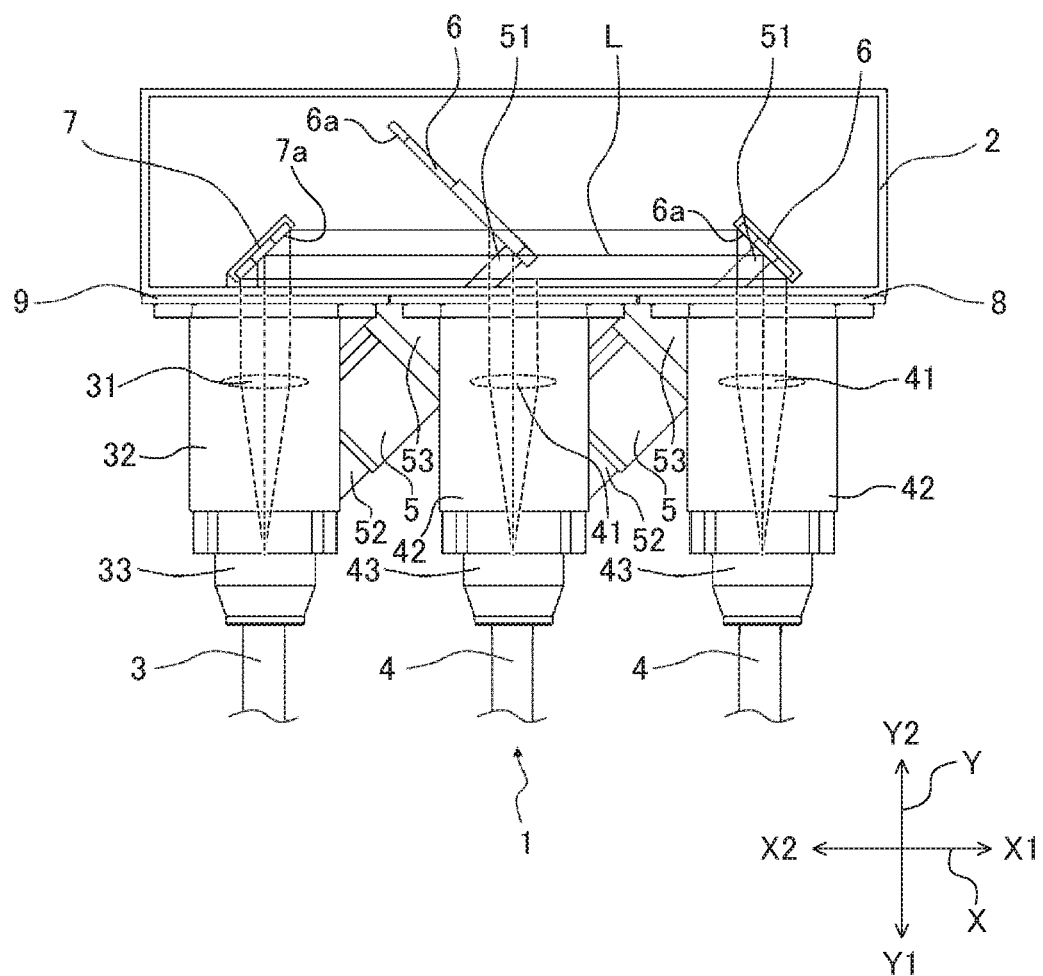
FIG. 6 is a plan view showing a fiber selector according to a second embodiment of the present invention.
Figure 7:
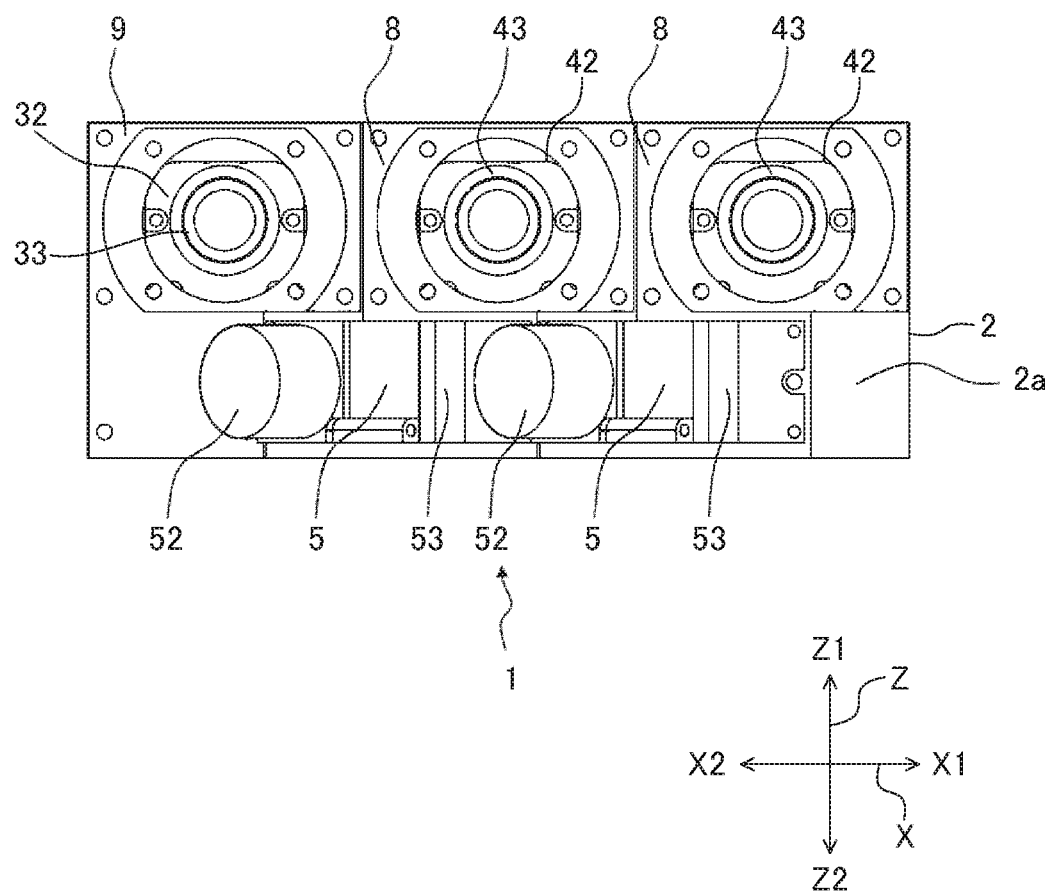
FIG. 7 is a front view showing the fiber selector according to the second embodiment of the present invention.
Figure 8:
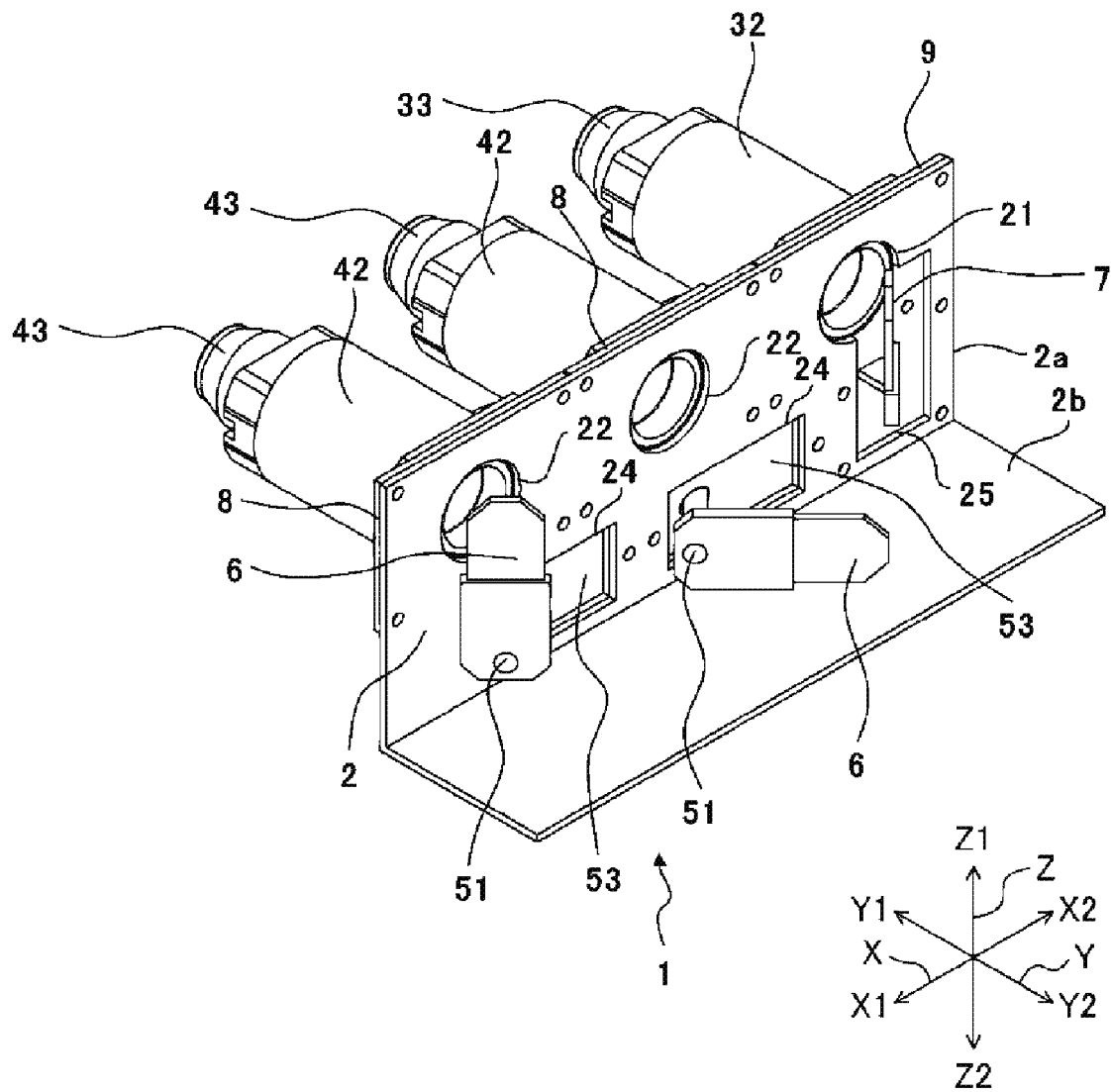
FIG. 8 is a perspective view showing the fiber selector according to the second embodiment of the present invention.
Figure 9:
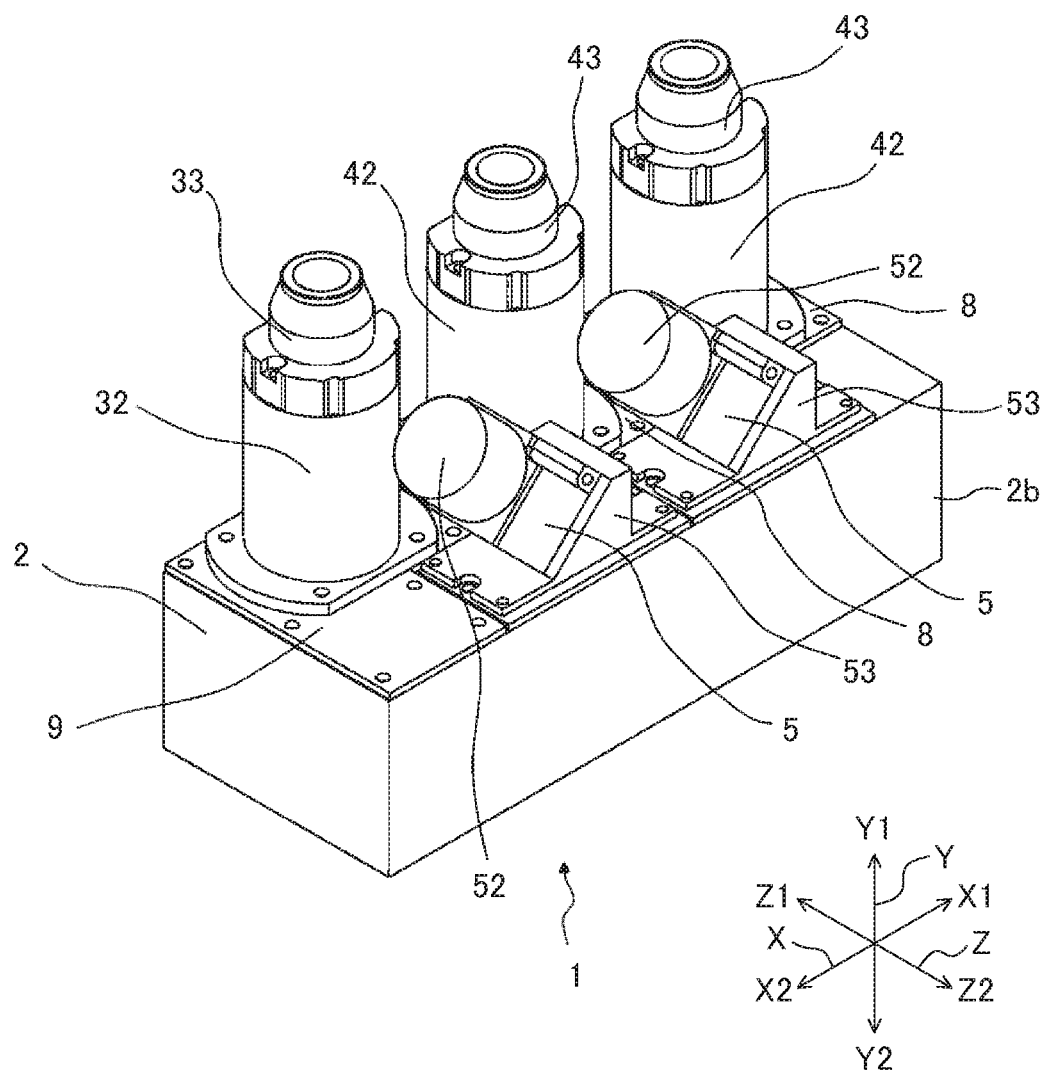
FIG. 9 is a perspective view looking at the fiber selector according to the second embodiment from another direction.
Figure 10:
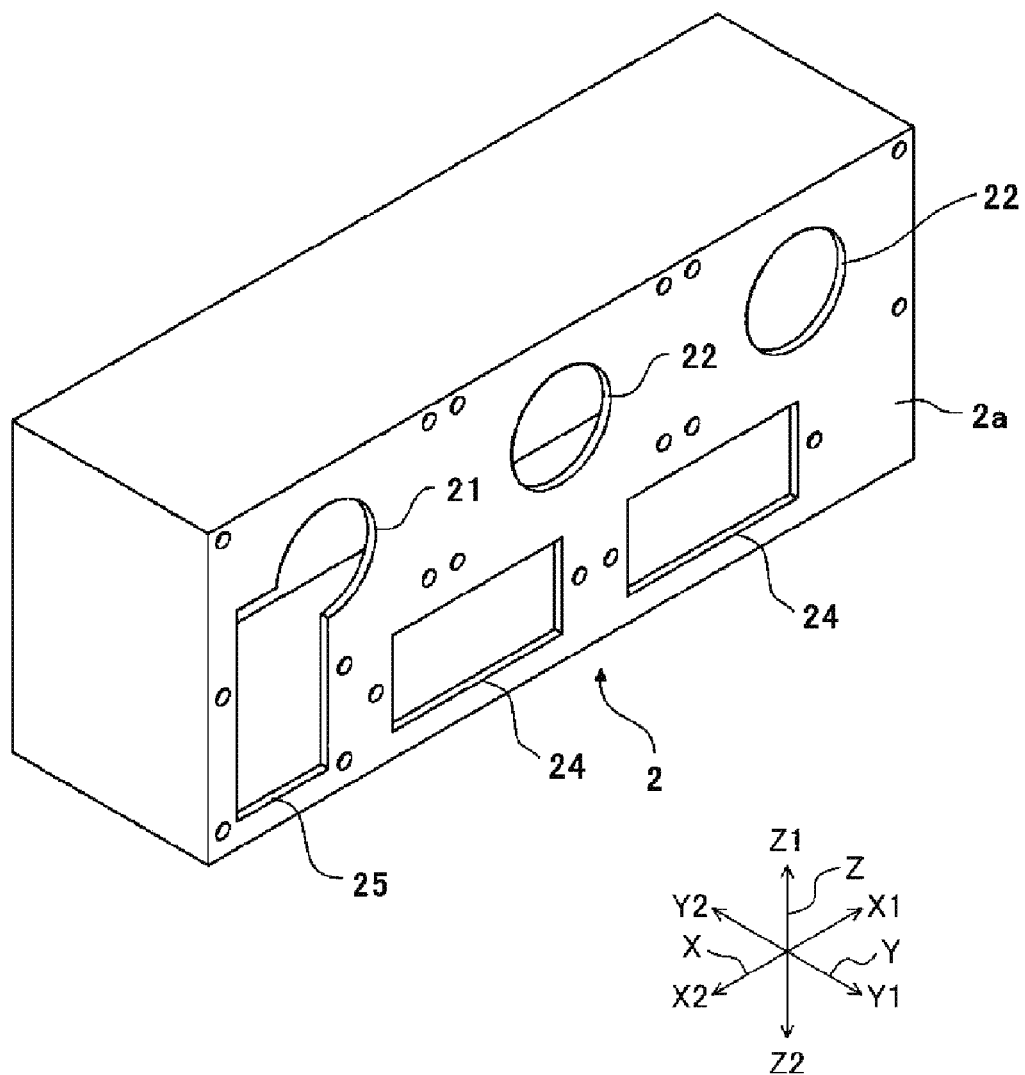
FIG. 10 is a perspective view showing a case used in the fiber selector according to the second embodiment of the present invention.

FIG. 6 is a plan view of a fiber selector according to a second embodiment of the present invention. FIG. 7 is a front view of the fiber selector according to the second embodiment of the present invention. FIG. 8 is a perspective view showing the fiber selector according to the second embodiment of the present invention. FIG. 9 is a perspective view looking at the fiber selector according to the second embodiment of the present invention from another direction. FIG. 10 is a perspective view showing the case used in the fiber selector according to the second embodiment of the present invention. The top plate of the case 2 is made hidden so that the internals of the case 2 of the fiber selector 1 are visible in FIG. 6. In addition, the laser beam L is shown by a fine line in FIG. 6. A laser beam which cannot be seen from outside, and reflected light by the reflecting surface 6a of the first reflecting member 6 that is not reflecting the laser beam L in the illustrated state are shown by dotted lines. In addition, in FIG. 8, the case 2 is made hidden except for the front surface plate 2a and bottom plate 2b of the case 2, so that the internals are visible.

The point by which the fiber separator 1 shown in the second embodiment mostly differs from the fiber selector 1 shown in the first embodiment is the point of the case 2 not having motor mounting recesses 23 indented in a V-shape. As shown in FIGS. 8 and 10, the front surface plate 2a of the case 2 in the present embodiment is a flat surface, and two rectangular motor mounting holes 24 are formed at sites at which the rotary motor 5 is to be arranged. The motor mounting member 53 is provided to correspond to the rotary motor 5, and a motor unit is configured by the rotary motor 5 and the motor mounting member 53. The motor mounting member 53 mounts the rotary motor 5 to be sloped so that the shaft 51 of the rotary motor 5 intersects at a 45° angle relative to the front surface plate 2a of the case 2.

The respective rotary motors 5 are replaceably mounted to the respective motor mounting holes 24 from the front side of the case 2 (Y1 direction side) as a motor unit entity. In other words, the mounting surface of the rotary motor 5 is the same plane as the front surface plate 2a of the case 2, and is the same plane as with the mounting surface of the respective lens barrels 32, 42. As a result thereof, as shown in FIG. 10, the shape of the case 2 is very simple compared to the case 2 shown in FIG. 5, whereby a reduction in manufacturing cost is possible.

Figure 11:
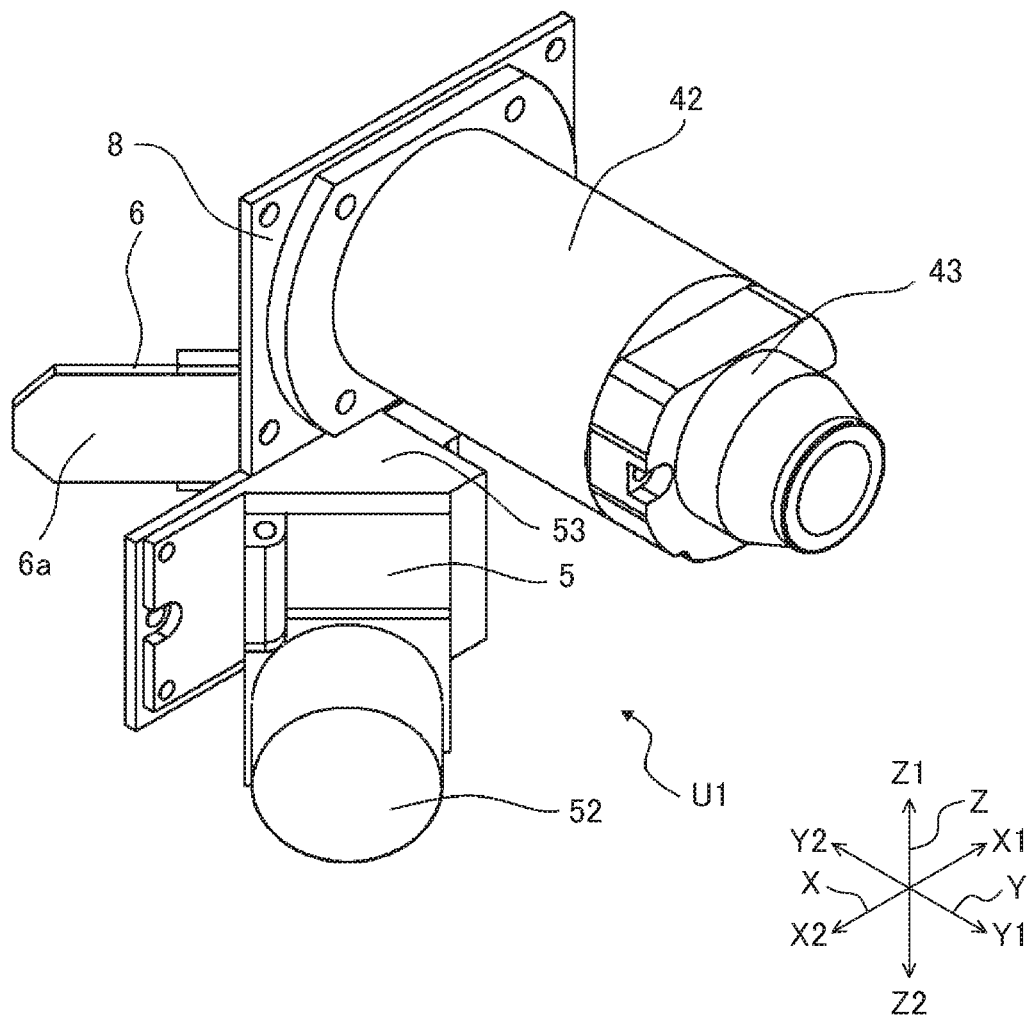
FIG. 11 is a perspective view showing a focusing optical system unit used in the fiber selector according to the second embodiment of the present invention.

FIG. 11 is a perspective view showing the focusing optical system unit used in the fiber selector according to the second embodiment of the present invention. The focusing optical system unit U1 is configured to have a unit configured by the rotary motor 5 in which the first reflecting member 6 is mounted to the shaft 51, and the motor mounting member 53; and the lens barrel 42 including the focusing optical system 41. These are mounted to the front of one shared unit base plate 8 (side facing Y1 direction). The shaft 51 of the rotary motor 5 penetrates the unit base plate 8, and projects from the back side (side facing the Y2 direction) of the unit base plate 8. The first reflecting member 6 is arranged on the back side of the unit base plate 8. This focusing optical system unit U1 is replaceably mounted from the front surface side to the case 2. The first reflecting member 6 is inserted from the front surface side of the case 2 relative to the motor mounting hole 24, and is arranged at a predetermined position within the case 2.

The effects from using such a focusing optical system unit U1 are as follows. The focusing optical system unit U1 is incorporated into a standard fiber selector or the like which is not illustrated, and makes possible optical axis angle adjustment including the flap angle of the reflecting surface 6a of the first reflecting member 6, focal position adjustment and optical axis angle adjustment of the focusing optical system unit 41, per unit entity in advance. Then, with the adjusted focusing optical system unit U1, upon any component in the plurality of focusing optical system units U1 of the fiber selector 1 breaking or coming to malfunction, this unit U1 can be replaced on site with a spare focusing optical system unit U1 for which adjustment was done in advance. The fiber selector 1 thereby comes to be quickly restorable without adjustment, or by minimal adjustment. Therefore, by using such a focusing optical system unit U1, the replacement maintenance work time including the adjustment work can be drastically shortened. In addition, since it is not necessary to replace the entirety of the fiber selector 1, the running costs including the maintenance cost can be drastically lowered.

Figure 12:
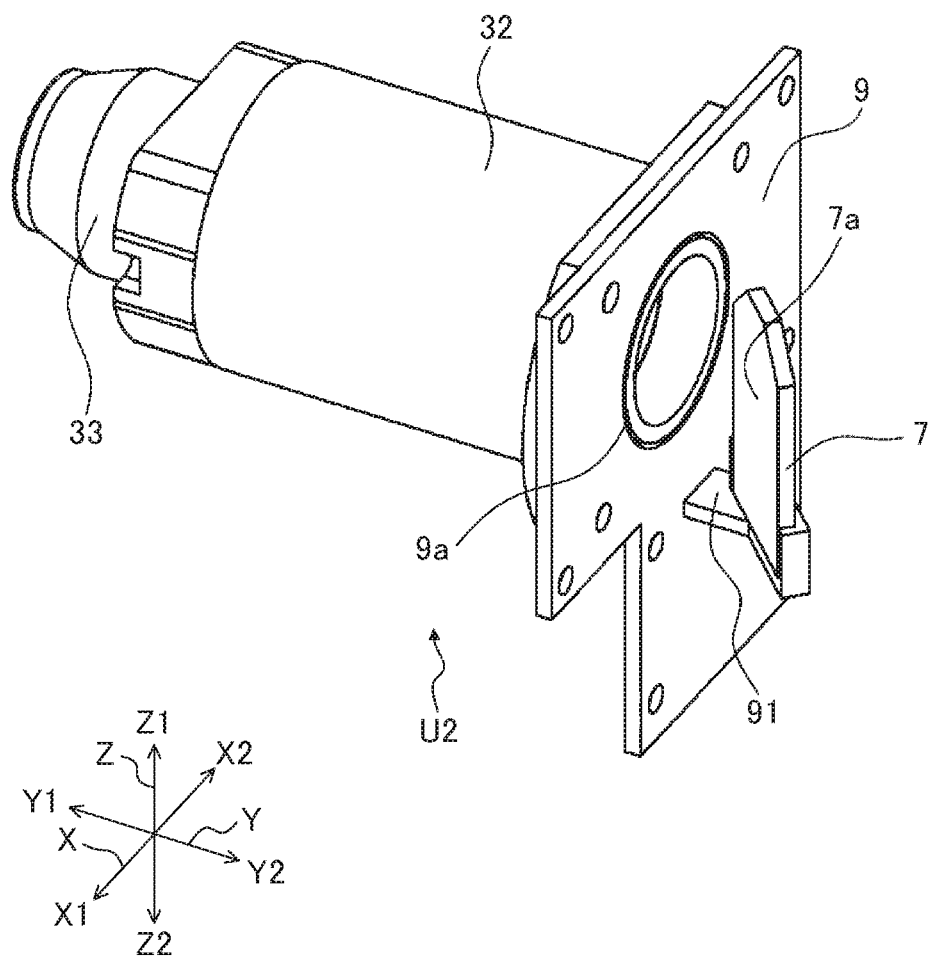
FIG. 12 is a perspective view showing a collimating optical system unit used in the fiber selector according to the second embodiment of the present invention.

FIG. 12 is a perspective view snowing the collimating optical system unit used in the fiber selector according to the second embodiment of the present invention. The collimating optical system unit U2 is configured to have a lens barrel 32 including the collimating optical system 31, and the second reflecting member 7. This lens barrel 32 and second reflecting member 7 are mounted to one shared unit, base plate 9. The lens barrel 32 is mounted to the front of the unit base plate 9 (side facing Y1 direction). The unit base plate 9 has a through hole 9a for allowing the laser beam from the collimating optical system 31 within the lens barrel 32 to be incident on the reflecting surface 7a of the second reflecting member 7. The second reflecting member 7 is mounted by a second reflecting member support component 91 to the back side (side facing Y2 direction) of the unit base plate 9.

As shown in FIGS. 8 and 10, a second reflecting member mounting hole 25 linked with the incident hole 21 is formed in the front surface plate 2a of the case 2. This collimating optical system unit U2 is also replaceably mounted from the front surface side to the case 2.

The second reflecting member support component 91 of the collimating optical system unit U2 may have an angle adjustment mechanism (second angle adjustment mechanism) that is not illustrated for adjusting the angle of the second reflecting member 7 relative to the unit base plate 9. It thereby becomes possible to perform adjustment of the optical axis angle including the flap angle of the reflecting surface 7a of the second reflecting member 7 from the front surface side of the fiber selector 1. If optical axis angle adjustment of the reflecting surface 7a of the second reflecting member 7 also becomes possible from the front surface side of the fiber selector 1, it becomes such that all adjustment and maintenance can be conducted from the front surface side of the fiber selector 1. This angle adjustment mechanism will be described later.

The merit in that this collimating optical system unit U2 is replaceable as a unit entity is similar to the merit in that the focusing optical system unit U1 is replaceable as a unit entity. However, this fiber selector 1 according to the second embodiment, compared to the fiber selector 1 according to the first embodiment, requires lengthening the length of the shaft 51 of the rotary motor 5, as is understood even when comparing FIG. 1 with FIG. 6. For this reason, the shaft 51 of the rotary motor 5 is extended as necessary. In order to prevent shake of the extended shaft 51, a bearing (not illustrated) may be provided in the vicinity of the leading end of the shaft 51.

It should be noted that, for either the fiber selectors 1 according to the first embodiment and second embodiment of the present invention, in the case of all of the first reflecting members 6 residing at the second position not blocking the laser beam L, it is necessary for the laser beam L, advancing straight without interfering with the first reflecting member 6 to be absorbed by an absorber, also from the viewpoint of safety. However, in the respective drawings showing the internals of the case 2, illustration of the absorber is omitted for simplifying the drawing.

In addition, another safety measure may be conducted on the first reflecting member 6. For example, it may be configured so that the position of the center of gravity of the first reflecting member 6 when the first reflecting member 6 is residing at the first position is above (Z1 direction) the position of the center of gravity of the first reflecting member 6 when the first reflecting member 6 is residing at the second position. It is thereby possible for the first reflecting member 6 to rotationally move by its own weight to the second position that does not block the laser beam L, during emergency such as a case of the rotary motor 5 failing. Therefore, at is possible to prevent a situation in which the laser beam L reflected by the first reflecting member 6 is incident on an output optical fiber 4 that is not intended, and illuminated on an unintended location.

As in the fiber selector 1 according to the first embodiment and second embodiment, in the case of the rotary motor 5 being arranged on a side below (Z2 direction) the focusing optical system 41, the effect from the first reflecting member 6 rotationally moving by its own weight as described above is more remarkable. This is because, in this case, since the plane including the respective shafts 51 fixing the first reflecting member 6 becomes lower than the plane including the optical axis of the respective focusing optical systems 41, it is easy to create a situation where the first reflecting member 6 rotationally moves to the second position by its own weight. The center of gravity position of the first reflecting member 6 is adjustable by mounting weights to the first reflecting member 6. Therefore, in order to promote the rotational movement of the first reflecting member 6 by way of its own such weight, weights may be added as necessary to the first reflecting member 6.

Figure 13:
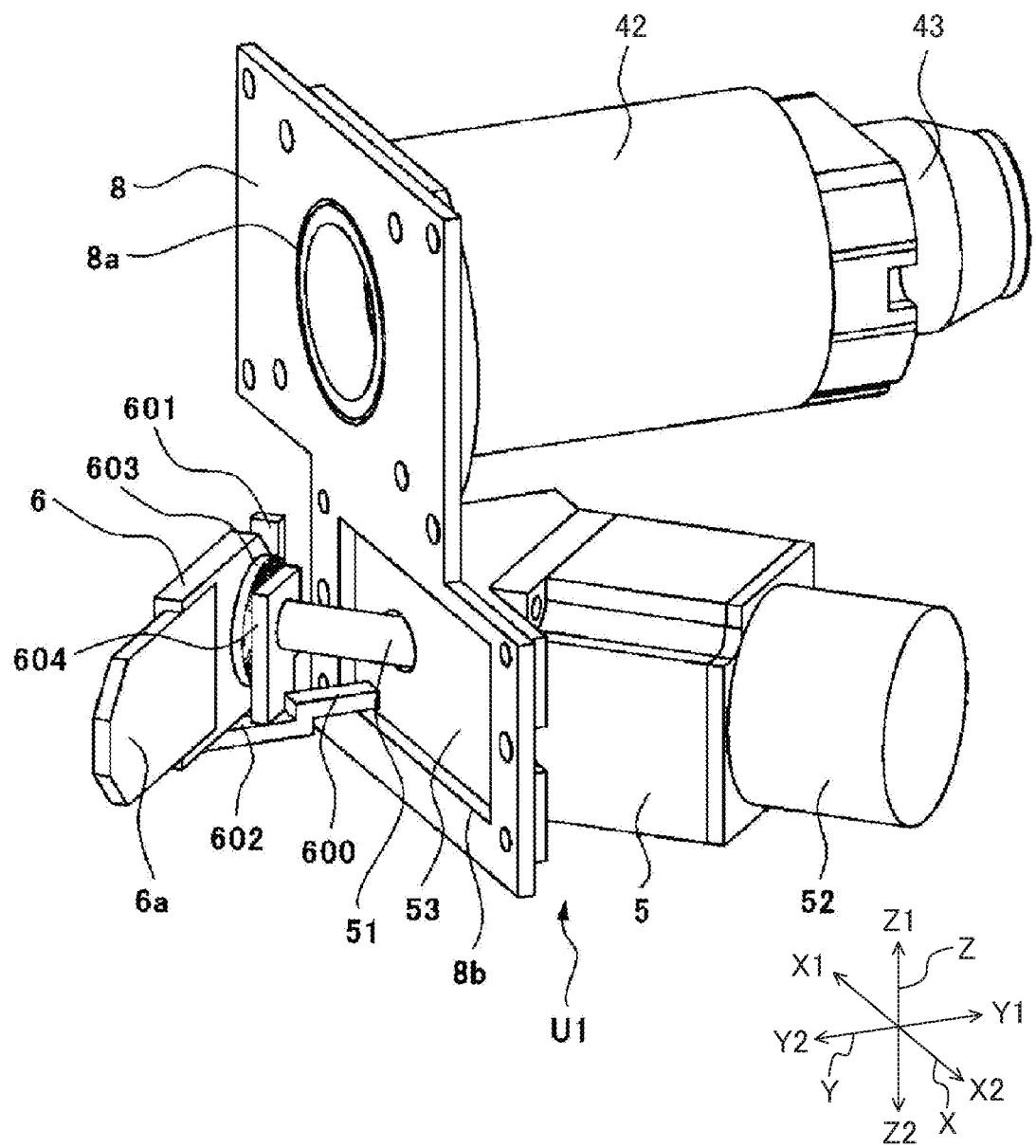
FIG. 13 is a perspective view showing an example of taking a safety measure in the focusing optical system unit used in the fiber selector according to the second embodiment of the present invention.

In addition, another safety measure may be conducted on the shaft (the shaft 51 or a second shaft 61 described later) that fixes the first reflecting member 6. FIG. 13 shows an example providing stoppers 601, 602 which restrict the rotation angle range of the first reflecting member 6, and a spiral spring 603 to the shaft (first shaft) in the focusing optical system unit U1 of the fiber selector 1 according to the second embodiment. The spiral spring 603 is an example of an elastic member which generates a biasing force in the rotation direction other than the rotary motor 5.

The stopper 601 abuts the first reflecting member 6 upon the first reflecting member 6 rotationally moving towards the first position from the second position, and regulates so that the first reflecting member 6 stops at the first position. In addition, the stopper 602 abuts the first reflecting member 6 upon the first reflecting member 6 rotationally moving towards the second position from the first position, and regulates so that the first reflecting member 6 stops at the second position. Therefore, the first reflecting member 6 can only rotationally move between the first position and second position regulated by the stoppers 601, 602.

The spiral spring 603 is wound around the shaft 51. One end of the spiral spring 603 is fixed to a spring fixing part 604, and the other end is fixed to the first reflecting member 6. The shaft 51 penetrates the spring fixing part 604 to be rotatable. The spiral spring 603 is setup in a state wound up to a certain extent in advance. When the torque of the rotary motor 5 is not being applied, the first reflecting member 6 is made to enter a state pushed against the stopper 602 by the force of the spiral spring 603 trying to return, and comes to reside at the second position.

Therefore, according to a safety measure having such stoppers 601, 602 and the spiral spring 603 serving as an elastic member, during an emergency such as a case of the rotary motor 5 failing, similarly to as mentioned above, the first reflecting member 6 can automatically rotationally move to the second position not blocking the laser beam L, by the elastic returning force of the spiral spring 603. For this reason, it is possible to prevent a situation in which the laser beam L reflected by the first reflecting member 6 is incident on an unintended output optical fiber 4, and is illuminated on an unintended location. It should be noted that the stoppers 603, 602 and the spring fixing part 604 are supported by an arm 600 fixed to the motor mounting member 53. The stopper 601 may not necessarily be provided, but it is desirable to provide for anticipating more safety.

A configuration that rotationally moves by its own weight mentioned previously may be further added to the first reflecting member 6. In addition, the first reflecting member 6 can rotationally move up to the second position without depending on a configuration that rotationally moves by its own weight, by including stoppers 901, 902 and a spiral spring 903; therefore, it is possible to arrange the rotary motor 5 above (Z1 direction) the focusing optical system 41. Replacement of the rotary motor 5 thereby becomes easier.

Third Embodiment of Fiber Selector

Figure 14:
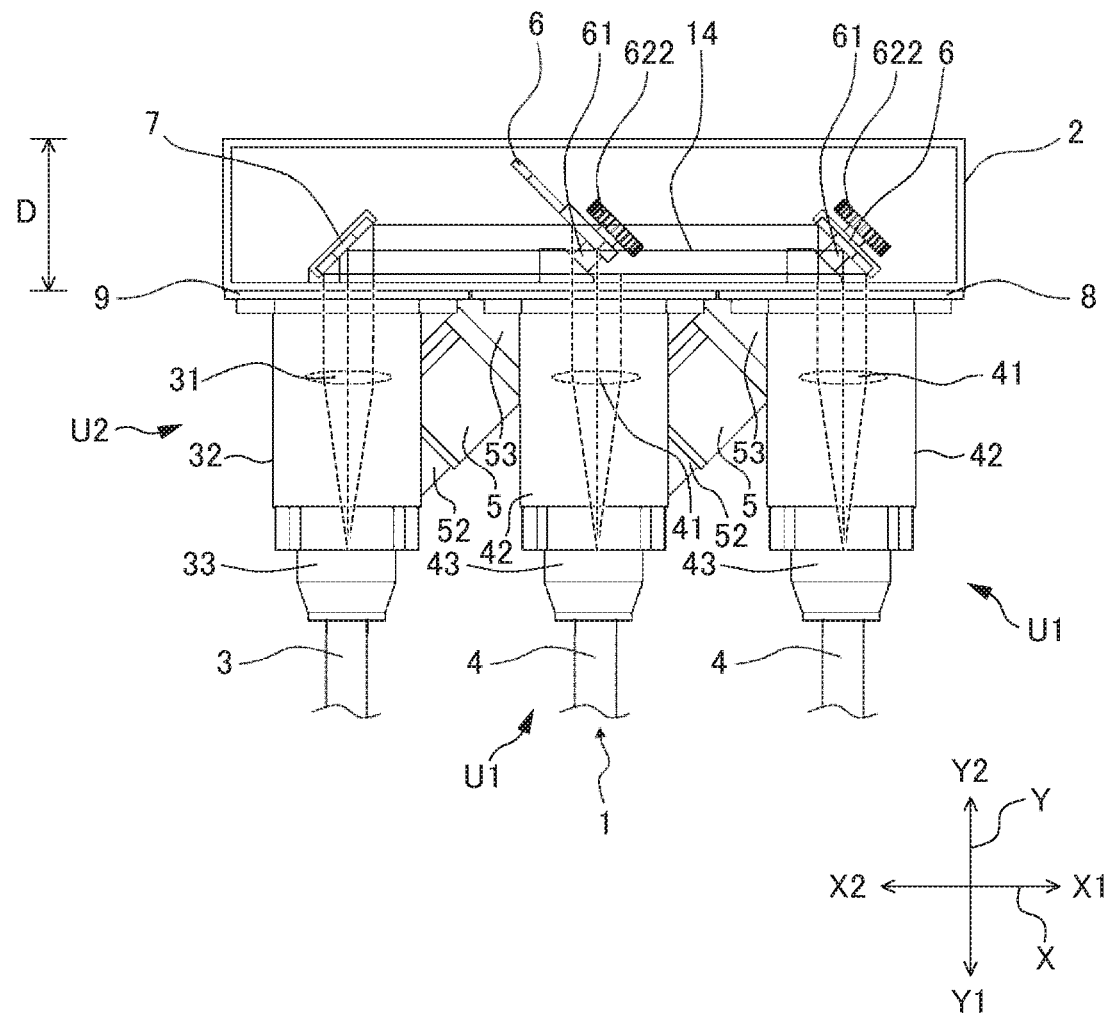
FIG. 14 is a plan view showing a fiber selector according to a third embodiment of the present invention.
Figure 15:
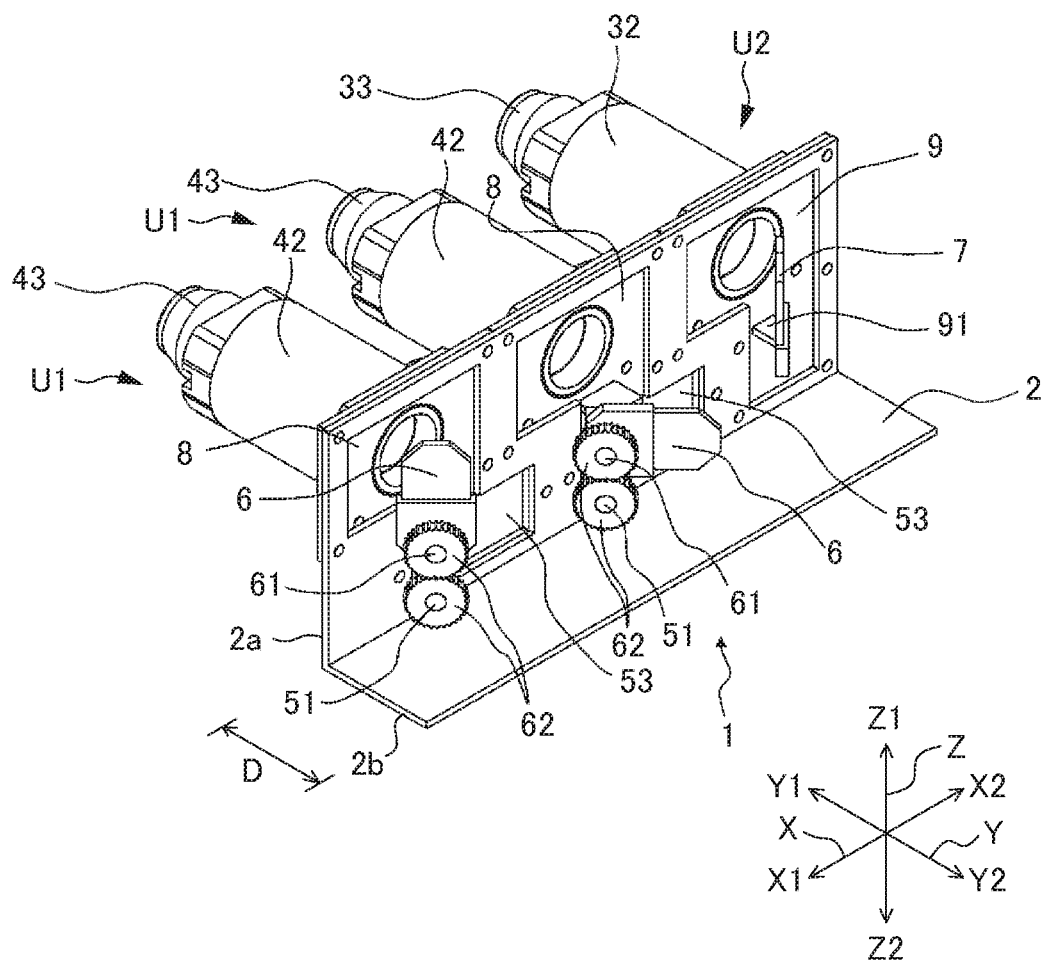
FIG. 15 is a perspective view showing the fiber selector according to the third embodiment of the present invention.
Figure 16:
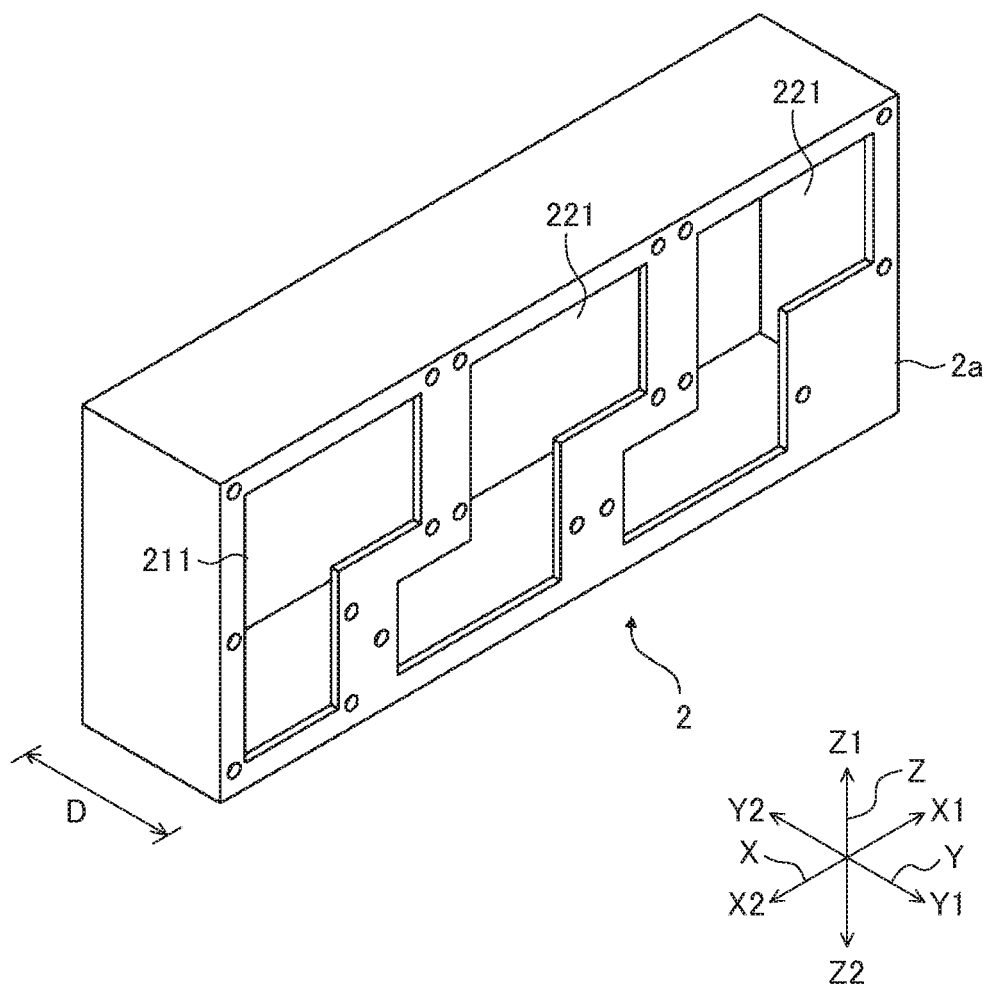
FIG. 16 is a perspective view showing a case used in the fiber selector according to the third embodiment of the present invention.
Figure 17:
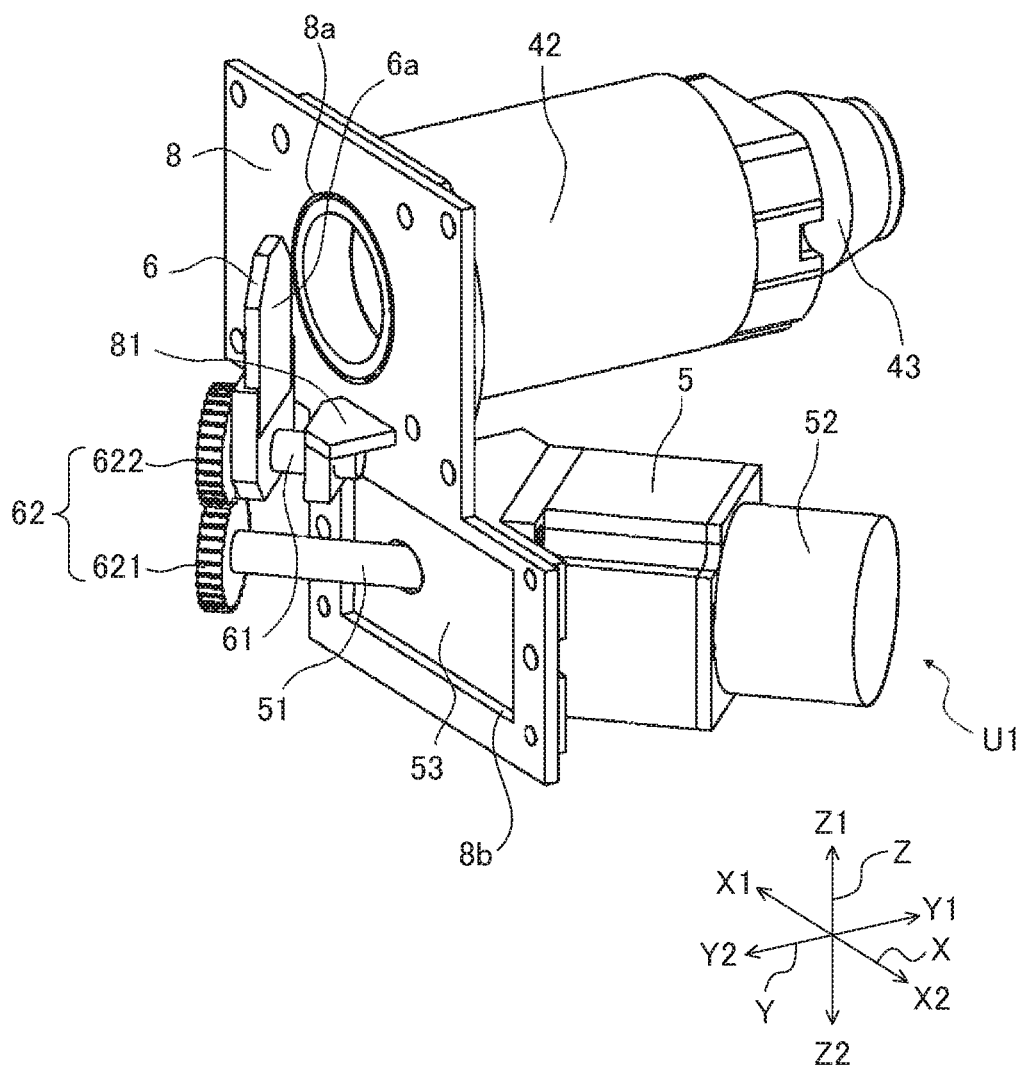
FIG. 17 is a perspective view showing a focusing optical system unit used in the fiber selector according to the third embodiment of the present invention.

FIG. 14 is a plan view showing a fiber selector according to a third embodiment of the present invention. The top plate of the case 2 is made hidden so that the internals of the case 2 of the fiber selector 1 are visible in FIG. 14. In addition, the laser beam L is shown by a fine line in FIG. 14. A laser beam L not visible from outside, or the reflected light by the reflecting surface 6a of the first reflecting member 6 which does not reflect the laser beam L in the state illustrated, is shown by a dotted line. In addition, FIG. 15 is a perspective view showing the fiber selector according to the third embodiment of the present invention. In addition, in FIG. 15, the case 2 is made hidden except for the front surface plate 2a and bottom plate 2b of the case 2, so that the internals are visible. In addition, FIG. 16 is a perspective view showing a case used in the fiber selector according to the third embodiment of the present invention. FIG. 17 is a perspective view showing a focusing optical system unit used in the fiber selector according to the third embodiment of the present invention. It should be noted that the front view of this fiber selector 1 according to the third embodiment, and the perspective view looking obliquely from below the front surface plate 2a of the case 2 are the same as FIGS. 7 and 9 of the second embodiment, and thus are omitted.

The point in which the fiber selector 1 of the third embodiment differs from the fiber selector 1 of the second embodiment is that the rotating shaft to which the first reflecting member 6 is fixed differs from the shaft 51 of the rotary shaft 5. In other words, the first reflecting member 6 is fixed to a second shaft 61, which is a separate rotating shaft from the shaft (first shaft) 51 of the rotary motor 5. The second shaft 61 couples to the shaft 51 via a transmission mechanism 62 that transfers the rotational motion. The second shaft 61 can thereby rotate together with the rotation of the shaft 51 of the rotary motor 5 to cause the first reflecting member 6 to rotationally move. In the present embodiment, the transmission mechanism 62 is configured by a first spur gear 621 mounted to the shaft 51, and a second spur gear 622 mounted to the second shaft 61, as shown in FIG. 17. However, the specific configuration of the transmission mechanism 62 is not limited to spur gears, for example, and may be pulleys and a chain, belt, etc.

In the case of fixing the first reflecting member 6 directly to the shaft 51 of the rotary motor 5, in order to configure so that the lens barrel 42 and rotary motor 5 do not interfere on the front surface plate 2a of the case 2, the optical axis of the focusing optical system 41 and the shaft 51 of the rotary motor 5 must be separated on the order of 10 to 15 mm more than conventionally. For this reason, the size of the first reflecting member 6 becomes larger in proportion. However, the second shaft 61 shown in the present embodiment does not require to be spaced more than conventionally relative to the optical axis of the focusing optical system 41. The first reflecting member 6 may be a small size similar to conventionally, which can reduce the moment of inertia. The time required in switching the first reflecting member 6 to the first position or second position can thereby be shortened, and more rapid switching becomes possible. In addition, since the size of the first reflecting member 6 becomes smaller, the depth dimension D of the case 2 of the fiber selector 1 decreases, as shown in FIGS. 14 to 16. For this reason, the fiber selector 1 is further decreased in size.

As shown in FIG. 17, the unit base plate 8 of the focusing optical system unit U1 of the fiber selector 1 according to the third embodiment has a second shaft bearing support component 81. The second shaft bearing support component 81 is arranged at the back surface of the unit base plate 8. The second shaft 61 is rotatably supported to the unit base plate 8, by this second shaft bearing support component 81. In addition, the unit base plate 8 has a through hole 8a for allowing the laser beam reflected by the reflecting surface 6a of the first reflecting member 6 to be incident on the focusing optical system 41 in the lens barrel 42; and a through hole 8b for inserting the shaft 51 of the rotary motor 5 having the spur gear 621.

The second shaft bearing support component 81 may have an angle adjustment mechanism (first angle adjustment mechanism) that is not illustrated for adjusting the angle of the second shaft 61 relative to the unit base plate 8. It thereby becomes possible to perform adjustment of the optical axis angle including the flap angle of the reflecting surface 6a of the first reflecting member 6. This angle adjustment mechanism will be described later.

According to this focusing optical system unit U1, the installation of the rotary motor 5 may simply mesh the spur gear 621 with the spur gear 622, and does not require adjusting the angle of the shaft 51 with high precision. For this reason, the merit arises in that there is no requirement to readjust the optical axis of the reflecting surface 6a of the first reflecting member 6, even when replacing the rotary motor 5 unit. In addition, the merit in that the focusing optical system unit U1 is replaceable as a unit entity is similar to the case of the second embodiment.

The front surface plate 2a of the case 2 shown in the present embodiment has one reverse L-shaped opening part 211 for mounting one collimating optical system unit U2, and two crank-shaped opening parts 221 for mounting two focusing optical system units U1. The respective units U1, U2 are mounted replaceably from the front surface side to the front surface plate 2a of this case 2. The opening part 211 serves the purposes as the incident opening of the laser beam and the second reflecting member mounting hole. The opening part 221 serves the purposes as an exit opening of the laser beam and a motor mounting hole.

Fourth Embodiment of Fiber Selector

Figure 18:
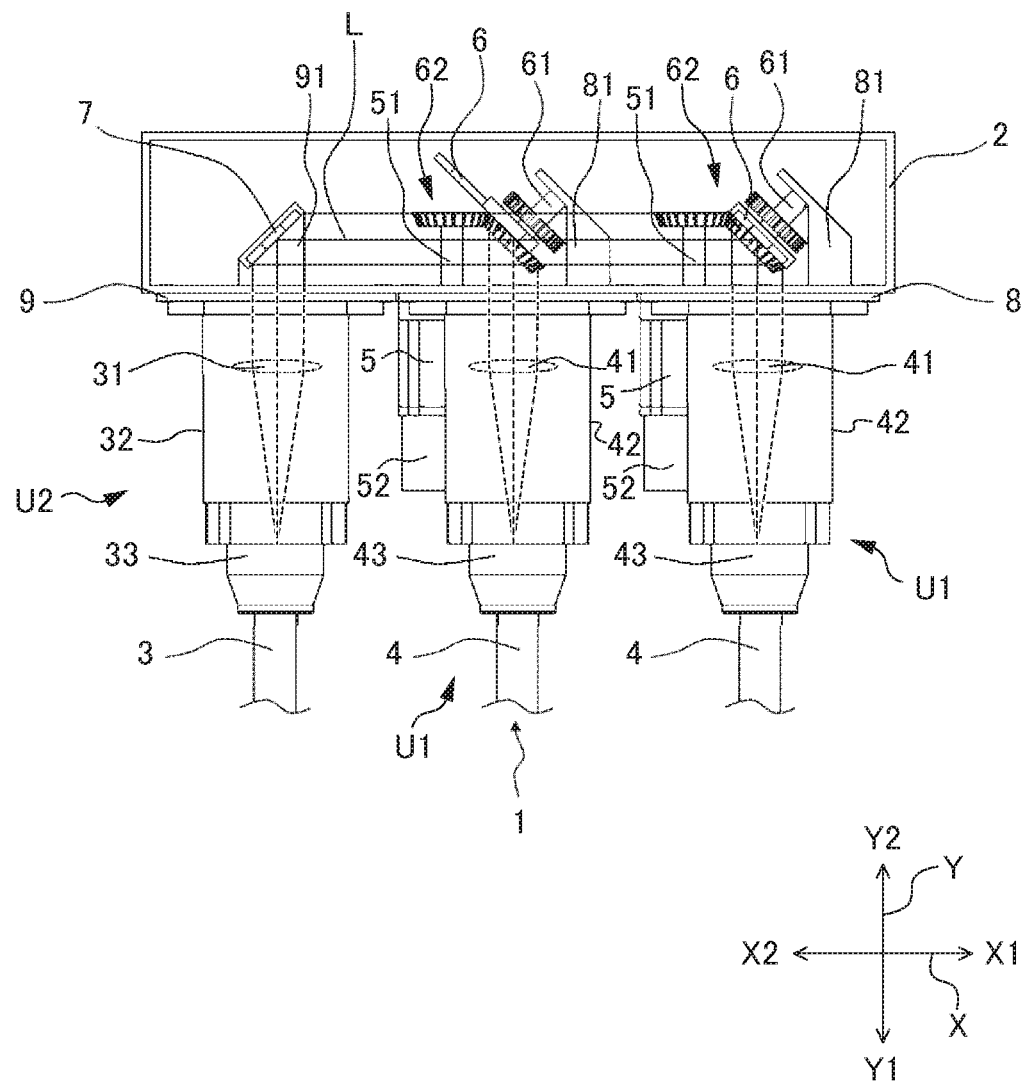
FIG. 18 is a plan view showing a fiber selector according to a fourth embodiment of the present invention.
Figure 19:
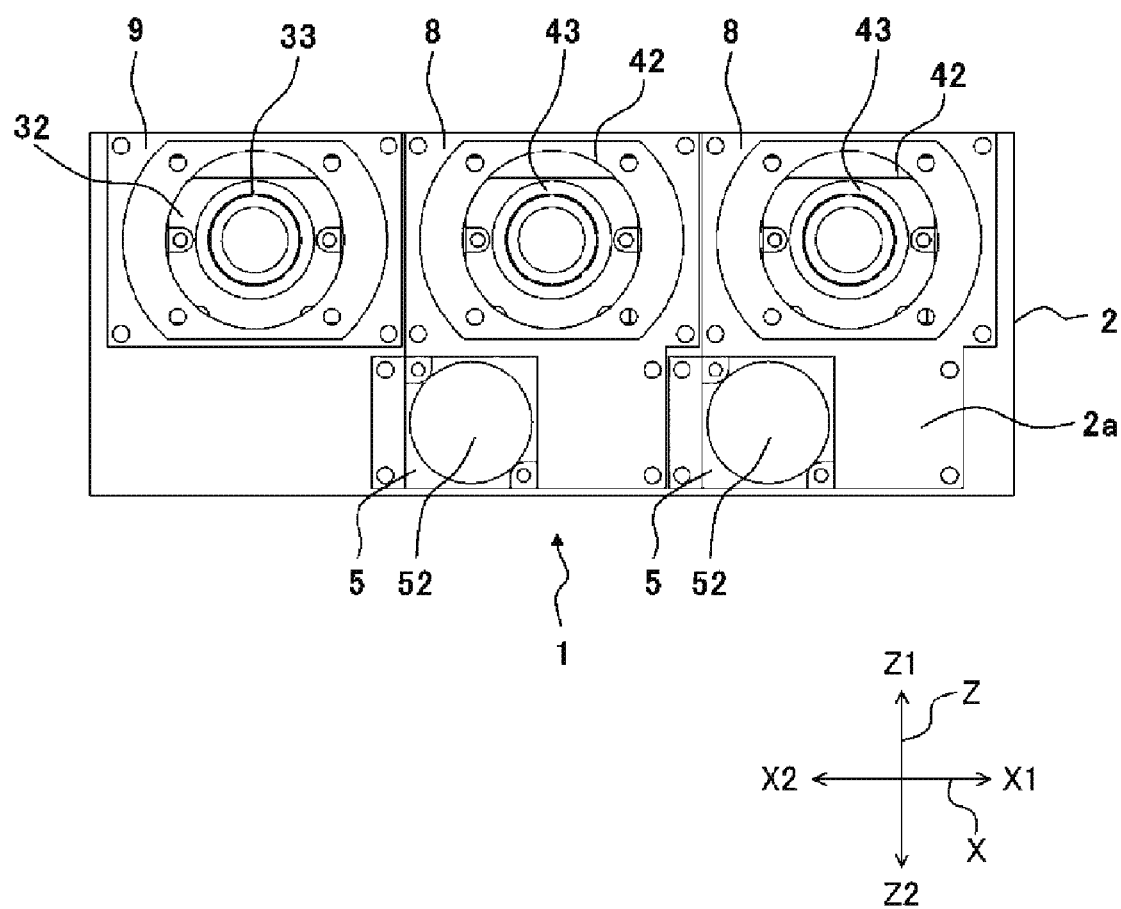
FIG. 19 is a front view showing the fiber selector according to the fourth embodiment of the present invention.
Figure 20:
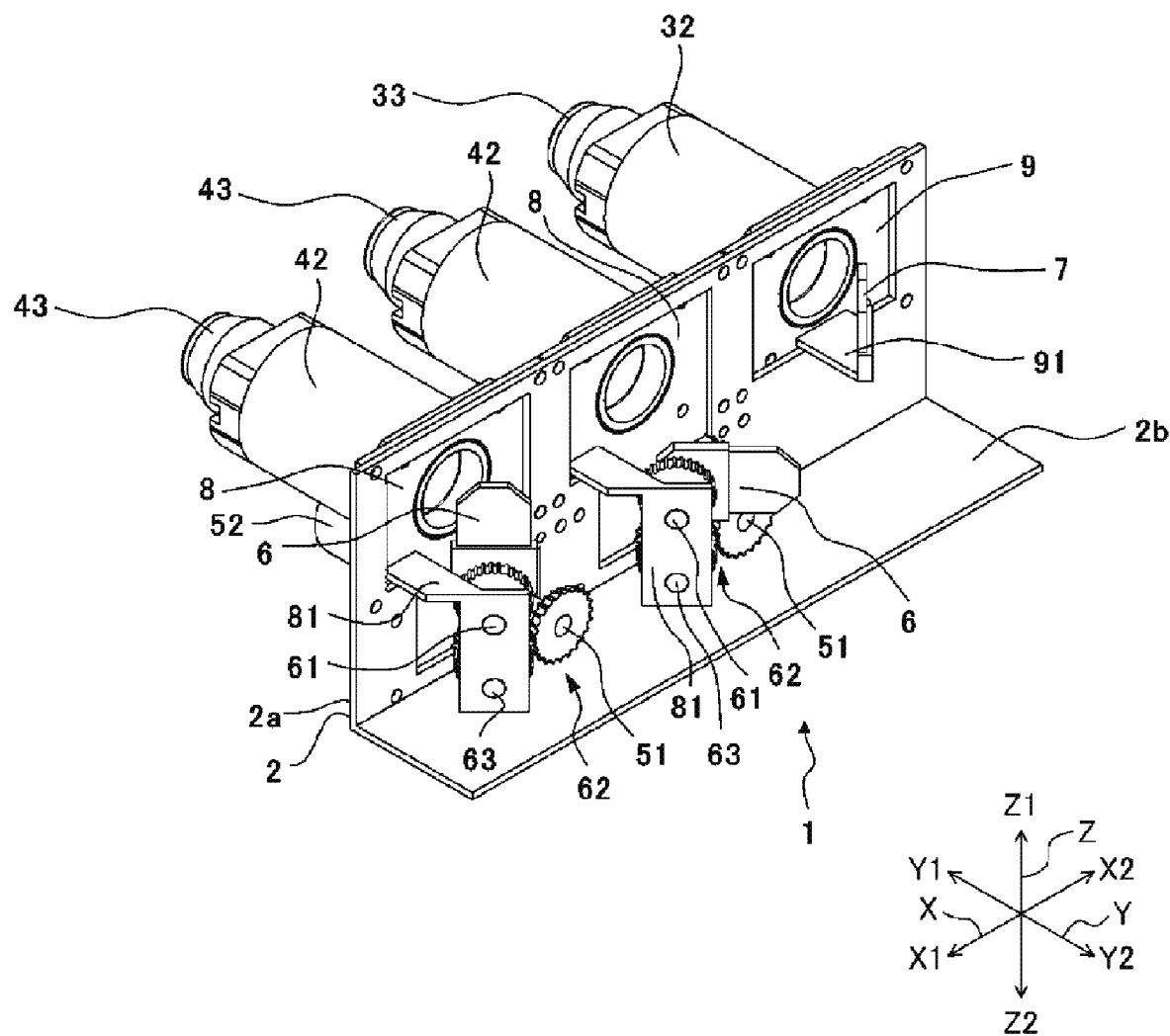
FIG. 20 is a perspective view showing the fiber selector according to the fourth embodiment of the present invention.
Figure 21:
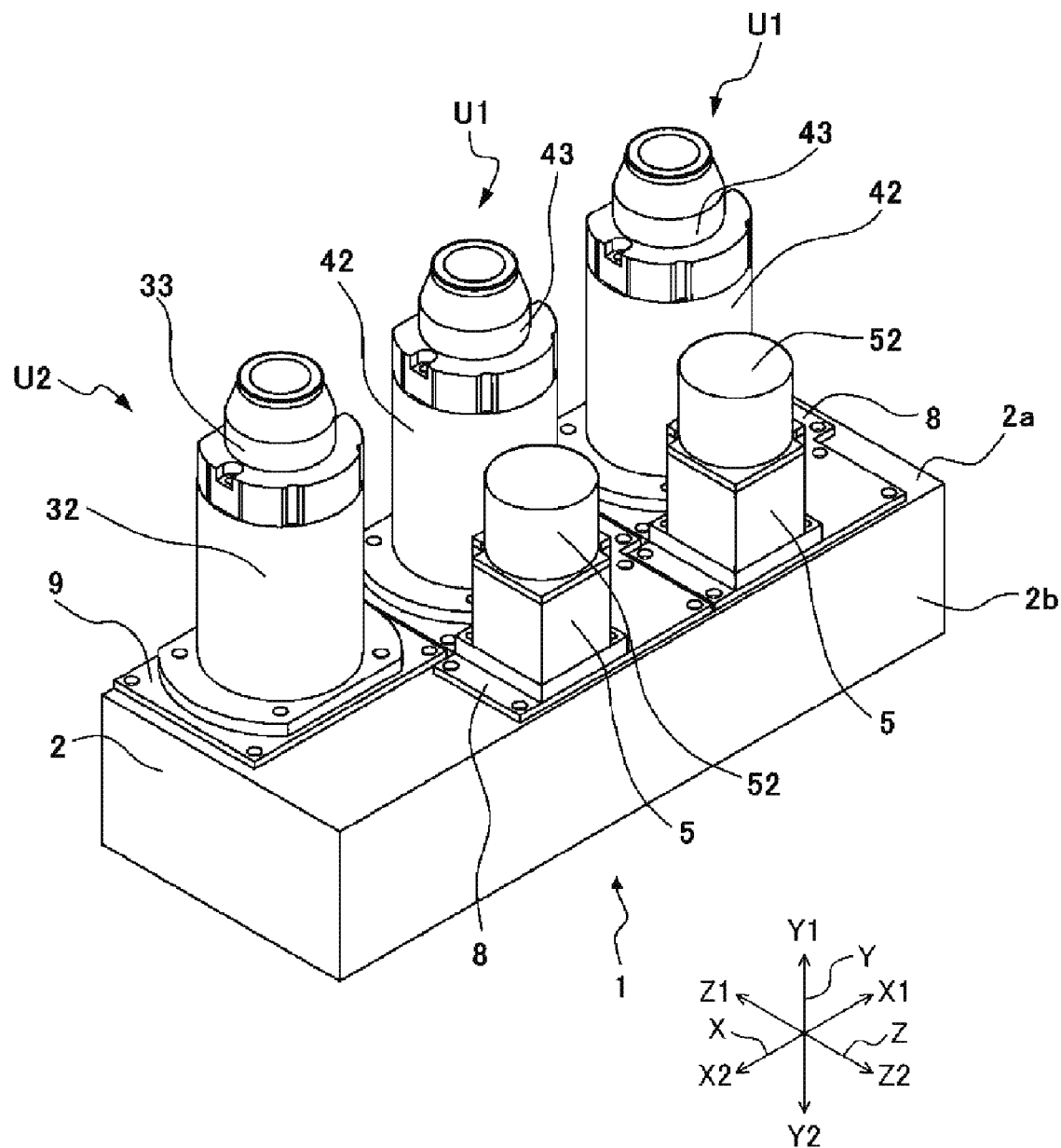
FIG. 21 is a perspective view looking at the fiber selector according to the fourth embodiment of the present invention from another direction.
Figure 22:
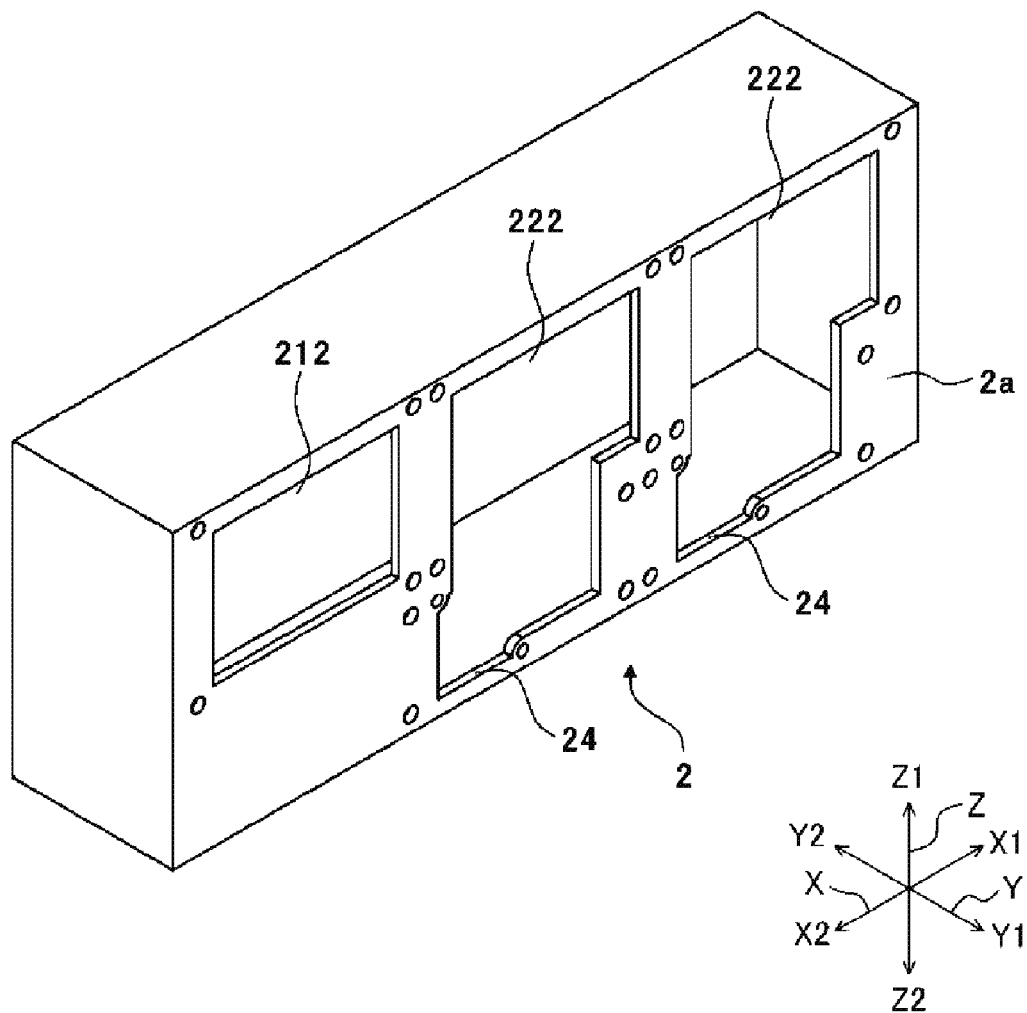
FIG. 22 is a perspective view showing a case used in the fiber selector according to the fourth embodiment of the present invention.
Figure 23:
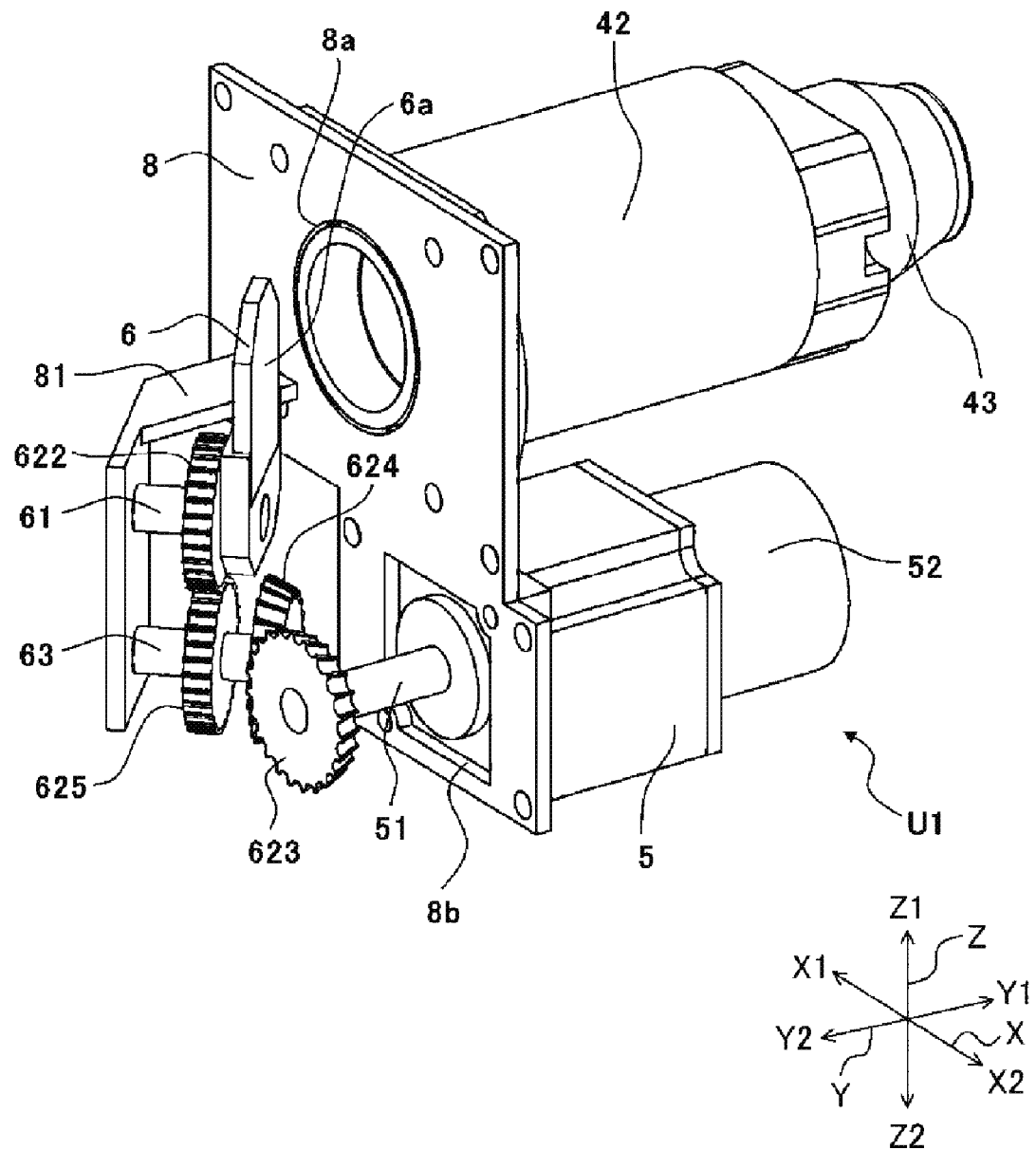
FIG. 23 is a perspective view showing a focusing optical system unit used in the fiber selector according to the fourth embodiment of the present invention.

FIG. 18 is a plan view of a fiber selector 1 according to a fourth embodiment of the present invention. FIG. 19 is a front view of the fiber selector 1 according to the fourth embodiment of the present invention. The top plate of the case 2 is made hidden so that the internals of the case 2 of the fiber selector 1 are visible in FIG. 18. In addition, the laser beam L is shown by a fine line in FIG. 18. A laser beam L not visible from outside, or the reflected light by the reflecting surface 6a of the first reflecting member 6 which does not reflect the laser beam L in the state illustrated, is shown by a dotted line. In addition, FIGS. 20 and 21 are perspective views of the fiber selector 1 according to the fourth embodiment of the present invention. FIG. 20 is a perspective view looking at the fiber selector 1 obliquely from above on the rear surface side. In FIG. 20, the case 2 is made hidden except for the front surface plate 2a and bottom plate 2b of the case 2, so that the internals are visible. FIG. 21 is a perspective view looking obliquely from below on a side of the front surface plate 2a of the case 2. Furthermore, FIG. 22 is a perspective view looking at only the case 2 of the fiber selector 1 according to the fourth embodiment obliquely from above on the side of the front surface plate 2a. FIG. 23 is a perspective view of the focusing optical system unit U1 of the fiber selector 1 according to the fourth embodiment.

The point in which the fiber selector 1 according to the fourth embodiment, differs from the fiber selector 1 according to the third embodiment is the matter of using bevel gears 623, 624 in the transmission mechanism 62 for causing the second shaft 61 to which the first reflecting member 6 is fixed to rotate. More specifically, the first bevel gear 623 is mounted to the leading end of the shaft 51 of the rotary motor 5.

On the other hand, the second shaft bearing support component 81 is extended downwards (Z2 direction), and has a third shaft 63 arranged in parallel with the second shaft 61. The third shaft 63 has a second bevel gear 624 that meshes with the first bevel gear 623, and a third spur gear 625 that meshes with the second spur gear 622 mounted to the second shaft 61. The relationship between the shaft 51 of the rotary motor 5 and the second shaft 61 to which the first reflecting member 6 is fixed thereby changes from a parallel relationship as in the third embodiment, to a relationship obliquely intersecting at a 45° angle, when viewing from above the fiber selector 1, as shown in FIG. 18. As a result thereof, the shaft 51 of the rotary motor 5 is arranged in parallel with the optical axis of the focusing optical system 41. When the optical axis of the focusing optical system 41 and the shaft 51 of the rotary motor 5 become parallel, since the mounting surface of the rotary motor 5 becomes parallel with the front surface plate 2a of the case 2, as is evident from FIG. 19 or FIG. 21, there is an effect in that replacement of the rotary motor 5 becomes easier, and the time for maintenance can be shortened.

It should be noted that "optical axis and shaft parallel" does not necessarily mean the matter of the optical axis and shaft being strictly arranged in parallel, and means being arranged so as to be parallel in terms of design. Therefore, "optical axis and shaft parallel" also includes a case not being perfectly parallel due to variation in component precision, mounting error, etc., i.e. case of substantially parallel.

As shown in the present embodiment, although not illustrated, the transmission mechanism for making the shaft 51 of the rotary motor 5 and the second shaft 61 of the first reflecting member 6 to obliquely intersect may use a universal joint or the like, in place of the above bevel gears 623, 624.

The front surface plate 24a of the case 2 shown in the present embodiment has one rectangular opening part 212 for mounting one collimating optical system unit U2, and two rectangular opening parts 222 for mounting two focusing optical system units U1, as shown in FIG. 22. The respective units U1, U2 are mounted replaceably from the front surface side to the front surface plate 2a of this case 2. The opening part 212 serves the purposes as the incident opening of the laser beam and the second reflecting member mounting hole. The opening part 222 serves the purposes as an exit opening of the laser beam. Below the two opening parts 222 links with the respective motor mounting holes 24.

Fifth Embodiment of Fiber Selector

Figure 24:
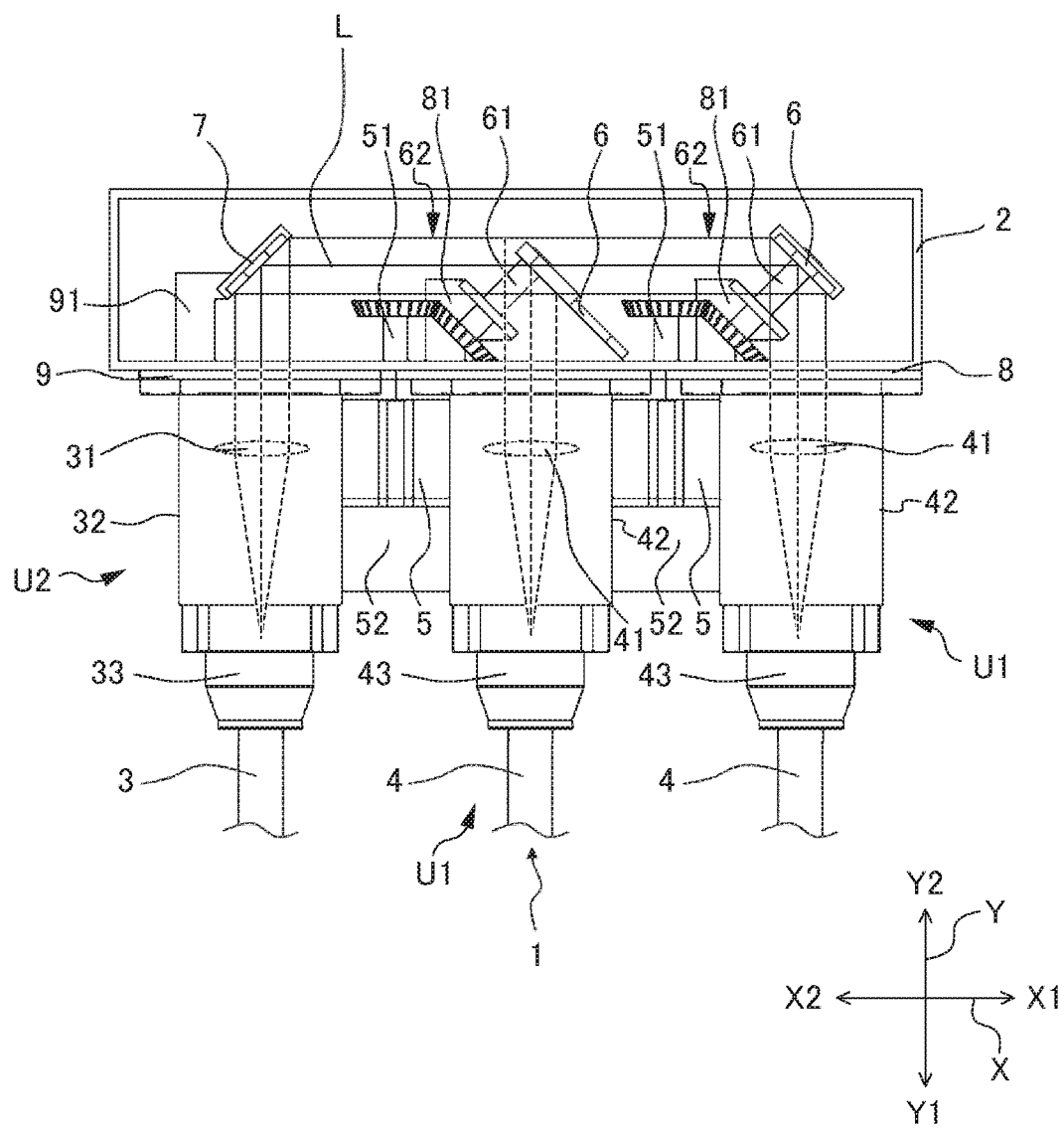
FIG. 24 is a plan view showing a fiber selector according to a fifth embodiment of the present invention.
Figure 25:
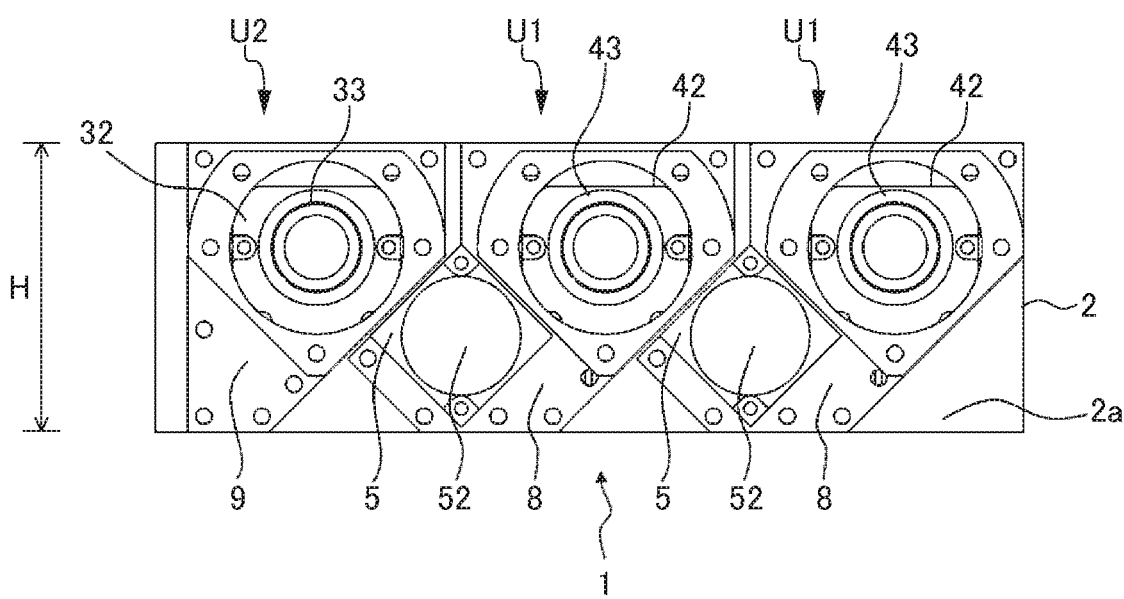
FIG. 25 is a front view showing the fiber selector according to the fifth embodiment of the present invention.
Figure 26:
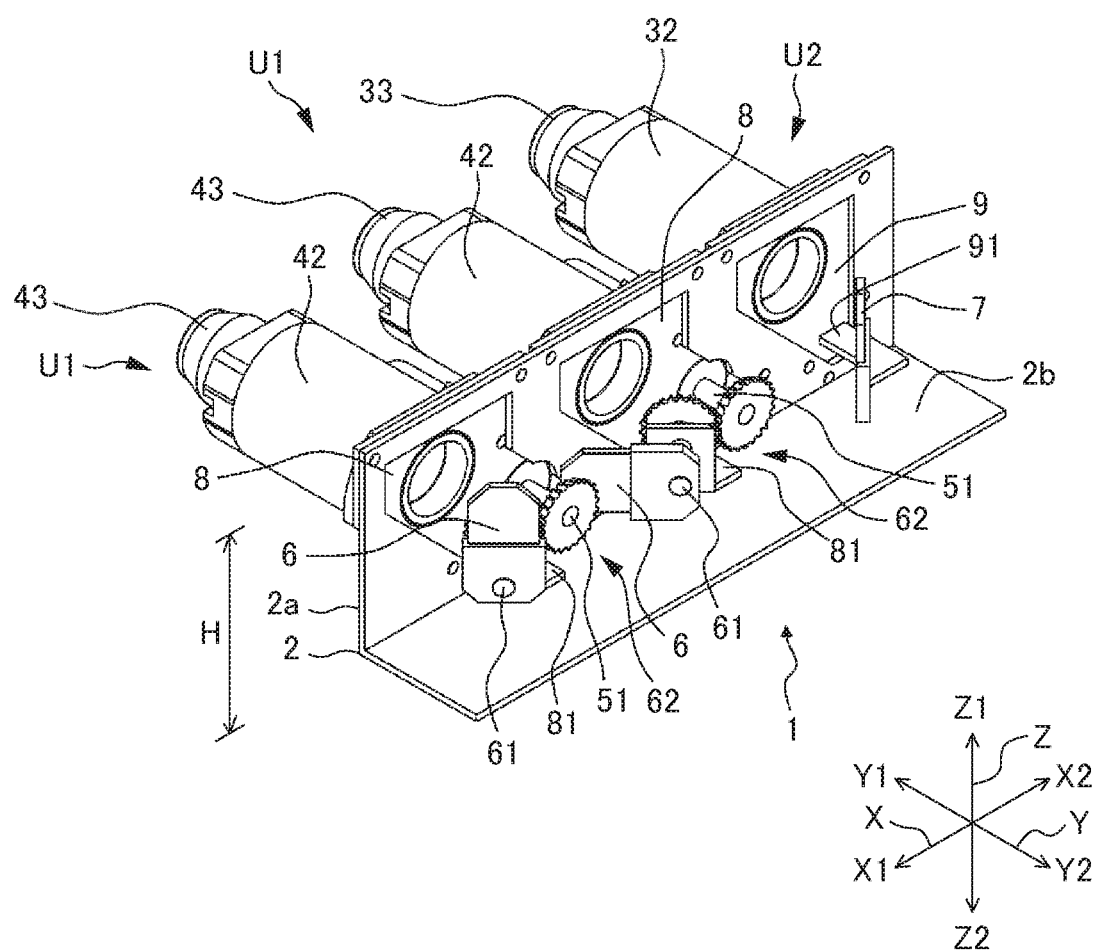
FIG. 26 is a perspective view showing the fiber selector according to the fifth embodiment of the present invention.
Figure 27:
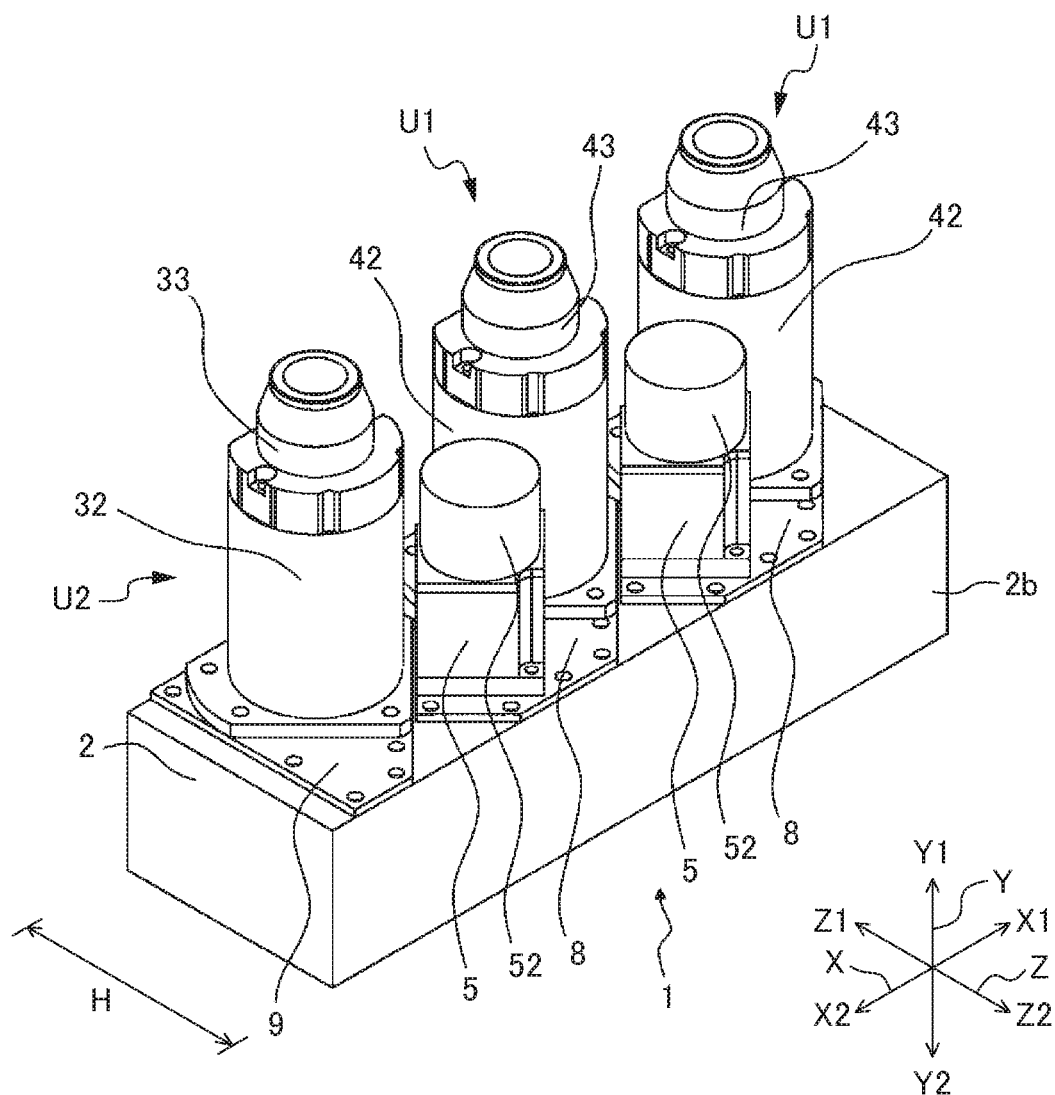
FIG. 27 is a perspective view looking at the fiber selector according to the fifth embodiment of the present invention from another direction.
Figure 28:
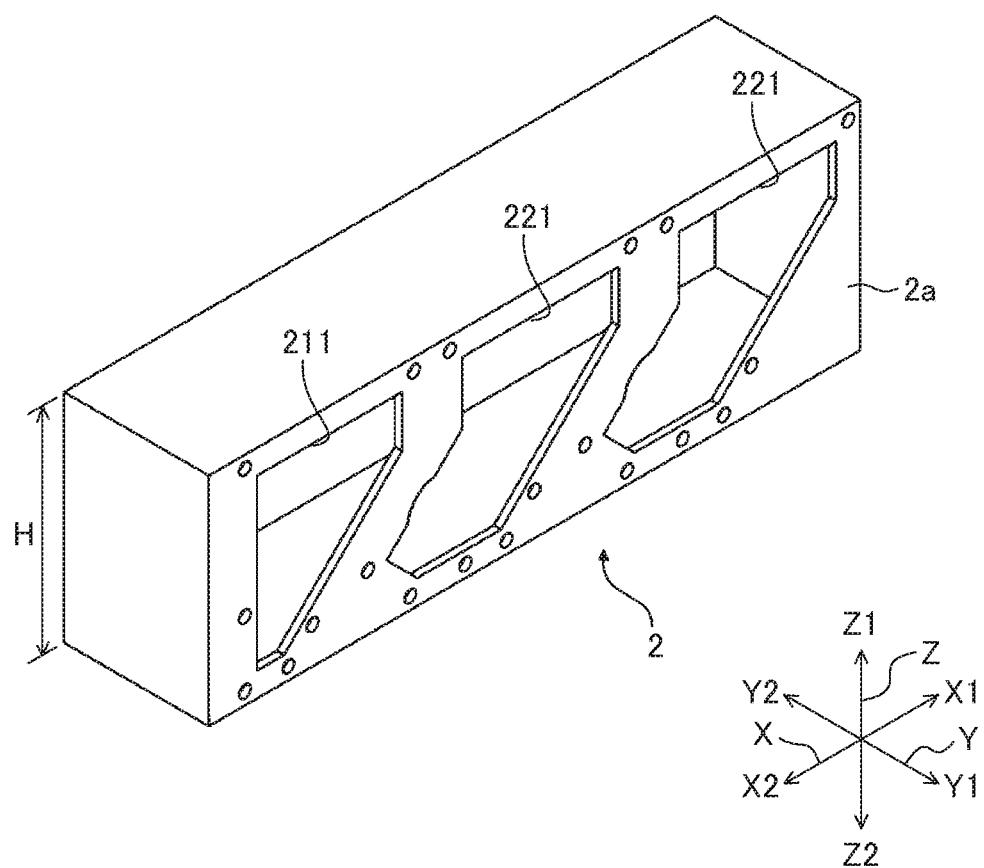
FIG. 28 is a perspective view showing a case used in the fiber selector according to the fifth embodiment of the present invention.
Figure 29:
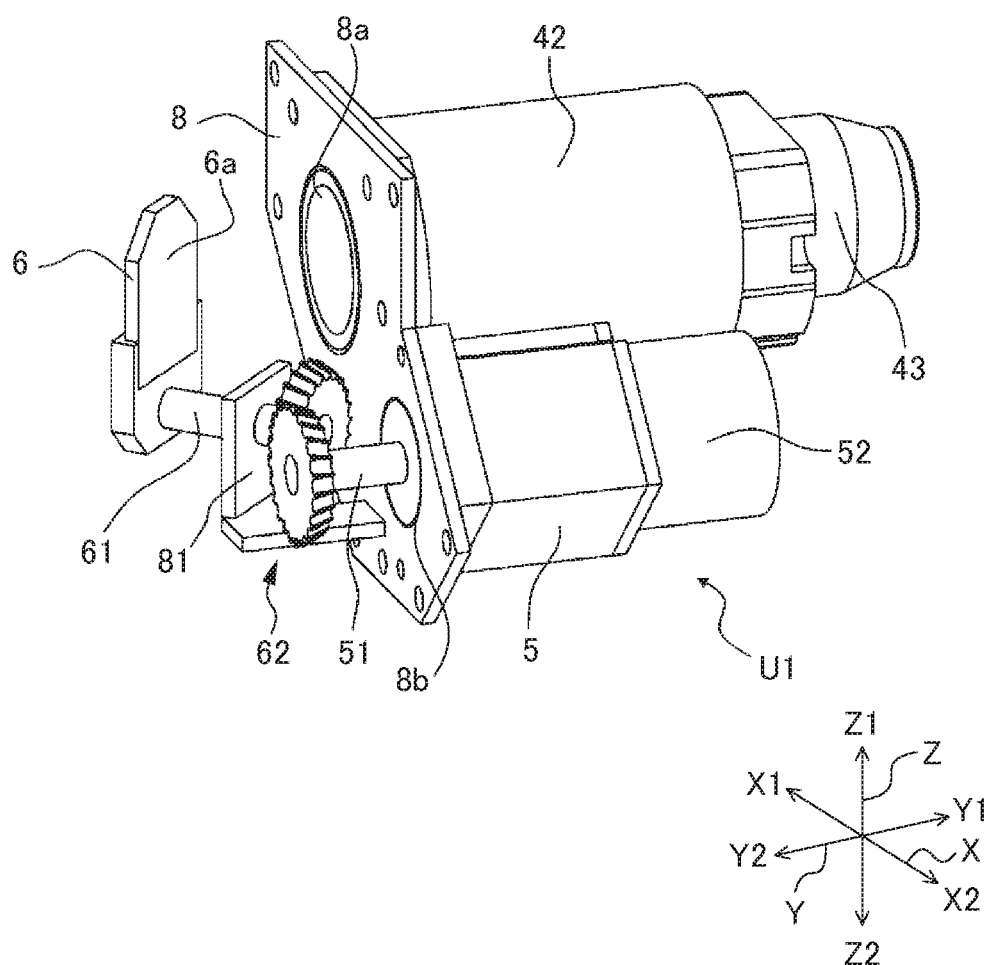
FIG. 29 is a perspective view showing a focusing optical system unit used in the fiber selector according to the fifth embodiment of the present invention.

FIG. 24 is a plan view of a fiber selector 1 according to a fifth embodiment of the present invention. FIG. 25 is a front view of the fiber selector 1 according to the fifth embodiment of the present invention. The top plate of the case 2 is made hidden so that the internals of the case 2 of the fiber selector 1 are visible in FIG. 24. In addition, FIG. 24 shows the laser beam L by a fine line. A laser beam L not visible from outside, and the reflected light by the reflecting surface 6a of the first reflecting member 6 which does not reflect the laser beam L in the state illustrated, is shown by a dotted line. In addition, FIGS. 26 and 27 are perspective views of the fiber selector 1 according to the fifth embodiment of the present invention. FIG. 26 is a perspective view looking at the fiber selector 1 obliquely from above on the rear surface side. In FIG. 26, the case 2 is made hidden except for the front surface plate 2a and bottom plate 2b of the case 2, so that the internals are visible. FIG. 27 is a perspective view looking at the fiber selector 1 obliquely from below on a side of the front surface plate 2a of the case 2. In addition, FIG. 28 is a perspective view looking at only the case 2 of the fiber selector 1 according to the fifth embodiment obliquely from above on the side of the front surface plate 2a. FIG. 29 is a perspective view of a focusing optical system unit U1 capable of replacement as a unit entity of the fiber selector 1 according to the fifth embodiment.

The point in that the fiber selector 1 according to the fifth embodiment differs from the fiber selector 1 according to the fourth embodiment is the matter of the shaft 51 of at least one rotary motor 5 being arranged to become equidistant relative to the respective optical axes of the laser beams L incident on the two output optical fibers 4 adjacent to this rotary motor 5. In other words, as is evident from FIG. 25, in the case of viewing the fiber selector 1 from the front surface side, the respective rotary motors 5 are arranged between the adjacent, lens barrel 32 and lens barrel 42 and two adjacent lens barrels 42, so as to be as near possible to the lens barrels 32, 42. The rotary motor 5 on the left side shown in FIG. 25 is arranged equidistant relative to the lens barrel 32 and the lens barrel 42 adjacent this, respectively, and the rotary motor 5 on the right side is arranged equidistant relative to the two lens barrels 42, respectively.

Since the cross-sectional shape perpendicular to the axial direction of the shaft 51 of the rotary motor 5 and the cross-sectional shape perpendicular to the optical axis of the focusing optical system 41 are both basically nearly circles, by way of the above-mentioned configuration, it is possible to shorten the distance between a plane including the shafts 51 of the plurality of rotary motors 5 and a plane including the optical axes of the collimating optical system 31 and the plurality of focusing optical systems 11, as is understood also from FIG. 25. Therefore, as shown in FIGS. 25 to 28, the height H of the fiber selector 1 is shortened, and the fiber selector 1 becomes further reducible in size.

It should be noted that "equidistant" does not necessarily mean that the distances are perfectly equal, and means being arranged so as to be equidistant in terms of design. Therefore, "equidistant" also includes a case of the distances not being perfectly equal due to variations in component precision, mounting error, etc., i.e. case of substantially equidistant.

The front surface plate 2a of the case 2 shown in the present embodiment has one opening part 211 for mounting one collimating optical system unit U2, and two opening parts 221 for mounting two focusing optical system units U1, as shown in FIG. 28. The opening part 211 is formed in a substantially triangular shape. The opening part 221 is greatly notched obliquely along the Z axis direction. The respective units U1, U2 are mounted replaceably from the front surface side to the front surface plate 2a of this case 2. The opening part 211 serves the purposes as the incident opening of the laser beam and the second reflecting member mounting hole. The opening part 221 serves the purposes as an exit opening of the laser beam and a motor mounting hole.

Figure 30:
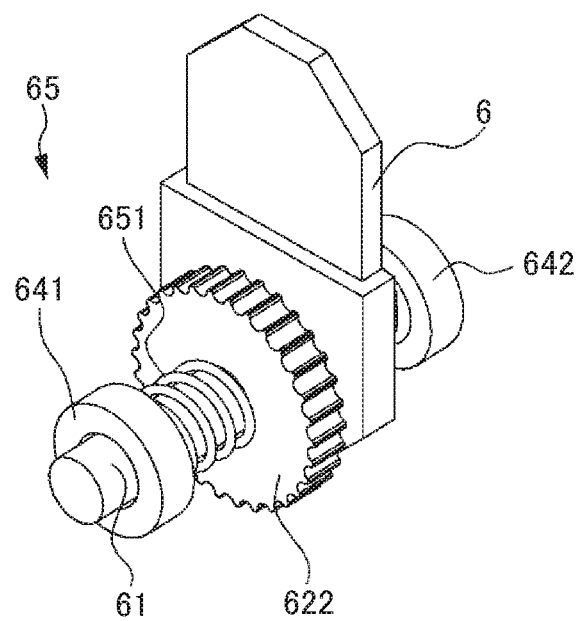
FIG. 30 is a perspective view showing a reflecting member having a pushing mechanism made using an elastic member.
Figure 31:
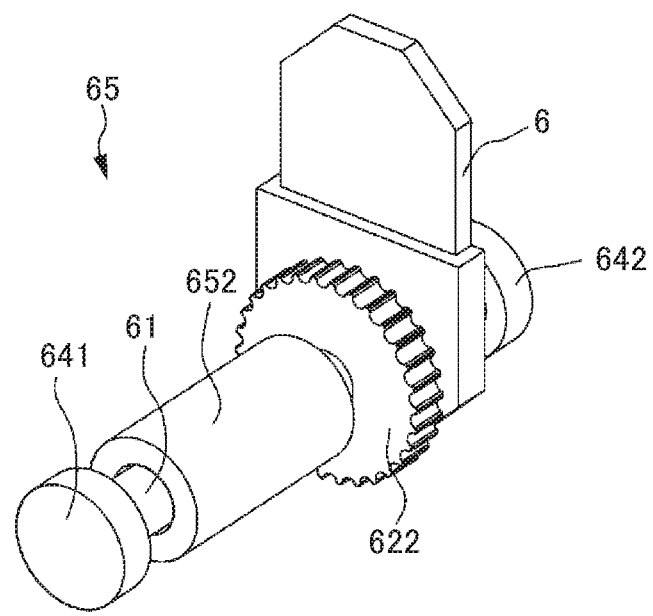
FIG. 31 is a perspective view showing a reflecting member having a pushing mechanism made using a solenoid actuator.

In the respective fiber selectors 1 of the fourth embodiment and fifth embodiment including the second shaft 61, a pressing mechanism 65 for reducing the uncertainty (backlash) of the second shaft 61 may be equipped, as shown in FIGS. 30 and 31. More specifically, the pressing mechanism 65 has bearings 641, 642 at both ends of the second shaft 61, respectively. Although not illustrated in detail FIGS. 30 and 31, the bearings 641, 642 are supported at predetermined positions by the second shaft bearing support component 81, etc. The pressing mechanism 65 is configured so as to press the second shaft 61 against either of the bearing 641 or 642. Since the uncertainty (backlash) in the position in the axial direction of the second shaft 61 can thereby be reduced, the control precision of the position (focal position) at which the laser beam L reflected by the first reflecting member 6 fixed to the second shaft 61 focuses by the focusing optical system 41 improves. As a result thereof, the laser beam L comes to be reliably incident on the core of the incident end face of the output optical fiber 4, whereby an effect is obtained in that the coupling efficiency of the fiber selector 1 improves.

The pressing mechanism 65 shown in FIG. 30 is configured by an elastic member 651 such as a coil spring mounted to the outer circumference of the second shaft 61. The elastic member 651 presses the second shaft 61 in the direction of the other bearing 642 via the second spur gear 622, between the one bearing 641 and the second spur gear 622 fixed to the second shaft 61. In addition, the pressing mechanism 65 shown in FIG. 31 has a solenoid coil 652. In this case, the second shaft 61 is magnetized, and a solenoid actuator is configured by the solenoid coil 652 being mounted to the outer circumference of the second shaft 61. The solenoid coil 652, although not illustrated, is fixed at a predetermined position within the case 2 by a support member or the like. When the solenoid coil 652 is energized, the second shaft 61 is pressed by the magnetic force to the direction of the bearing 642, for example.

In the case of the pressing mechanism 65 being the elastic member 651 such as a coil spring, it is possible to realize the aforementioned effect at low cost. On the other hand, in the case of the pressing mechanism 65 being a solenoid actuator, it is possible to press the second shaft 61 to one of the bearing 641 or 642 only when necessary. For this reason, it is also possible to control the pressing mechanism 65 so as not to press the bearing 641 or 642 during rotation of the second shaft 61. The pressing mechanism 65 consisting of a solenoid actuator can allow the first reflecting member 6 to rotationally move at high speed, due to an increase in frictional resistance not occurring at the bearings 641, 642 accompanying pressing, and thus the rotation speed of the second shaft 61 not declining. Therefore, the pressing mechanism 65 consisting of a solenoid actuator is able to switch between the output optical fibers 4 emitting the laser beam L at higher speed.

At least at a portion at which friction is generated such as the transmission mechanism 62 and bearings 641, 642, resin having self-lubricating property may be used. Even if a lubricating oil having a risk of oil mist occurring is not used, since it is possible to prevent or reduce seizure between gears and the friction of gears, friction and wearing of bearings, the cleanliness of surrounding air can be maintained. For this reason, it is possible to prevent contamination by oil mist of optical components which are used in the same space the collimating optical system 31, the focusing optical system 41 and the first reflecting member 6, etc. The resin having a self-lubricating property is not particularly limited; however, it is possible to use resins such as engineering plastics such as polyacetal, and super engineering plastics such as polychlorotrifluoroethylene (trifluoroethylene chloride).

(Adjustment Mechanisms of Focal Position and Optical Axis Angle)

Figure 32:
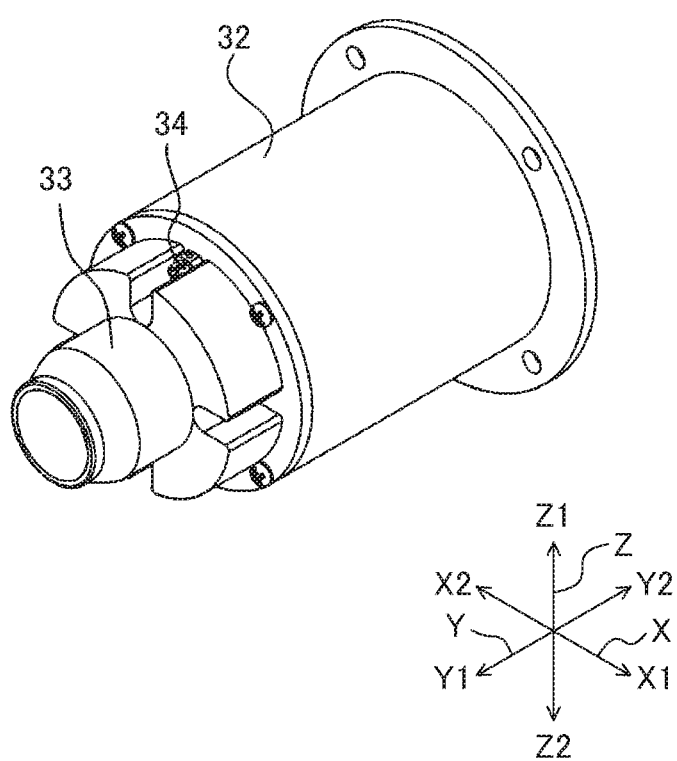
FIG. 32 a perspective view showing a collimating optical system equipped with an adjustment mechanism for focal position and optical axis angle.
Figure 33:
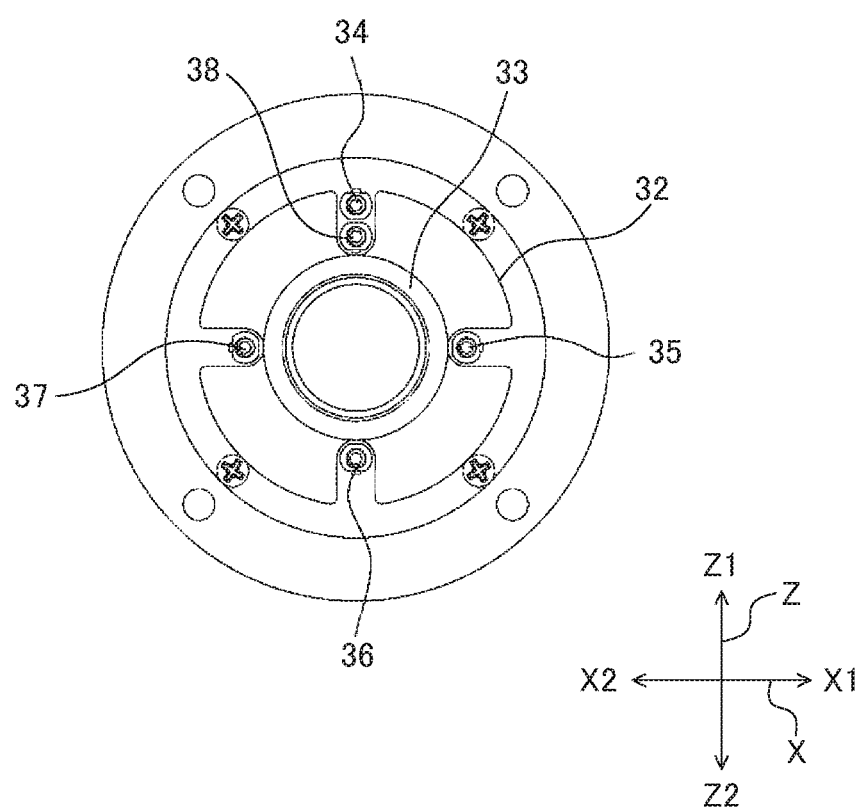
FIG. 33 is a front view showing a collimating optical system equipped with an adjustment mechanism for focal position and optical axis angle.
Figure 34:
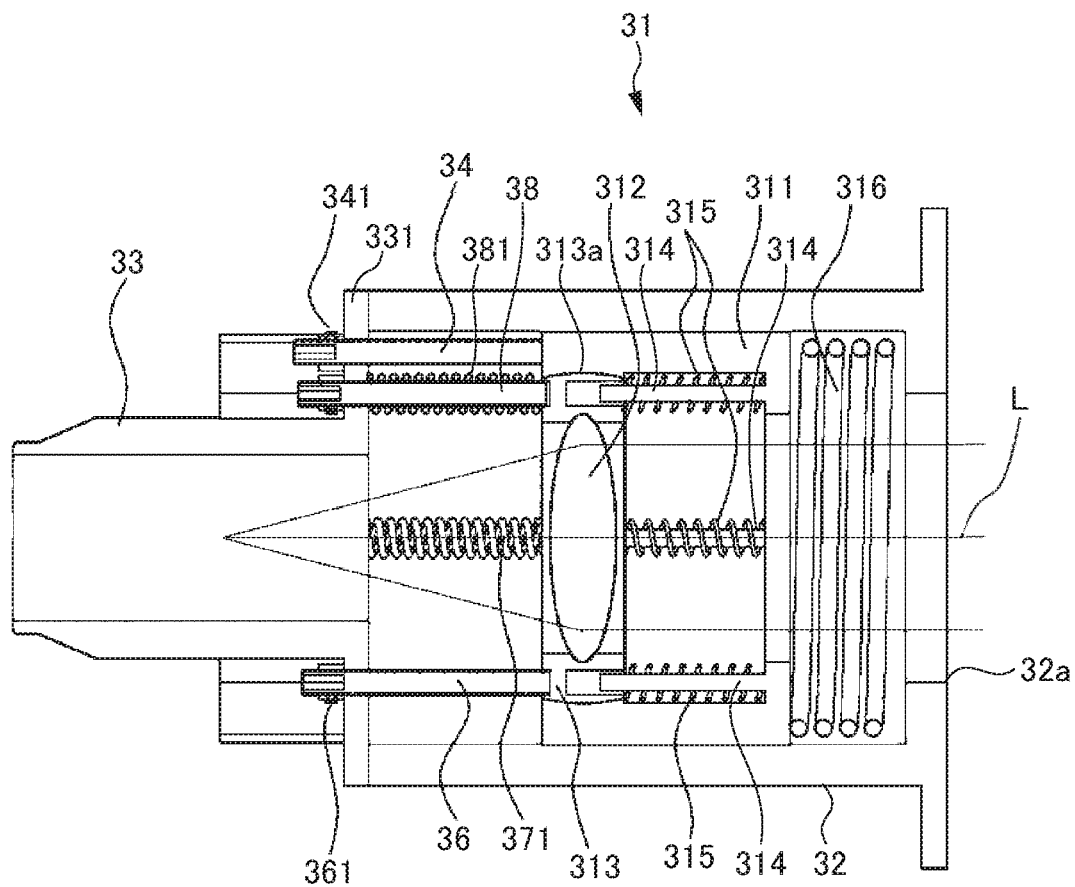
FIG. 34 is a longitudinal sectional view showing a collimating optical system equipped with an adjustment mechanism for focal position and optical axis angle.
Figure 34:
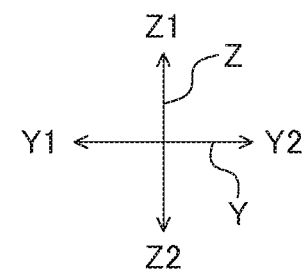
Figure 35:
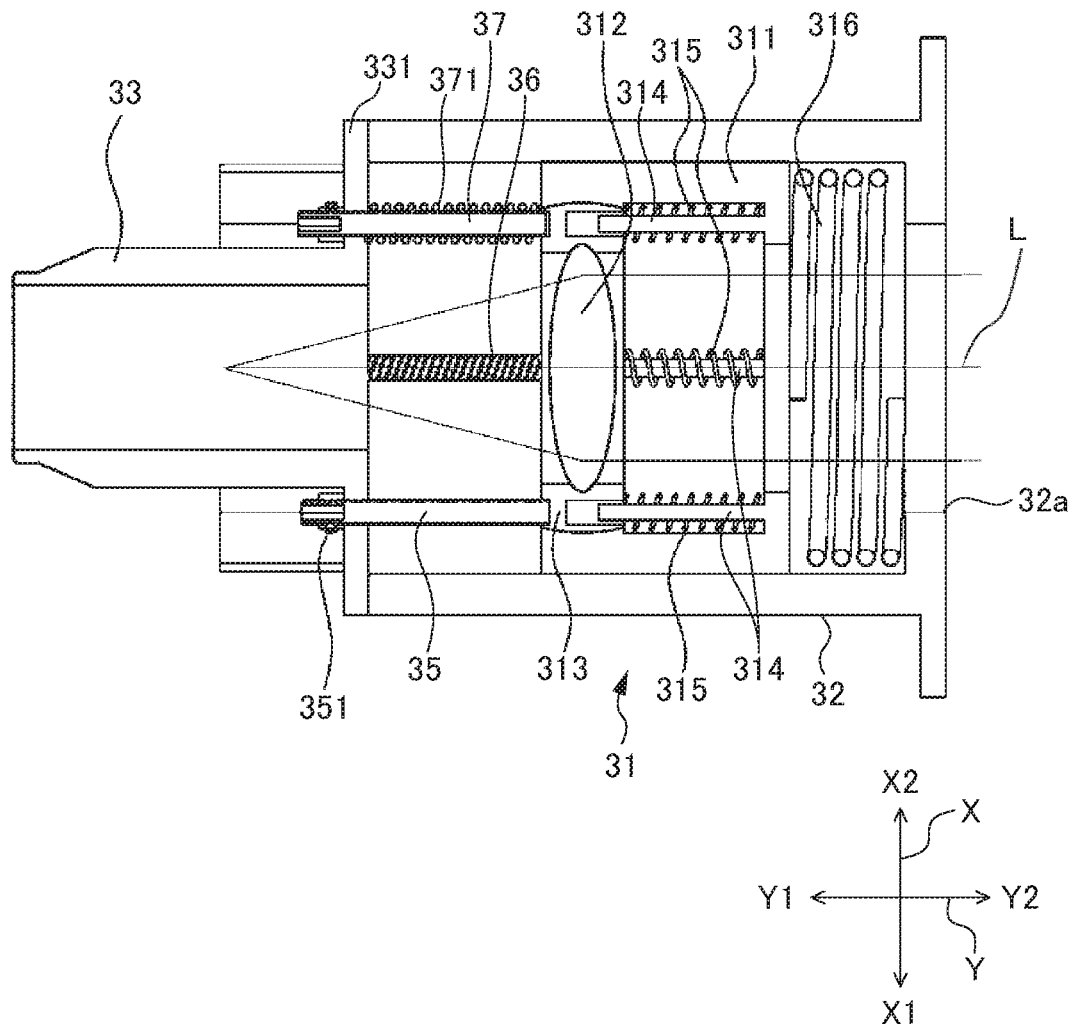
FIG. 35 is a cross-sectional view showing a collimating optical system equipped with an adjustment mechanism for focal position and optical axis angle.

Herein, the adjustment mechanism for the focal position and optical axis angle of the collimating optical system 31 and focusing optical system 41 will be explained by giving specific examples. It should be noted that, since the adjustment mechanisms for the focal position and optical axis angle of the collimating optical system 31 and focusing optical system 41 may be the same structure, an example of the adjustment mechanism in the collimating optical system 31 will be described herein. FIGS. 32 to 35 show examples of an adjusting mechanism in the collimating optical system 31. FIG. 32 is a perspective view showing the collimating optical system including the adjustment mechanism for focal position and optical axis angle. FIG. 33 is a front view showing the collimating optical system including the adjustment mechanism for focal position and optical axis angle. FIG. 34 is a longitudinal sectional view showing the collimating optical system including the adjustment mechanism for focal position and optical axis angle. FIG. 35 is a cross-sectional view showing the collimating optical system including the adjustment mechanism for focal position and optical axis angle.

As shown in FIGS. 34 and 35, a cylindrical sliding component 311 housed within the lens barrel 32. At the center, the sliding component 311 supports a lens holder 313 to which a lens 312 is mounted. More specifically, the lens holder 313 loins with four guide pins 314 arranged so as to extend in the optical axis direction of the laser beam L, inside of the sliding component 311, and is elastically supported by the coil springs 315, which are mounted to the outer circumference of these guide pins 314. The outer circumference surface of the lens holder 313 becomes a spherical surface 313a. The lens holder 313 is supported by contacting with the inner surface of the sliding component 311 by this spherical surface 313a.

Between the sliding component 311 and the exit opening part 32a of the lens barrel 32, a coil spring 316 is arranged. The coil spring 316 biases the sliding component 311 towards the forward side (Y1 direction side) of the lens barrel 32. The forward side of the lens barrel 32 is sealed by a flange part 331 of a connector 33.

At the top of the flange part 331 of the connector 33, a focal position adjusting screw 34 is mounted. The focal position adjusting screw 34 passes through the flange part 331 to abut the upper end face of the sliding component 311. When the focal position adjusting screw 34 rotates forward, it causes a force in a direction (Y2 direction) pushing on the sliding component 311 against the biasing force of the coil spring 316 to act. In addition, when the focal position adjusting screw 34 rotates in reverse, the sliding component 311 is pushed to the coil spring 316, and moves ahead (Y1 direction). By the sliding component 311 moving in the Y axis direction in this way, the focal position of the lens 312 changes. Therefore, the focal position of the collimating optical system 31 is adjustable from the front surface side of the fiber selector 1, by manipulating the focal position adjusting screw 34.

In addition, in the flange part 331 of the connector 33, a first optical axis angle adjusting screw 35 is mounted at a position separated 90° clockwise from the focal position adjusting screw 34, as shown in FIG. 33. The first optical axis angle adjusting screw 35 passes through the flange part 331 to abut the right-side end face of the lens holder 313. In addition, by configuring similarly, a second optical axis angel adjusting screw 36 is mounted in the flange part 331 of the connector 33 at a position separated 180° clockwise from the focal position adjusting screw 34, as shown in FIG. 33. The second optical axis angle adjusting screw 36 passes through the flange part 331 to abut the lower end face of the lens holder 313.

When turning the first optical axis angle adjusting screw 35, the lens 312 rotates about a line parallel to the Z axis, due to the spherical surface slippage by the spherical surface 313a of the lens holder 313. The optical axis of the lens 312 thereby changes to the lateral direction (X axis direction) relative to the Y axis. On the other hand, when turning the second optical axis angle adjusting screw 36, the lens 312 rotates around a line parallel to the X axis, by way of the spherical surface slippage by the spherical surface 313a of the lens holder 313. The optical axis of the lens 312 thereby changes in the vertical direction (Z axis direction) relative to the Y axis. Therefore, the optical axis angle of the collimating optical system 31 is adjustable from the front surface side of the fiber selector 1, by manipulating the first optical axis angle adjusting screw 35 and the second optical axis angle adjusting screw 36.

It should be noted that, after adjustment of the focal position and optical axis angle of the lens 312, it is possible to lock so that the respective adjusting screws 31, 35, 36 do not turn, by tightening lock screws 341, 351, 361 provided to the respective adjusting screws 34, 35, 36. The lock screws 341, 351, 361 can easily turn from the front surface side of the fiber selector 1, using an L-shaped hexagonal wrench or the like.

In addition, in FIG. 33, screws 37, 38 which are at symmetrical positions of the first optical axis angle adjusting screw 35 and second optical axis angle adjusting screw 36 with the optical axis of the laser beam L as the line of symmetry, are screws serving as the supporting points during optical axis angle adjustment. Coil springs 371, 381 are respectively mounted to these screws 37, 38, and elastically support the lens holder 313. The screws 37, 38 are fixed in a state slightly separated from the lens holder 313, and normally do not require turning during optical axis angle adjustment.

(Angle Adjustment Mechanism for First Reflecting Member)

Figure 36:
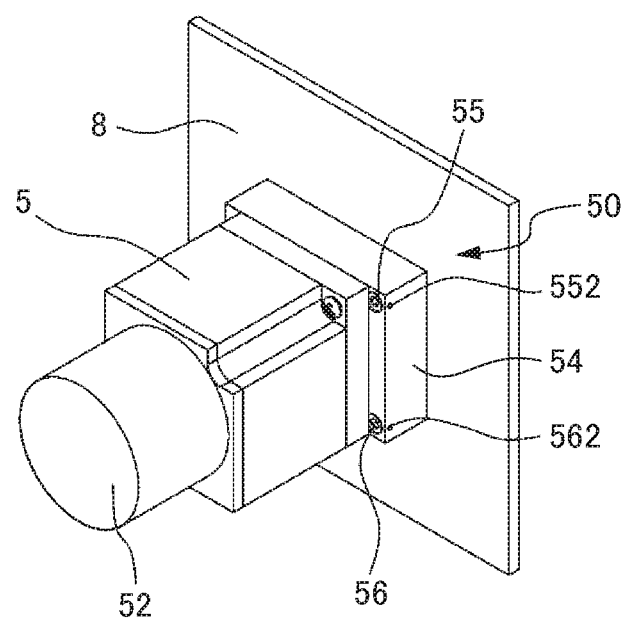
FIG. 36 is a perspective view showing an angle adjustment mechanism for the rotation angle of the shaft of a rotary motor and associated components thereof.
Figure 36:
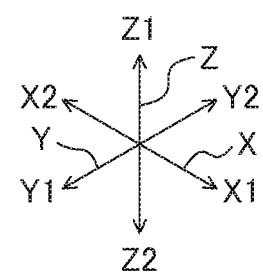
Figure 37:
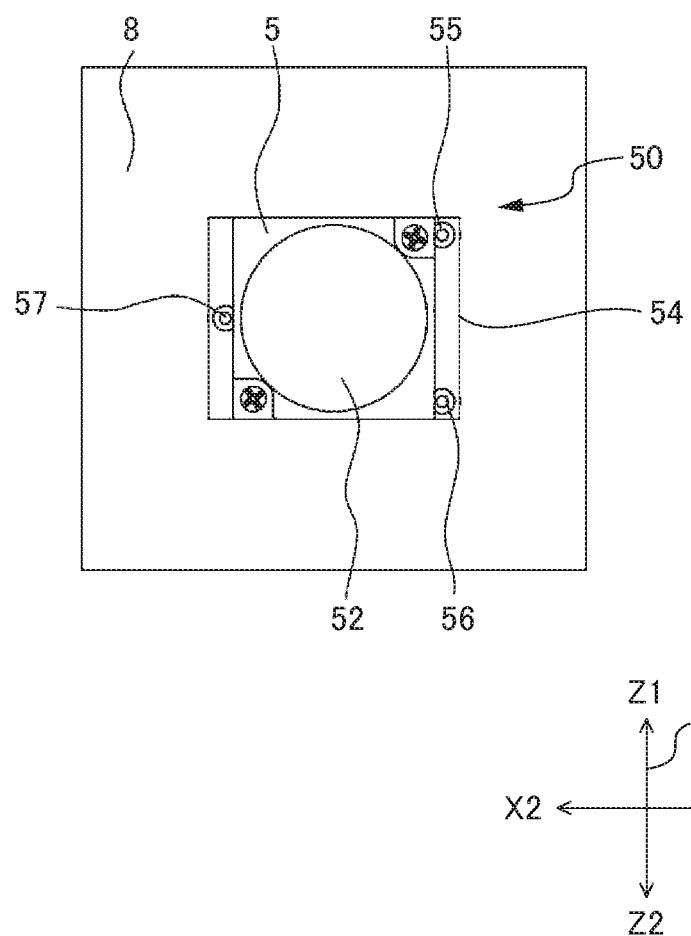
FIG. 37 is a front, view showing an angle adjustment mechanism for the rotation angle of the shaft of a rotary motor and associated components thereof.
Figure 38:
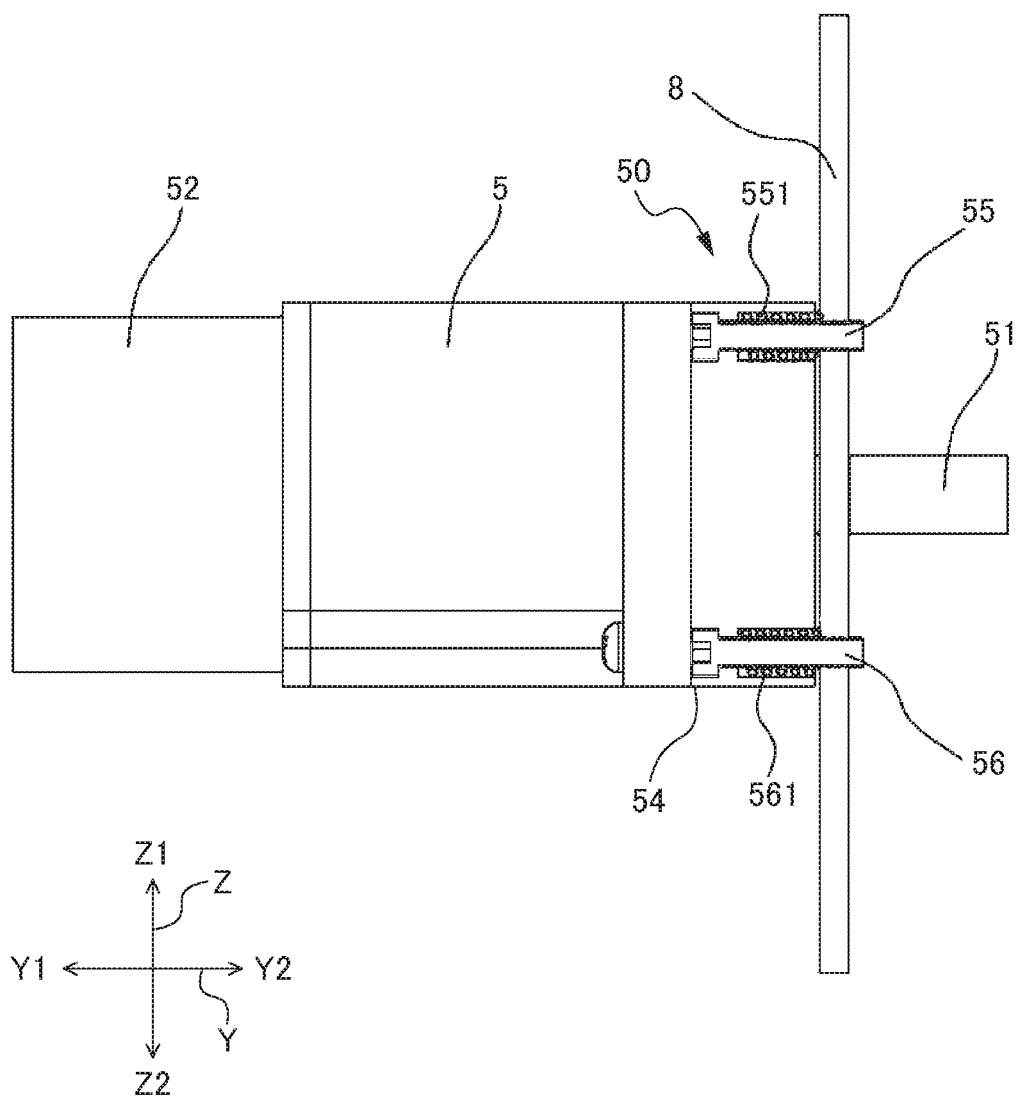
FIG. 38 is a longitudinal sectional view showing an angle adjustment mechanism for the rotation angle of the shaft of a rotary motor and associated components thereof.
Figure 39:
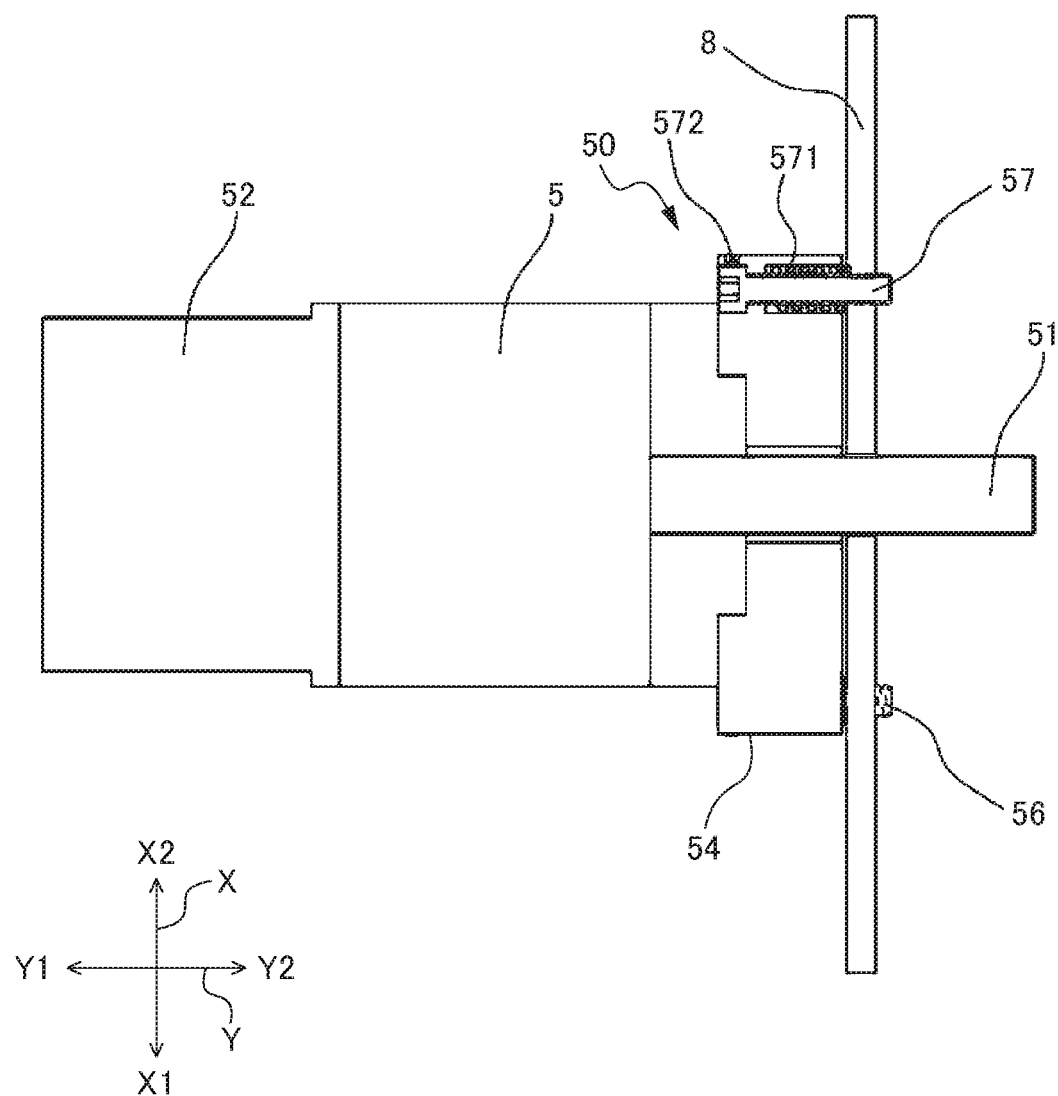
FIG. 39 is a cross-sectional view showing an angle adjustment mechanism for the rotation angle of the shaft of a rotary motor and associated components thereof.

Next, an angle adjustment mechanism (first angle adjustment mechanism) for adjusting the optical axis angle including the flap angle of the reflecting surface 6a of the first reflecting member 6 fixed to the shaft 51 of the rotary motor 5 will be explained using FIGS. 36 to 39. FIGS. 36 to 39 are views showing an angle adjustment mechanism for the rotation axis of the shaft of the rotary motor and associated components thereof. FIG. 36 is a perspective view, FIG. 37 is a front view, FIG. 38 is a longitudinal sectional view, and FIG. 39 is a cross-sectional view. It should be noted that the unit base plate 8 mounting the rotary motor 5 in FIGS. 36 to 39 is illustrated by a simple quadrilateral for simplifying explanation.

The first angle adjustment mechanism 50 for adjusting the optical axis angle including the flap angle of the reflecting surface 6a of the first reflecting member 6 fixed to the shaft 51 of the rotary motor 5 is configured to include a base stand 54 of the rotary motor 5, three angle adjusting screws 55, 56, 57, and coil springs 551, 561, 571. The base stand 54 of the rotary motor 5 is mounted to the unit base plate 8, by the three angle adjusting screws 55, 56, 57.

The angle adjusting screws 55, 56 are arranged to be separated in the vertical direction (Z axis direction) on the right-side end of the base stand 54 (end in X1 direction). In addition, the angle adjusting screw 57 is arranged at the central part in the vertical direction (Z axis direction) on the left-side end of the base stand 54 (end in X2 direction). The coil springs 551, 561, 571 are mounted to the outer circumferences of each angle adjusting screw 55, 56, 57, respectively. The respective coil springs 551, 561, 571 exhibit force in a direction distancing the rotary motor 5 from the unit base plate 8.

By turning the angle adjusting screws 55, 56, 57, the distance between the rotary motor 5 and the unit base plate 8 is adjusted. More specifically, when turning the angle adjusting screw 57 on the left side in FIG. 37, the rotary motor 5 rotates around a line parallel to the Z axis. The axial direction of the shaft 51 thereby changes to the lateral direction (X axis direction) relative to the Y axis, and accompanying this, the optical axis angle of the reflecting surface 6a of the first reflecting member 6 fixed to the shaft 51 changes. In addition, when turning the two angle adjusting screws 55, 56 on the right side in FIG. 37 in opposite directions from each other, the rotary motor 5 rotates around a line parallel to the X axis. The axial direction of the shaft 51 thereby changes to the vertical direction (Z axis direction) relative to the Y axis, and accompanying this, the optical axis angle of the reflecting surface 6a of the first reflecting member 6 fixed to the shaft 51 changes. Furthermore, when turning the three angle adjusting screws 55, 56, 57 in the same direction by the same angle, the rotary motor 5 moves in parallel along the Y axis direction.

In the above way, the optical axis angle including the flap angle of the reflecting surface 6a of the first reflecting member 6 fixed to the shaft 51 of the rotary motor 5 is adjustable from the front surface side of the fiber selector 1, by manipulating the angle adjusting screws 55, 56, 57 of the first angle adjustment mechanism 50. It should be noted that, after adjustment, the angle adjusting screws 55, 56, 57 are locked so as not to turn, by tightening lock screws 552, 562, 572 using an L-shaped hexagonal wrench or the like.

Figure 40:
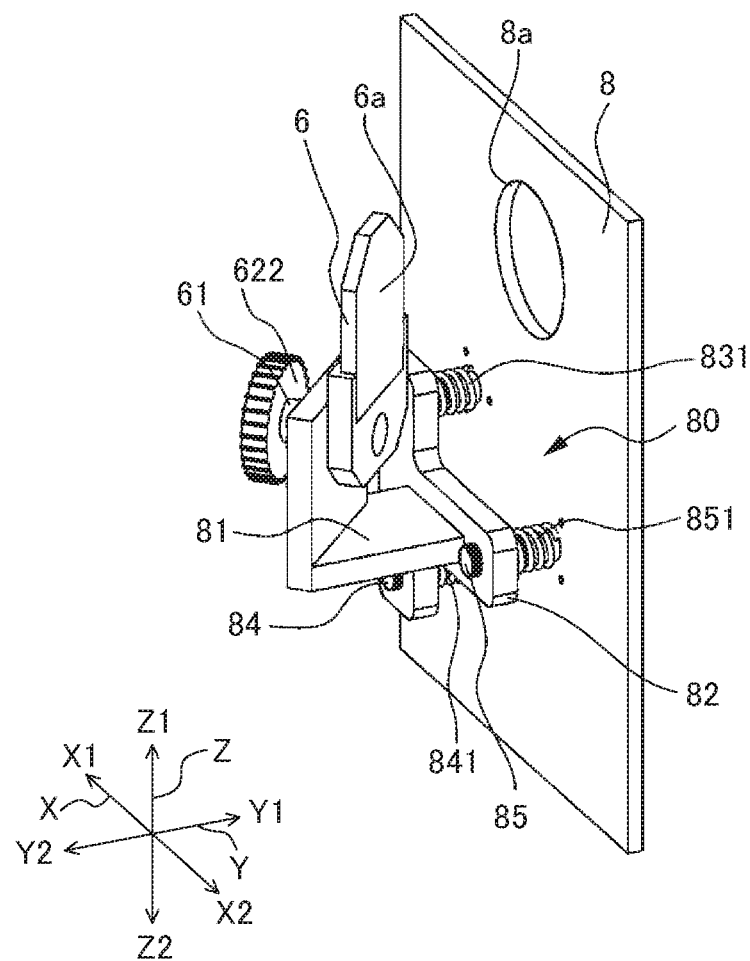
FIG. 40 is a perspective view showing an optical axis angle adjustment mechanism of the reflecting surface of a reflecting member fixed to a second shaft, and associated components thereof.
Figure 41:
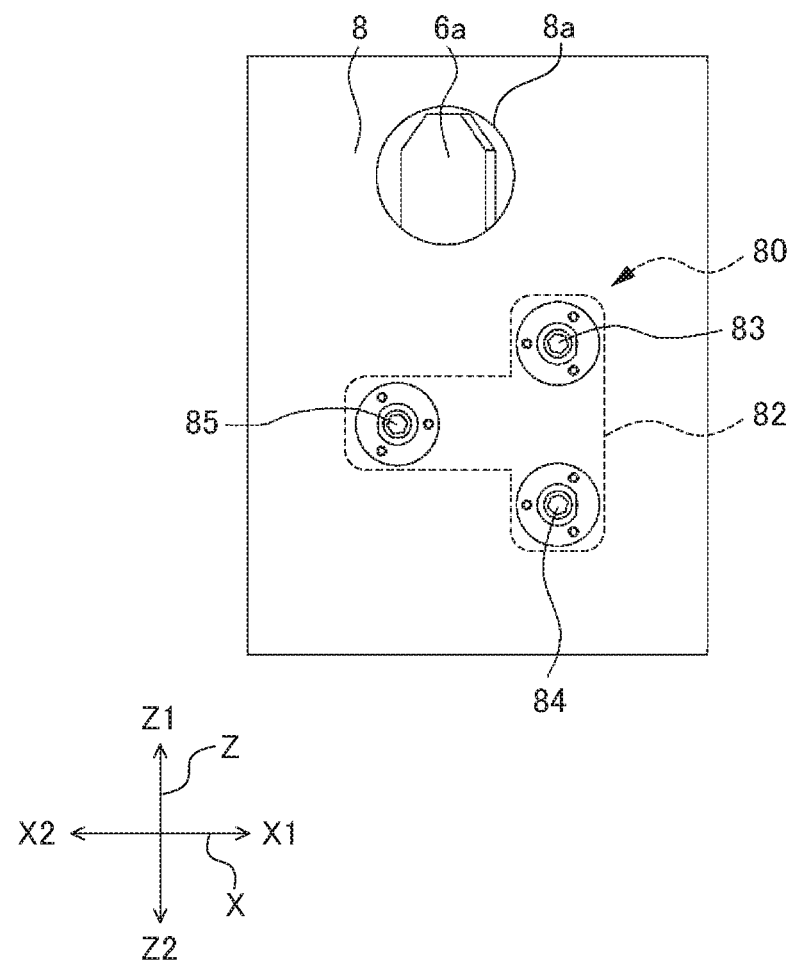
FIG. 41 is a front view showing an optical axis angle adjustment mechanism of the reflecting surface of a reflecting member fixed to a second shaft, and associated components thereof.
Figure 42:
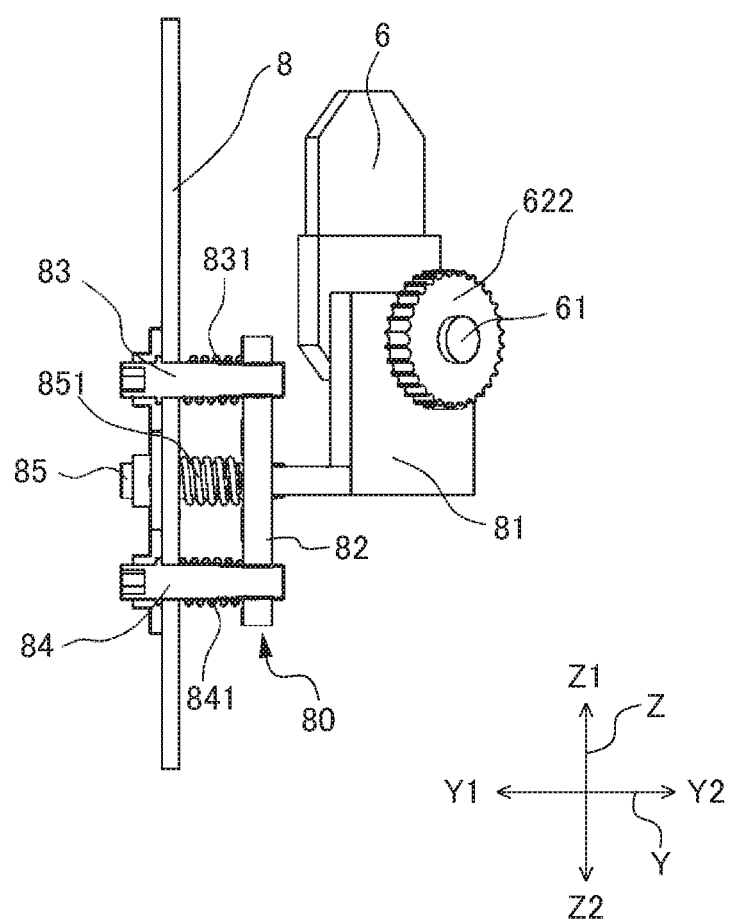
FIG. 42 is a longitudinal sectional view showing an optical axis angle adjustment mechanism of the reflecting surface of a reflecting member fixed to a second shaft, and associated components thereof.
Figure 43:
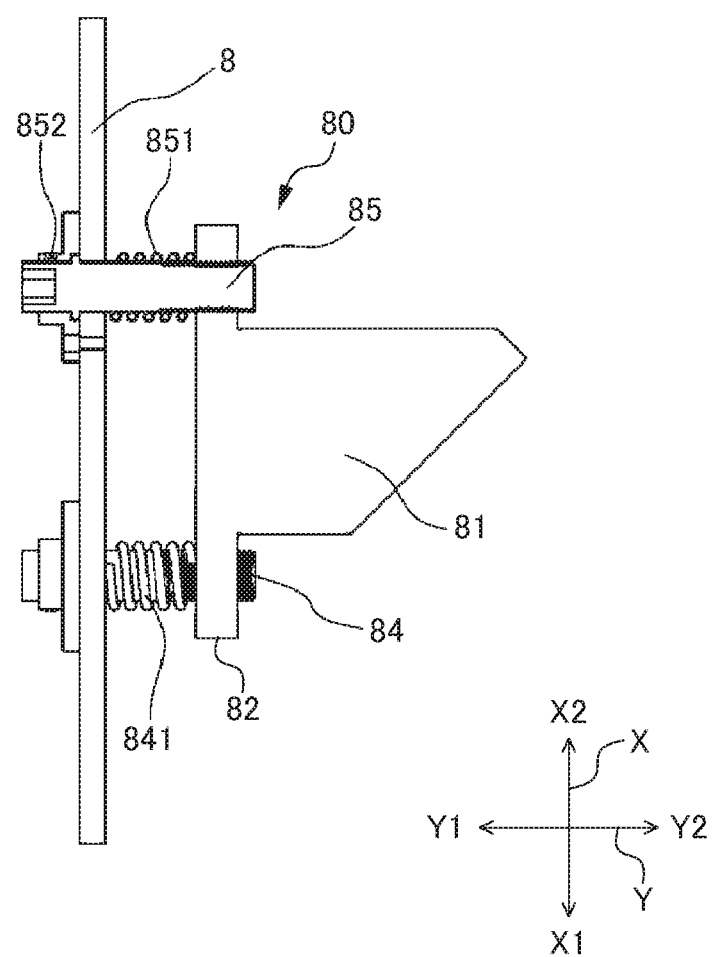
FIG. 43 is a cross-sectional view showing an optical axis angle adjustment mechanism of the reflecting surface of a reflecting member fixed to a second shaft, and associated components thereof.

Next, an example of a first angle adjustment mechanism for optical axis angle adjustment including the flap angle of the reflecting surface 6a of the first reflecting member 6 fixed to the second shaft 61 will be explained using FIGS. 40 to 43. FIGS. 40 to 43 show an optical axis angle adjustment mechanism of the reflecting surface of the reflecting member fixed to the second shaft, and associated components thereof. FIG. 40 is a perspective view, FIG. 41 is a front view, FIG. 42 is a longitudinal sectional view, and FIG. 43 is a cross-sectional view. It should be noted that, in FIGS. 40 to 43, the unit base plate 8 mounting the second shaft bearing support component 81 which supports the second shaft 61 is shown as a simple quadrilateral for simplifying explanation.

The first angle adjustment mechanism 80 for adjusting the optical axis angle including the flap angle of the reflecting surface 6a of the first reflecting member 6 fixed to the second shaft 61 is configured to include a base stand 82 that is T-shaped when turned sideways, three angle adjusting screws 83, 84, 85, and coil springs 831, 841, 851. The second shaft bearing support component 81 is formed integrally with the base stand 82. This base stand 82 is mounted to the unit base plate 8 by the three angle adjusting screws 83, 84, 85. Thereamong, the angle adjusting screws 83, 84 are arranged to be separated in the vertical direction (Z axis direction) at one end (end in X1 direction) in the lateral direction of the base stand 82. In addition, the angle adjusting screw 85 is arranged at the other end (end in X2 direction) in the lateral direction of the base stand 82. The coil springs 831, 841, 851 are mounted to the outer circumferences of each of the angle adjusting screws 83, 84, 85, respectively. The respective coil springs 831, 841, 851 exhibit force on the second shaft bearing support component 81 in a direction distancing from the unit base plate 8, via the base stand 82.

By turning the angle adjusting screws 83, 84, 85, the mounting angle of the second shaft bearing support component 81 relative to the unit base plate 8 is adjusted. More specifically, when turning the angle adjusting screw 85 on the left side in FIG. 41 in opposite direction from each other, the second shaft bearing support component 81 rotates around a line parallel to the Z axis. The mounting angle of the second shaft bearing support component 81 relative to the unit base plate 8 changes to the lateral direction (X axis direction), and accompanying this, the optical axis angle of the reflecting surface 6a of the first reflecting member 6 fixed to the second shaft 61 changes. In addition, when turning the two angle adjusting screws 83, 84 on the right side in FIG. 41, the second shaft bearing support component 81 rotates around a line parallel to the X axis. The mounting angle of the second shaft bearing support component 81 relative to the unit base plate 8 thereby changes to the vertical direction (Z axis direction), and accompanying this, the optical axis angle of the reflecting surface 6a of the first reflecting member 6 fixed to the second shaft 61 changes. Furthermore, when turning the three angle adjusting screws 83, 84, 65 in the same direction by the same angle, the second shaft bearing support component 81 moves in parallel along the Y axis direction.

In the above way, the optical axis angle including the flap angle of the reflecting surface 6a of the first reflecting member 6 fixed to the second shaft 61 is adjustable from the front surface side of the fiber selector 1, by manipulating the angle adjusting screws 83, 84, 85 of the first angle adjustment mechanism 80. It should be noted that, after adjustment, the angle adjusting screws 83, 84, 85 are locked so as not to turn, by tightening lock screws 832, 842, 852 using an L-shaped hexagonal wrench or the like. In FIGS. 40 to 43, only the lock screw 852 is shown.

The angle adjustment mechanism (second angle adjustment mechanism) of the second reflecting member 7 can also be configured similarly to either of the above-mentioned angle adjustment mechanisms (first angle adjustment mechanisms 50, 80) of the first reflecting member 6. It should be noted that the adjustment mechanism described as the above embodiment is merely one example, and the adjustment mechanism in the present invention is not limited to the above embodiment.

Embodiment of Laser Apparatus

Figure 44:
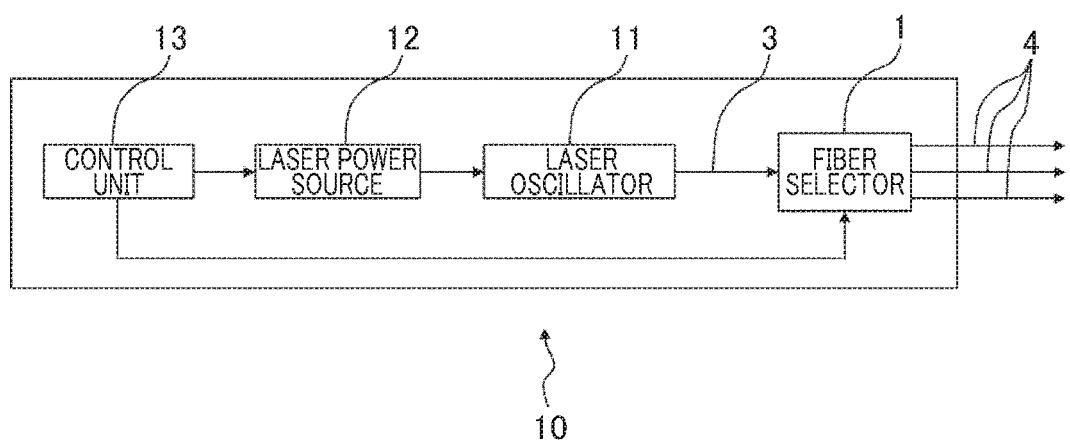
FIG. 44 is a block diagram showing an outline configuration of a laser apparatus according to the present invention.
Figure 45:
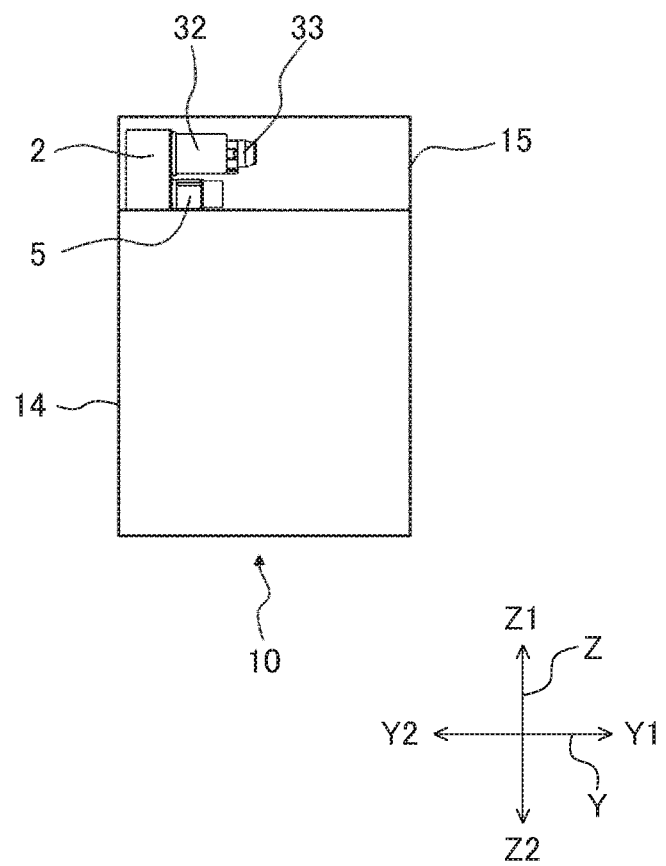
FIG. 45 is a view showing an installation example of a fiber selector in the laser apparatus according to the present invention.
Figure 46:
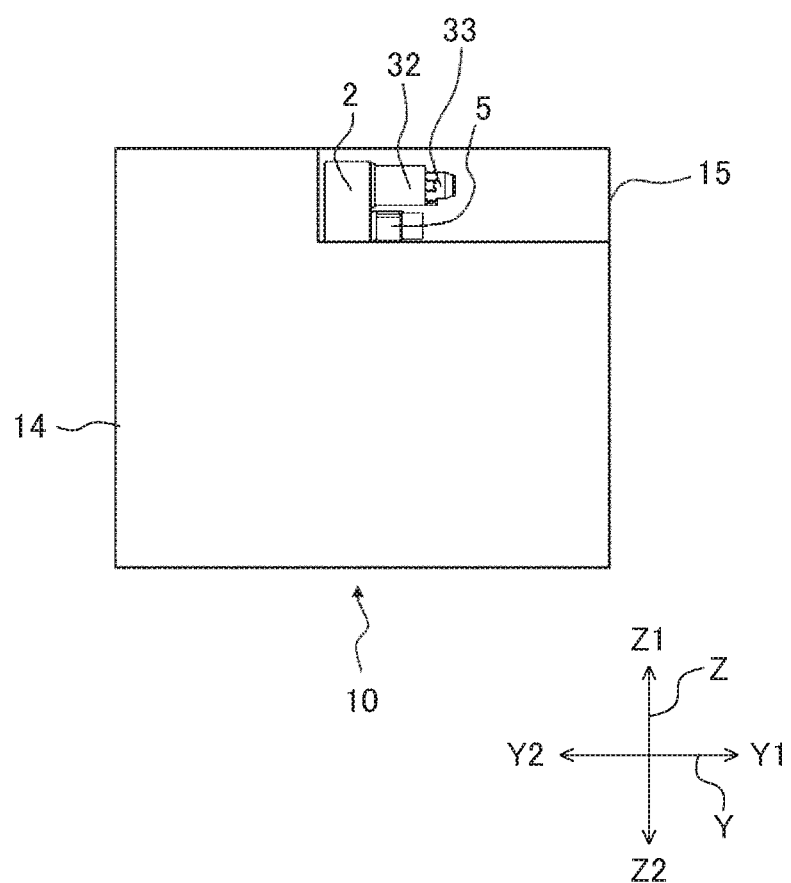
FIG. 46 is a view showing another installation example of a fiber selector in the laser apparatus according to the present invention.

FIG. 44 is a block diagram showing a conceptual configuration of a laser apparatus according to the present invention. FIG. 45 is a view showing an installation example of a fiber selector in a laser apparatus according to the present invention. FIG. 46 is a view showing another installation example of a fiber selector in a laser apparatus according to the present invention. The laser apparatus 10 includes the above-mentioned fiber selector 1 described as the first to fifth embodiments, a laser oscillator 11, one input optical fiber 3, a plurality of output optical fibers 4, a laser power source 12, and a control unit 13.

At least one laser oscillator 11 is provided to the laser apparatus 10. The input optical fiber 3 inputs a laser beam outputted from the laser oscillator 11 to the fiber selector 1. The plurality of output optical fibers 4 propagate the laser beam outputted from the fiber selector 1 to the plurality of laser beam emitting ends. The laser power source 12 supplies driving power to the laser oscillator 11. The control unit 13 controls rotation of the rotary motor 5 in the fiber selector 1, and outputs to the laser power source 12 an output command value for commanding the supply of driving power to the laser oscillator 11. This laser apparatus 10 inputs a laser beam outputted from the laser oscillator 11 to the fiber selector 1 via the input optical fiber 3, and selectively emits from any among the plurality of output optical fibers 4 the laser beam outputted from the fiber selector 1.

As shown in FIGS. 45 and 46, in the laser apparatus 10 shown in the present embodiment, the fiber selector 1 is installed within a housing 14 of the laser apparatus 10. More specifically, the fiber selector 1, when viewing the fiber selector 1 from the outside of the laser apparatus 10 by opening the front panel 15 provided to the housing 14 to be openable, is installed in a direction in which the rotary motor 5 can be seen nearer than the first reflecting member 6, i.e. direction in which the front surface side of the fiber selector (front surface panel 2a) can be seen at the near side. The openable front panel 15 may be an operation-side panel or maintenance-side panel constituting the housing 14 of the laser apparatus 10.

The fiber selector 1 is the fiber selector 1 according to any of the embodiments explained above; therefore, it is possible to perform all adjustment work and maintenance work such as optical axis angle adjustment or focal position adjustment of the collimating optical system 31 and/or focusing optical system 41; optical axis angle adjustment of the reflecting surface 6a of the first reflecting member 6 and/or reflecting surface 7a of the second reflecting member 7; replacement of these optical components and/or single components of the rotary motor 5; replacement by a unit entity including these optical components and/or rotary motor 5, etc., from the front surface side of the fiber selector 1. For this reason, at becomes possible to perform adjustment work and/or maintenance work of the fiber selector 1, without moving the laser apparatus 10, while leaving the fiber selector 1 installed in the laser apparatus 10.

In addition, the fiber selector 1 not only does not require adjustment work or maintenance work from the back surface side (opposite surface side to the front surface plate 2a), but also the back surface of the fiber selector 1 does not require installation of components other than to the case 2 sealed for maintaining cleanliness of the optical systems; therefore, the fiber selector can be arranged to be near or abutting the back surface thereof to the inner walls of the laser apparatus 10, or a partition wall within the laser apparatus 10, as illustrated in FIGS. 45 and 46. Therefore, the space for each type of adjustment or maintenance inside of the laser apparatus 10 is sufficient if ensuring only at the front of the fiber selector 1; therefore, a size increase of the laser apparatus 10 is curbed to the minimum by installing the fiber selector 1 into the laser apparatus 10.

In FIGS. 45 and 46, the side panel of the laser apparatus 10 is made hidden so that the installation state of the fiber selector 1 within the laser apparatus 10 is visible, and other components such as the laser oscillator and laser power source other than the fiber selector 1 are not illustrated either. In addition, the control unit 13 controls rotation of the rotary motor 5 of the fiber selector 1, and outputs to the laser power source 12 an output command value for commanding supply of driving power to the laser oscillator 11 synchronously with this control; therefore, this laser apparatus 10 can perform switching of output optical fibers 4 to emit the laser beam at higher speed. Furthermore, it is possible to emit a laser beam from the emitting end of the output optical fiber 4 without delaying the moment at which switching completes. Therefore, when using the laser apparatus 10 according to the present invention, it is possible to perform laser machining efficiently.

The control unit 13 is not required to be installed inside the laser apparatus 10. For example, in the case of the laser beam emitting end being the machining head equipped to a robot hand, the control unit 13 may be a control unit installed inside of a robot controller. In this case, the control unit 13 can serve the purpose of a control unit of the robot controller, whereby the rotary motor 5 of the fiber selector 1, laser power source 12, etc. are controlled by commands from the control unit within this robot controller.

It should be noted that, in the fiber selector 1 according to the respective embodiments of the present invention, the first reflecting member 6 is not limited to time-sharing the laser beam L. The fiber selector 1 may be configured so as to enable power sharing of the laser beam L, by including semi-transparent first reflecting members 6 of different reflectance that transmit a part of the laser beam L. For example, by using a reflecting member of 50% reflectance in the first reflecting member 6 on the left side in FIG. 1, using a reflecting member of 100% reflectance in the first reflecting member 6 on the right side, and controlling the rotary motor 5 so that both of the first reflecting members 6 reside at the first position reflecting the laser beam L by the reflecting surfaces 6a, it is possible to divide the power of the laser beam in a ratio of 50:50 to two of the output optical fibers 4.

In addition, in the fiber selector 1 according to the respective embodiments of the present invention, the first reflecting member 6 may include a residing confirmation sensor (not illustrated) for confirming whether or not the first reflecting member 6 is residing at the second position which does not block the laser beam L, in accordance with the command from the control unit.

Furthermore, in the fiber selector 1 according to the respective embodiments of the present invention, in order to curb a temperature rise of each part of the fiber selector 1 due to the laser beam L, a structure that cools each part with a coolant such as cooling water may be included, and a temperature sensor for monitoring the temperature rise may be arranged, as necessary.

EXPLANATION OF REFERENCE NUMERALS 1 fiber selector
2 case
2a front surface plate
21 incident opening
22 exit opening
3 input optical fiber
31 collimating optical system
4 output optical fiber
41 focusing optical system
5 rotary motor
50 first angle adjustment mechanism
51 shaft (first shaft)
6 first reflecting member
6a reflecting surface
601, 602 stopper
603 spiral spring (elastic member)
61 second shaft
62 transmission mechanism
641, 642 bearing
65 pressing mechanism
651 elastic member
652 solenoid coil
7 second reflecting member
7a reflecting surface
80 first angle adjustment mechanism
10 laser apparatus
14 housing
15 front surface panel
L laser beam
U2 collimating optical system unit
U1 focusing optical system unit

What is claimed is:

1. A fiber selector comprising:
a collimating optical system that converts a laser beam emitted from an input optical fiber into parallel light;
a plurality of focusing optical systems that focuses the laser beam on an output optical fiber;
a plurality of first reflecting members provided to correspond to the plurality of the focusing optical systems, and including a reflecting surface that can reflect the laser beam from the collimating optical system towards the focusing optical system; and a rotary motor provided to correspond to a plurality of the first reflecting members, and causing the first reflecting member to rotationally move between a first position at which the laser beam reflects by the reflecting surface towards the focusing optical system, and a second position not blocking the laser beam, wherein the fiber selector selectively switches a propagating direction of the laser beam incident from the collimating optical system to a direction incident on any of the plurality of the focusing optical systems, by causing each of the plurality of the first reflecting members to rotationally move between the first position and the second position by way of the rotary motor, and wherein the reflecting surface of the first reflecting member is a plane perpendicular to the rotation axis of a shaft to which the first reflecting member is fixed, and is arranged to face a direction of the rotary motor which causes the shaft to which the first reflecting member is fixed to rotate.

2. The fiber selector according to claim 1, wherein the rotary motor has a first shaft, wherein a plurality of the first reflecting members is respectively mounted to a second shaft different from the first shaft, and wherein the second shaft is configured so as to join to the first shaft via a transmission mechanism that transfers rotational motion, and rotate together with rotation of the first shaft.

3. The fiber selector according to claim 2, wherein at least part of the transmission mechanism is configured by a resin having self-lubricating property.

4. The fiber selector according to claim 2, wherein an optical axis of the focusing optical system and the rotation axis of the first shaft of the rotary motor causing the first reflecting member corresponding to the focusing optical system to rotationally move are arranged in parallel.

5. The fiber selector according to claim 4, wherein the rotation axis of the first shaft of at least one of the rotary motors is arranged so as to be equidistant from respective optical axes of two of the focusing optical systems which are adjacent.

6. The fiber selector according to claim 2, further comprising:

bearings that respectively support both ends of the second shaft to be rotatable; and a pressing mechanism that presses the second shaft against either of the bearings.

7. The fiber selector according to claim 6, wherein the pressing mechanism is configured by an elastic member or a solenoid actuator.

8. The fiber selector according to claim 1, further comprising:

a first angle adjustment mechanism that adjusts an optical axis angle including a flap angle of the reflecting surface of the first reflecting member, wherein the first angle adjustment mechanism is configured to enable at least one among replacement of the rotary motor and adjustment of the first angle adjustment mechanism, from a front surface of the fiber selector, when defining a surface of the fiber selector which is visible in a case of viewing the fiber selector from a direction facing the first reflecting member from the focusing optical system, as the front surface of the fiber selector.

9. The fiber selector according to claim 1, wherein a focusing optical system unit is configured to include at least one of the first reflecting members, the rotary motor which causes the first reflecting member to rotationally move, and the focusing optical system corresponding to the first reflecting member, and wherein the focusing optical system unit is provided to be replaceable from a front surface of the fiber selector, when defining a surface of the fiber selector which is visible in a case of viewing the fiber selector from a direction facing the first reflecting member from the focusing optical system, as the front surface of the fiber selector.

10. The fiber selector according to claim 1, wherein, for at least one of the first reflecting members, a center of gravity of said first reflecting member when at the first position is above the center of gravity of said first reflecting member when the first reflecting member is at the second position.

11. The fiber selector according to claim 1, further comprising:

stoppers which restrict a rotation angle range of the first reflecting member; and an elastic member that generates a force, other than the rotary motor, causing the first reflecting member to rotationally move, wherein the first reflecting member is configured so that, when the rotary motor does not generate a force causing the first reflecting member to rotationally move, rotationally moves up to one end of the rotational movement range by the elastic member, and the first reflecting member moves to the second position.

12. The fiber selector according to claim 1, further comprising:

a second reflecting member having a reflecting surface that reflects the laser beam from the collimating optical system towards the first reflecting member, wherein the second reflecting member is arranged so that an optical axis of a laser beam from the collimating optical system towards the second reflecting member and an optical axis of a laser beam from the first reflecting member towards the focusing optical system are parallel, and a propagating direction of the laser beam from the collimating optical system towards the second reflecting member is an opposite direction relative to the propagating direction of the laser beam from the first reflecting member towards the focusing optical system.

13. The fiber selector according to claim 12, further comprising a second angle adjustment mechanism that adjusts an optical axis angle including a flap angle of the reflecting surface of the second reflecting member, wherein the second angle adjustment mechanism is provided to be adjustable from a front surface of the fiber selector, when defining a surface of the fiber selector which is visible in a case of viewing the fiber selector from a direction facing the first reflecting member from the focusing optical system, as the front surface of the fiber selector.

14. The fiber selector according to claim 12, wherein a collimating optical system unit is configured to include at least the second reflecting member and the collimating optical system, and wherein the collimating optical system unit is provided to be replaceable from a front surface of the fiber selector, when defining a surface of the fiber selector which is visible in a case of viewing the fiber selector from a direction facing the first reflecting member from the focusing optical system, as the front surface of the fiber selector.

15. A laser apparatus comprising the fiber selector according to claim 1 inside of a housing, the laser apparatus inputting a laser beam outputted from a laser oscillator to the fiber selector via an input optical fiber, and selectively emits the laser beam outputted from the fiber selector from a plurality of output optical fibers, wherein the housing has an openable front surface panel, and wherein the fiber selector is installed so that the rotary motor is positioned more in front than the first reflecting member of the fiber selector, when opening the front surface panel.

* * * * *